(12) United States Patent
Togashi et al.

(10) Patent No.: US 7,283,348 B2
(45) Date of Patent: *Oct. 16, 2007

(54) MULTILAYER CAPACITOR

(75) Inventors: Masaaki Togashi, Nikaho (JP); Chris T. Burket, Huntington Beach, CA (US)

(73) Assignee: TDK Corporation, Tokyo (JP)

( * ) Notice: Subject to any disclaimer, the term of this patent is extended or adjusted under 35 U.S.C. 154(b) by 69 days.

This patent is subject to a terminal disclaimer.

(21) Appl. No.: 11/313,720

(22) Filed: Dec. 22, 2005

(65) Prior Publication Data

US 2007/0146964 A1    Jun. 28, 2007

(51) Int. Cl.
  *H01G 4/06* (2006.01)
(52) U.S. Cl. ............... 361/321.2; 361/321.1; 361/306.1; 361/306.3; 361/311; 361/313; 361/308.1
(58) Field of Classification Search ........ 361/303–305, 361/311–313, 306.1, 306.3, 321.1, 321.4, 361/321.2, 308.1, 308.2
See application file for complete search history.

(56) References Cited

U.S. PATENT DOCUMENTS

| | | | |
|---|---|---|---|
| 5,880,925 A | 3/1999 | DuPre et al. | |
| 6,243,253 B1 | 6/2001 | DuPre et al. | |
| 6,765,781 B2 * | 7/2004 | Togashi | 361/306.3 |
| 6,940,710 B1 * | 9/2005 | Lee et al. | 361/321.2 |
| 7,088,569 B1 * | 8/2006 | Togashi et al. | 361/303 |
| 7,154,374 B2 * | 12/2006 | Ritter et al. | 338/323 |
| 7,239,500 B2 * | 7/2007 | Togashi et al. | 361/306.3 |

FOREIGN PATENT DOCUMENTS

JP    A 2004-047983    2/2004

* cited by examiner

*Primary Examiner*—Nguyen T. Ha
(74) *Attorney, Agent, or Firm*—Oliff & Berridge, PLC

(57) ABSTRACT

A multilayer capacitor comprises a multilayer body in which a plurality of dielectric layers and a plurality of first and second inner electrodes are alternately laminated, and a plurality of outer conductors (first and second terminal conductors, and first and second outer connecting conductors) formed on the multilayer body. Each of the outer conductors is formed on one of two side faces of the multilayer body opposing each other. Each of the first and second inner electrodes is electrically connected to the corresponding outer connecting conductor. At least one inner connecting conductor layer including a first and a second inner connecting conductors is laminated in the multilayer body. Each of the inner connecting conductors is electrically connected to the corresponding terminal and outer connecting conductors. The equivalent series resistance of the multilayer capacitor is set to a desirable value by adjusting the number or position of inner connecting conductor layer.

16 Claims, 22 Drawing Sheets

MULTILAYER CAPACITOR

BACKGROUND OF THE INVENTION

1. Field of the Invention

The present invention relates to a multilayer capacitor.

2. Related Background Art

Known as this kind of multilayer capacitor is one comprising a multilayer body in which a plurality of dielectric layers and a plurality of inner electrodes are alternately laminated, and a plurality of terminal conductors formed on the multilayer body.

Power supplies for central processing units (CPUs) mounted in digital electronic devices have been increasing their load current and load transients while lowering their voltage. Therefore, it has become very difficult to suppress the fluctuation in power supply voltage under a tolerable level in response to a drastic change in load current, whereby a multilayer capacitor known as decoupling capacitor has come into use so as to be connected to a power supply. At the time when the load current fluctuates transiently, the multilayer capacitor supplies a current to the CPU, thereby suppressing the fluctuation of the power supply voltage.

In recent years, as the CPUs have further been raising their operating frequencies, the load current and load transients have been becoming faster and greater, whereby the multilayer capacitor used in the decoupling capacitor is demanded to increase its capacity and equivalent series resistance (ESR) and lower its equivalent series inductance (ESL) to help maintain a constant impedance loadline over a broad frequency spectrum. Therefore, a multilayer capacitor whose terminal conductor has a multilayer structure including an inner resistance layer, so as to increase the equivalent series resistance has been under consideration. Traditional means to lower the ESL of a capacitor have also resulted in the lowering of ESR. The CPU system levels of needed impedance (as it relates to ESR) have been met by current products to the point that they need to be raised, while continuing to drive ESL lower.

SUMMARY OF THE INVENTION

However, the following problem exists when adjusting the multilayer capacitor equipped with a terminal conductor having a multilayer structure including an inner resistance layer to a desirable value. Namely, for adjusting the equivalent series resistance to a desirable value in a multilayer capacitor equipped with a terminal conductor having a multilayer structure including an inner resistance layer, the thickness and material composition of the inner resistance layer included in the terminal conductor must be regulated while remaining independent of the capacitor's capacitance and ESL, which makes it very difficult to control the equivalent series resistance.

For overcoming the above-mentioned problem, it is an object of the present invention to provide a multilayer capacitor which can regulate the equivalent series resistance easily with a high precision.

In a typical multilayer capacitor, all the inner electrodes are connected to their corresponding terminal conductors through lead conductors. Consequently, the lead conductors exist by the number of inner electrodes, thereby lowering the equivalent series resistance. As the number of layers of the dielectric layers and inner electrodes is made greater in order to increase the capacity of the multilayer capacitor, the number of lead conductors becomes greater. Since resistance components of lead conductors are connected to the terminal conductors in parallel, the equivalent series resistance of the multilayer capacitor further decreases as the number of lead conductors increases. Thus, the demand for increasing the capacity of the multilayer capacitor and the demand for increasing the equivalent series resistance contradict each other.

Therefore, the inventors diligently conducted studies about multilayer capacitors which can satisfy both of the demands for increasing the capacity and equivalent series resistance. As a result, the inventors have found a new fact that, even when the number of laminated inner electrodes is the same, the equivalent series resistance can be adjusted to a desirable value if the inner electrodes are connected to outer connecting conductors formed on the surface of the multilayer body and inner connecting conductor layers laminated within the multilayer body while making it possible to change the number of inner connecting conductor layers connected to the terminal conductors. The inventors have also found a new fact that the equivalent series resistance can be adjusted to a desirable value if the inner electrodes are connected to outer connecting conductors formed on the surface of the multilayer body and inner connecting conductor layers laminated within the multilayer body while making it possible to change positions of inner connecting conductor layers in the laminating direction of the multilayer body. When the number of inner connecting conductor layers connected to the terminal conductors is made smaller than that of inner electrodes in particular, the adjustment can be made such as to increase the equivalent series resistance.

In view of such results of studies, in one aspect, the present invention provides a multilayer capacitor comprising a multilayer body in which a plurality of dielectric layers and a plurality of inner electrodes are alternately laminated, and a plurality of outer conductors formed on the multilayer body; wherein the plurality of inner electrodes include a plurality of first inner electrodes and a plurality of second inner electrodes alternately arranged; wherein the plurality of outer conductors include a first terminal conductor, a second terminal conductor, a first outer connecting conductor electrically connected to the plurality of first inner electrodes, and a second outer connecting conductor electrically connected to the plurality of second inner electrodes; wherein the first terminal conductor is formed on a first side face of the multilayer body; wherein the second terminal conductor is formed on the first side face of the multilayer body or a second side face thereof opposing the first side face; wherein the first outer connecting conductor is formed on the first or second side face of the multilayer body; wherein the second outer connecting conductor is formed on the first or second side face of the multilayer body; wherein each of the first inner electrodes is electrically connected to the first outer connecting conductor through a lead conductor; wherein each of the second inner electrodes is electrically connected to the second outer connecting conductor through a lead conductor; wherein at least one inner connecting conductor layer including a first inner connecting conductor and a second inner connecting conductor is laminated in the multilayer body; wherein the first inner connecting conductor is electrically connected to the first terminal conductor and first outer connecting conductor, whereas the second inner connecting conductor is electrically insulated from the first inner connecting conductor but is electrically connected to the second terminal conductor and second outer connecting conductor; wherein the inner connecting conductor layer is laminated in the multilayer body such that the multilayer body includes at least one set of the first and second inner electrodes neighboring each other with the dielectric layer in between; and wherein an equivalent series resistance is set to a desirable value by adjusting the number of inner connecting conductor layer.

By adjusting the number of inner connecting conductor layers, the multilayer capacitor in accordance with this aspect of the present invention sets the equivalent series resistance to a desirable value, and thus can control the equivalent series resistance easily with a high precision. The outer conductors of the multilayer capacitor are formed on one or both of two side faces of the multilayer body, i.e., the first and second side faces opposing each other. Therefore, the outer conductors can be formed easily.

In another aspect, the present invention provides a multilayer capacitor comprising a multilayer body in which a plurality of dielectric layers and a plurality of inner electrodes are alternately laminated, and a plurality of outer conductors formed on the multilayer body; wherein the plurality of inner electrodes include a plurality of first inner electrodes and a plurality of second inner electrodes alternately arranged; wherein the plurality of outer conductors include a first terminal conductor, a second terminal conductor, a first outer connecting conductor electrically connected to the plurality of first inner electrodes, and a second outer connecting conductor electrically connected to the plurality of second inner electrodes; wherein the first terminal conductor is formed on a first side face of the multilayer body; wherein the second terminal conductor is formed on the first side face of the multilayer body or a second side face thereof opposing the first side face; wherein the first outer connecting conductor is formed on the first or second side face of the multilayer body; wherein the second outer connecting conductor is formed on the first or second side face of the multilayer body; wherein each of the first inner electrodes is electrically connected to the first outer connecting conductor through a lead conductor; wherein each of the second inner electrodes is electrically connected to the second outer connecting conductor through a lead conductor; wherein at least one inner connecting conductor layer including a first inner connecting conductor and a second inner connecting conductor is laminated in the multilayer body; wherein the first inner connecting conductor is electrically connected to the first terminal conductor and first outer connecting conductor, whereas the second inner connecting conductor is electrically insulated from the first inner connecting conductor but is electrically connected to the second terminal conductor and second outer connecting conductor; wherein the inner connecting conductor layer is laminated in the multilayer body such that the multilayer body includes at least one set of the first and second inner electrodes neighboring each other with the dielectric layer in between; and wherein an equivalent series resistance is set to a desirable value by adjusting a position of the inner connecting conductor layer in the multilayer body in the laminating direction.

By adjusting the position and shape of the inner connecting conductor layer in the multilayer body in the laminating direction and by the number of inner connecting conductor layers, the multilayer capacitor in accordance with this aspect of the present invention sets the equivalent series resistance to a desirable value, and thus can control the equivalent series resistance easily with a high precision. The outer conductors of the multilayer capacitor are formed on one or both of two side faces of the multilayer body, i.e., the first and second side faces opposing each other. Therefore, the outer conductors can be formed easily.

Preferably, the first inner connecting conductor of the inner connecting conductor layer includes a region opposing the second inner electrode with the dielectric layer in between. Preferably, the second inner connecting conductor of the inner connecting conductor layer includes a region opposing the first inner electrode with the dielectric layer in between. In these cases, the first inner connecting conductor also contributes to forming a capacity component, thus making it possible to further increase the capacity of the multilayer capacitor.

Preferably, a plurality of inner connecting conductor layers are laminated in the multilayer body; and wherein the plurality of first inner electrodes and the plurality of second inner electrodes are arranged between a part of the plurality of inner connecting conductor layers and the rest thereof. In this case, the equivalent series resistance is set with a favorable balance in the multilayer capacitor.

Preferably, the first terminal conductor and the first outer connecting conductor are formed adjacent to each other on the same side face of the multilayer body. When this multilayer capacitor is mounted on a substrate or the like such that the first terminal conductor is directly connected to a land pattern while the first outer connecting conductor is kept from being directly connected to a land pattern, a magnetic field caused by a current flowing between the first terminal conductor and the inner connecting conductor and a magnetic field caused by a current flowing between the first outer connecting conductor and the first inner electrode and inner connecting conductor cancel each other out. As a result, this multilayer capacitor lowers its equivalent series inductance.

Preferably, the second terminal conductor and the second outer connecting conductor are formed adjacent to each other on the same side face of the multilayer body. When this multilayer capacitor is mounted on a substrate or the like such that the second terminal conductor is directly connected to a land pattern while the second outer connecting conductor is kept from being directly connected to a land pattern, a magnetic field caused by a current flowing between the second terminal conductor and the inner connecting conductor and a magnetic field caused by a current flowing between the second outer connecting conductor and the second inner electrode and inner connecting conductor cancel each other out. As a result, this multilayer capacitor lowers its equivalent series inductance.

It will be preferred if a plurality of first terminal conductors and a plurality of first outer connecting conductors are provided by the same number; wherein a plurality of second terminal conductors and a plurality of second outer connecting conductors are provided by the same number; wherein the plurality of first terminal conductors and the plurality of first outer connecting conductors are formed on the first side face of the multilayer body, whereas the plurality of second terminal conductors and the plurality of second outer connecting conductors are formed on the second side face of the multilayer body; wherein at least one of both neighboring sides of each first terminal conductor on the first side face is formed with the first outer connecting conductor; wherein at least one of both neighboring sides of each first outer connecting conductor on the first side face is formed with the first terminal conductor; wherein at least one of both neighboring sides of each second terminal conductor on the second side face is formed with the second outer connecting conductor; and wherein at least one of both neighboring sides of each second outer connecting conductor on the second side face is formed with the second terminal conductor.

When the terminal conductors and outer connecting conductors are thus arranged, a remarkable canceling effect is obtained in a magnetic field caused by a current flowing between the terminal conductor and the inner connecting conductor and a magnetic field caused by a current flowing between the outer connecting conductor and the inner electrode and inner connecting conductor. As a result, this multilayer capacitor remarkably lowers its equivalent series inductance.

It will be preferred if at least one each of the first terminal conductor, second terminal conductor, first outer connecting conductor, and second outer connecting conductor are provided; wherein the first terminal conductor or second terminal conductor is located at a position axisymmetrical to the first terminal conductor about a center axis of the multilayer body passing respective center points of two side faces of the multilayer body orthogonal to the laminating direction of the multilayer body; wherein the first outer connecting conductor or second outer connecting conductor is located at a position axisymmetrical to the first outer connecting conductor about the center axis of the multilayer body; wherein the first terminal conductor or second terminal conductor is located at a position axisymmetrical to the second terminal conductor about the center axis of the multilayer body; wherein the first outer connecting conductor or second outer connecting conductor is located at a position axisymmetrical to the second outer connecting conductor about the center axis of the multilayer body; wherein the first terminal conductor or second terminal conductor is located at a position opposing the first terminal conductor in a direction along which the first and second side faces of the multilayer body oppose each other; wherein the first outer connecting conductor or second outer connecting conductor is located at a position opposing the first outer connecting conductor in the opposing direction of the first and second side faces of the multilayer body; wherein the first terminal conductor or second terminal conductor is located at a position opposing the second terminal conductor in the opposing direction of the first and second side faces of the multilayer body; and wherein the first outer connecting conductor or second outer connecting conductor is located at a position opposing the second outer connecting conductor in the opposing direction of the first and second side faces of the multilayer body. Thus arranging and forming the terminal conductors and outer connecting conductors makes it easier to mount the multilayer capacitor to a substrate or the like.

The present invention can provide a multilayer capacitor which can regulate the equivalent series resistance easily with a high precision.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments of the present invention will be explained in detail with reference to the accompanying drawings. In the explanation, constituents identical to each other or those having functions identical to each other will be referred to with numerals identical to each other without repeating their overlapping descriptions.

Words "left" and "right" used in the explanation conform to the lateral direction in each drawing.

First Embodiment

Figure 1:
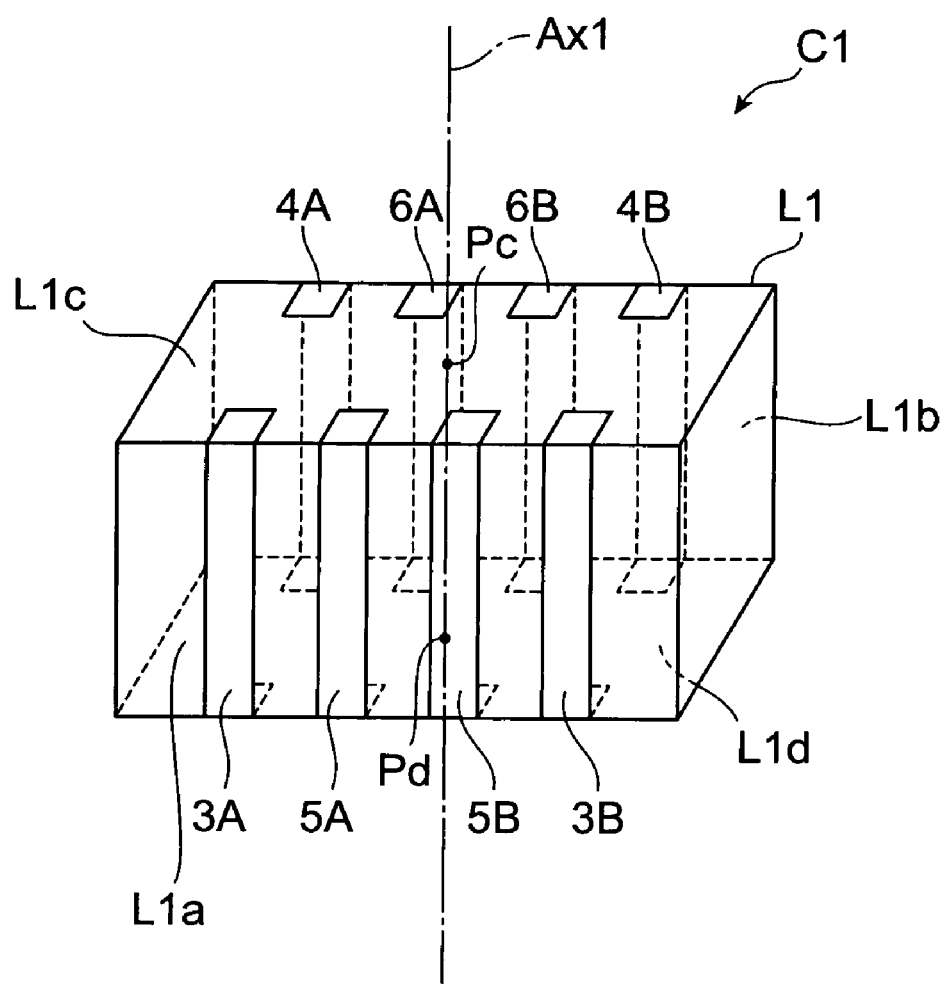
FIG. 1 is a perspective view of the multiplexer capacitor in accordance with a first embodiment.
Figure 2:
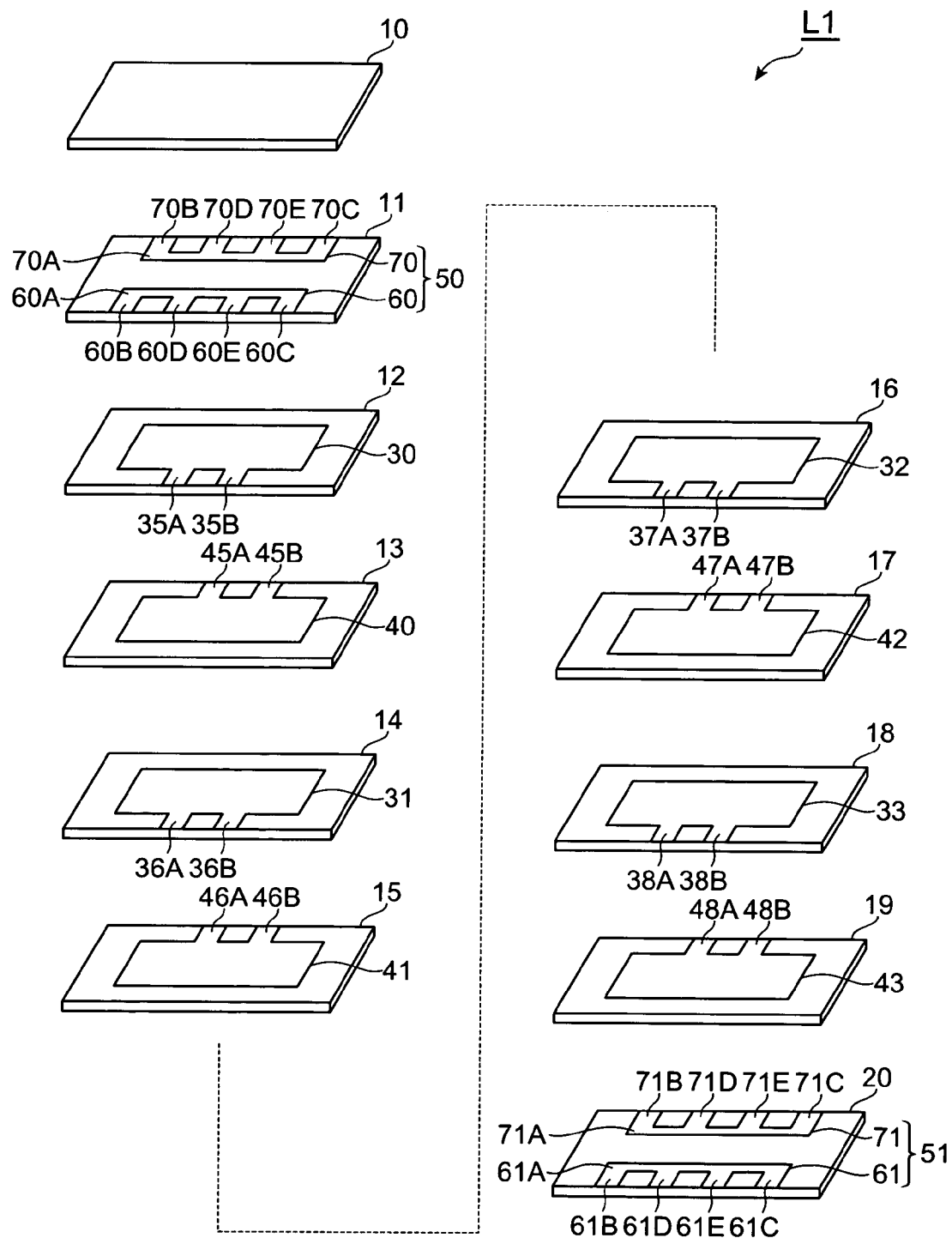
FIG. 2 is an exploded perspective view of the multilayer body included in the multilayer capacitor in accordance with the first embodiment.

With reference to FIGS. 1 and 2, the structure of the multilayer capacitor C1 in accordance with a first embodiment will be explained. FIG. 1 is a perspective view showing the multilayer capacitor in accordance with the first embodiment. FIG. 2 is an exploded perspective view of the multilayer body included in the multilayer capacitor in accordance with the first embodiment.

As shown in FIG. 1, the multilayer capacitor C1 comprises a multilayer body L1 having a substantially rectangular parallelepiped form and a plurality of outer conductors formed on side faces of the multilayer body L1. The plurality of outer conductors include a plurality of (2 in this embodiment) first terminal conductors 3A, 3B, a plurality of (2 in this embodiment) second terminal conductors 4A, 4B, a plurality of (2 in this embodiment) first outer connecting conductors 5A, 5B, and a plurality of (2 in this embodiment) outer connecting conductors 6A, 6B. The plurality of outer conductors are formed so as to be electrically insulated from each other on the surface of the multilayer body L1.

Thus, a plurality of the first terminal conductors 3A, 3B and a plurality of the first outer connecting conductors 5A, 5B are provided by the same number (2 each in this embodiment). Also, a plurality of the second terminal conductors 4A, 4B and a plurality of the second outer connecting conductors 6A, 6B are provided by the same number (2 each in this embodiment).

Each of the first terminal conductors 3A, 3B and first outer connecting conductors 5A, 5B is positioned on a first side face L1a in side faces parallel to the laminating direction of the multilayer body L1 which will be explained later, i.e., the first side face L1a that is a side face extending along the longitudinal axis of side faces L1c, L1d orthogonal to the laminating direction of the multilayer body L1. The first terminal conductors 3A, 3B and first outer connecting conductors 5A, 5B are formed such that the first terminal conductor 3A, first outer connecting conductor 5A, first outer connecting conductor 5B, first terminal conductor 3B are successively arranged from the left side to right side of FIG. 1.

Therefore, the first outer connecting conductor 5A is formed on one (right side in FIG. 1) of both neighboring sides of the first terminal conductor 3A on the first side face L1a. The first terminal conductor 3A is formed on one (left side in FIG. 1) of both neighboring sides of the first outer connecting conductor 5A on the first side face L1a. Thus, the first terminal conductor 3A and first outer connecting conductor 5A are formed adjacent to each other on the first side face L1a that is the same side face of the multilayer body L1.

The first outer connecting conductor 5B is formed on one (left side in FIG. 1) of both neighboring sides of the first terminal conductor 3B on the first side face L1a. The first terminal conductor 3B is formed on one (right side in FIG. 1) of both neighboring sides of the first outer connecting conductor 5B on the first side face L1a. Thus, the first terminal conductor 3B and first outer connecting conductor 5B are formed adjacent to each other on the first side face L1a that is the same side face of the multilayer body L1.

Each of the second terminal conductors 4A, 4B and second outer connecting conductors 6A, 6B is positioned on a second side face L1b in side faces parallel to the laminating direction of the multilayer body L1 which will be explained later, i.e., the second side face L1b that is a side face extending along the longitudinal axis of side faces L1c, L1d orthogonal to the laminating direction of the multilayer body L1 while opposing the first side face L1a. The second terminal conductors 4A, 4B and second outer connecting conductors 6A, 6B are formed such that the second terminal conductor 4A, second outer connecting conductor 6A, second outer connecting conductor 6B, second terminal conductor 4B are successively arranged from the left side to right side of FIG. 1.

Therefore, the second outer connecting conductor 6A is formed on one (right side in FIG. 1) of both neighboring sides of the second terminal conductor 4A on the second side face L1b. The second terminal conductor 4A is formed on one (left side in FIG. 1) of both neighboring sides of the second outer connecting conductor 6A on the second side face L1b. Thus, the second terminal conductor 4A and second outer connecting conductor 6A are formed adjacent to each other on the second side face L1b that is the same side face of the multilayer body L1.

The second outer connecting conductor 6B is formed on one (left side in FIG. 1) of both neighboring sides of the second terminal conductor 4B on the second side face L1b. The second terminal conductor 4B is formed on one (right side in FIG. 1) of both neighboring sides of the second outer connecting conductor 6B on the second side face L1b. Thus, the second terminal conductor 4B and second outer connecting conductor 6B are formed adjacent to each other on the second side face L1b that is the same side face of the multilayer body L11.

The second terminal conductor 4B is located at a position axisymmetrical to the first terminal conductor 3A about a center axis Ax1 passing respective center points Pc, Pd of the two side faces L1c, L1d orthogonal to the laminating direction of the multilayer body L1 among center axes of the multilayer body L1. The second terminal conductor 4A is located at a position axisymmetrical to the first terminal conductor 3B about the center axis Ax1 of the multilayer body L1. On the other hand, the first terminal conductor 3A is located at a position axisymmetrical to the second terminal conductor 4B about the center axis Ax1 of the multilayer body L1. The first terminal conductor 3B is located at a position axisymmetrical to the second terminal conductor 4A about the center axis Ax1 of the multilayer body L1.

The second outer connecting conductor 6B is located at a position axisymmetrical to the first outer connecting conductor 5A about the center axis Ax1 of the multilayer body L1. The second outer connecting conductor 6A is located at a position axisymmetrical to the first outer connecting conductor 5B about the center axis Ax1 of the multilayer body L1. On the other hand, the first outer connecting conductor 5A is located at a position axisymmetrical to the second outer connecting conductor 6B about the center axis Ax1 of the multilayer body L1. The first outer connecting conductor 5B is located at a position axisymmetrical to the second outer connecting conductor 6A about the center axis Ax1 of the multilayer body L1.

The second terminal conductor 4A is located at a position opposing the first terminal conductor 3A in a direction along which the first side face L1a and second side face L1b of the multilayer body L1 oppose each other. The second terminal conductor 4B is located at a position opposing the first terminal conductor 3B in the opposing direction of the first side face L1a and second side face L1b of the multilayer body L1. On the other hand, the first terminal conductor 3A is located at a position opposing the second terminal conductor 4A in the opposing direction of the first side face L1a and second side face L1b of the multilayer body L1. The first terminal conductor 3B is located at a position opposing the second terminal conductor 4B in the opposing direction of the first side face L1a and second side face L1b of the multilayer body L1.

The second outer connecting conductor 6A is located at a position opposing the first outer connecting conductor 5A in the opposing direction of the first side face L1a and second side face L1b of the multilayer body L1. The second outer connecting conductor 6B is located at a position opposing the first outer connecting conductor 5B in the opposing direction of the first side face L1a and second side face L1b of the multilayer body L1. On the other hand, the first outer connecting conductor 5A is located at a position opposing the second outer connecting conductor 6A in the opposing direction of the first side face L1a and second side face L1b of the multilayer body L1. The first outer connecting conductor 5B is located at a position opposing the second outer connecting conductor 6B in the opposing direction of the first side face L1a and second side face L1b of the multilayer body L1.

As shown in FIG. 2, the multilayer body L1 is constructed by alternately laminating a plurality of (11 in this embodiment) dielectric layers 10 to 20 and a plurality of (4 each in this embodiment) of first and second inner electrodes 30 to 33, 40 to 43. In the actual multilayer capacitor C1, they are integrated to such an extent that no boundaries are discernible between the dielectric layers 10 to 20.

Further, a plurality of (2 in this embodiment) inner connecting conductor layers 50, 51 are laminated in the multilayer body L1. In the multilayer body L1, the plurality of first inner electrodes 30 to 33 and the plurality of second inner electrodes 40 to 43 are arranged between one inner connecting conductor layer 50 which is a part of the two inner connecting conductor layers 50, 51 and the remaining one inner connecting conductor layer 51.

Each of the first inner electrodes 30 to 33 has a substantially rectangular form. The plurality of first inner electrodes 30 to 33 are formed at respective positions separated by a predetermined distance from a side face parallel to the laminating direction of the dielectric layers 10 to 20 (hereinafter simply referred to as "laminating direction") in the multilayer body L1. The first inner electrodes 30 to 33 are formed with their corresponding lead conductors 35A to 38A, 35B to 38B taken out therefrom so as to extend to the first side face L1a of the multilayer body L1.

Each of the lead conductors 35A and 35B is integrally formed with the first inner electrode 30 so as to extend therefrom and reach the first side face L1a of the multilayer body L1. Each of the lead conductors 36A and 36B is integrally formed with the first inner electrode 31 so as to extend therefrom and reach the first side face L1a of the multilayer body L1. Each of the lead conductors 37A and 37B is integrally formed with the first inner electrode 32 so as to extend therefrom and reach the first side face L1a of the multilayer body L1. Each of the lead conductors 38A and 38B is integrally formed with the first inner electrode 33 so as to extend therefrom and reach the first side face L1a of the multilayer body L1.

The first inner electrode 30 is electrically connected to the first outer connecting conductors 5A and 5B through the lead conductors 35A and 35B, respectively. The first inner electrode 31 is electrically connected to the first outer connecting conductors 5A and 5B through the lead conductors 36A and 36B, respectively. The first inner electrode 32 is electrically connected to the first outer connecting conductors 5A and 5B through the lead conductors 37A and 37B, respectively. The first inner electrode 33 is electrically connected to the first outer connecting conductors 5A and 5B through the lead conductors 38A and 38B, respectively. As a consequence, the plurality of first inner electrodes 30 to 33 are electrically connected to each other through the first outer connecting conductors 5A, 5B.

Each of the second inner electrodes 40 to 43 has a substantially rectangular form. The plurality of second inner electrodes 40 to 43 are formed at respective positions separated by a predetermined distance from a side face parallel to the laminating direction of the multilayer body L1. The second inner electrodes 40 to 43 are formed with their corresponding lead conductors 45A to 48A, 45B to 48B taken out therefrom so as to extend to the second side face L1b of the multilayer body L1.

Each of the lead conductors 45A and 45B is integrally formed with the second inner electrode 40 so as to extend therefrom and reach the second side face L1b of the multilayer body L1. Each of the lead conductors 46A and 46B is integrally formed with the second inner is electrode 41 so as to extend therefrom and reach the second side face L1b of the multilayer body L1. Each of the lead conductors 47A and 47B is integrally formed with the second inner electrode 42 so as to extend therefrom and reach the second side face L1b of the multilayer body L1. Each of the lead conductors 48A and 48B is integrally formed with the second inner electrode 43 so as to extend therefrom and reach the second side face L1b of the multilayer body L1.

The second inner electrode 40 is electrically connected to the second outer connecting conductors 6A and 6B through the lead conductors 45A and 45B, respectively. The second inner electrode 41 is electrically connected to the second outer connecting conductors 6A and 6B through the lead conductors 46A and 46B, respectively. The second inner electrode 42 is electrically connected to the second outer connecting conductors 6A and 6B through the lead conductors 47A and 47B, respectively. The second inner electrode 43 is electrically connected to the second outer connecting conductors 6A and 6B through the lead conductors 48A and 48B, respectively. As a consequence, the plurality of second inner electrodes 40 to 43 are electrically connected to each other through the first outer connecting conductors 6A, 6B.

The inner connecting conductor layer 50 is positioned so as to be held between the dielectric layers 10 and 11. The inner connecting conductor layer 51 is positioned so as to be held between the dielectric layers 19 and 20. The inner connecting conductor layers 50, 51 include their corresponding first inner connecting conductors 60, 61 and second inner connecting conductors 70, 71. The first inner connecting conductors 60, 61 are electrically insulated from the second inner connecting conductors 70, 71.

The first inner connecting conductors 60, 61 include their corresponding first conductor portions 60A, 61A each having an oblong form, and second to fifth conductor portions 60B to 60E, 61B to 61E extending from the first conductor portions 60A, 61A so as to be taken out to the first side face L1a of the multilayer body L1. The first conductor portions 60A, 61A are arranged such that their longitudinal axes are parallel to the first and second side faces L1a, L1b of the multilayer body L1. These multiple inner connecting conductors are imperative to form the resistive path to elevate the ESR and are not a means to alter the device's ESL.

The second to fifth conductor portions 60B to 60E, 61B to 61E of the first inner connecting conductors 60, 61 of the inner connecting conductor layers 50, 51 are positioned such that the second conductor portions 60B, 61B, fourth conductor portions 60D, 61D, fifth conductor portions 60E, 61E, and third conductor portions 60C, 61C are arranged successively from the left side to right side in FIG. 2. Each of the second conductor portions 60B, 61B is electrically connected to the first terminal conductor 3A. Each of the third conductor portions 60C, 61C is electrically connected to the first terminal conductor 3B. Each of the fourth conductor portions 60D, 61D is electrically connected to the first outer connecting conductor 5A. Each of the fifth conductor portions 60E, 61E is electrically connected to the first outer connecting conductor 5B. As a consequence, each of the first inner connecting conductors 60, 61 is electrically connected to the first terminal conductors 3A, 3B and first outer connecting conductors 5A, 5B.

The second inner connecting conductors 70, 71 include their corresponding first conductor portions 70A, 71A each having an oblong form, and second to fifth conductor portions 70B to 70E, 71B to 71E extending from the first conductor portions 70A, 71A so as to be taken out to the second side face L1$b$ of the multilayer body L1. The first conductor portions 70A, 71A are arranged such that their longitudinal axes are parallel to the first and second side faces L1$a$, L1$b$ of the multilayer body L1.

The second to fifth conductor portions 70B to 70E, 71B to 71E of the second inner connecting conductors 70, 71 of the inner connecting conductor layers 50, 51 are positioned such that the second conductor portions 70B, 71B, fourth conductor portions 70D, 71D, fifth conductor portions 70E, 71E, and third conductor portion 70C, 71C are arranged successively from the left side to right side in FIG. 2. Each of the second conductor portions 70B, 71B is electrically connected to the second terminal conductor 4A. Each of the third conductor portions 70C, 71C is electrically connected to the second terminal conductor 4B. Each of the fourth conductor portions 70D, 71D is electrically connected to the second outer connecting conductor 6A. Each of the fifth conductor portions 70E, 71E is electrically connected to the second outer connecting conductor 6B. As a consequence, each of the second inner connecting conductors 70, 71 is electrically connected to the second terminal conductors 4A, 4B and second outer connecting conductors 6A, 6B.

The first conductor portion 70A of the second inner connecting conductor 70 of the inner connecting conductor layer 50 is a region opposing the first inner electrode 30 with the dielectric layer 11 in between. The first conductor portion 61A of the first inner connecting conductor 61 of the inner connecting conductor layer 51 is a region opposing the second inner electrode 43 with the dielectric layer 19 in between.

The inner connecting conductor layers 50, 51 are laminated in the multilayer body L1 such that the multilayer body L1 includes at least one set (4 sets in this embodiment) of first and second inner electrodes neighboring each other with the dielectric layer in between. Specifically, the inner connecting conductor layers 50, 51 are laminated in the multilayer body L1 such that the multilayer body L1 includes the first inner electrode 30 and second inner electrode 40 neighboring each other with the dielectric layer 12 in between, for example. Namely, in the multilayer body L1, both of the inner connecting conductor layers 50, 51 are arranged on the outside of the one set of first and second inner electrodes 30, 40 in the laminating direction of the multilayer body L1.

Figure 3:
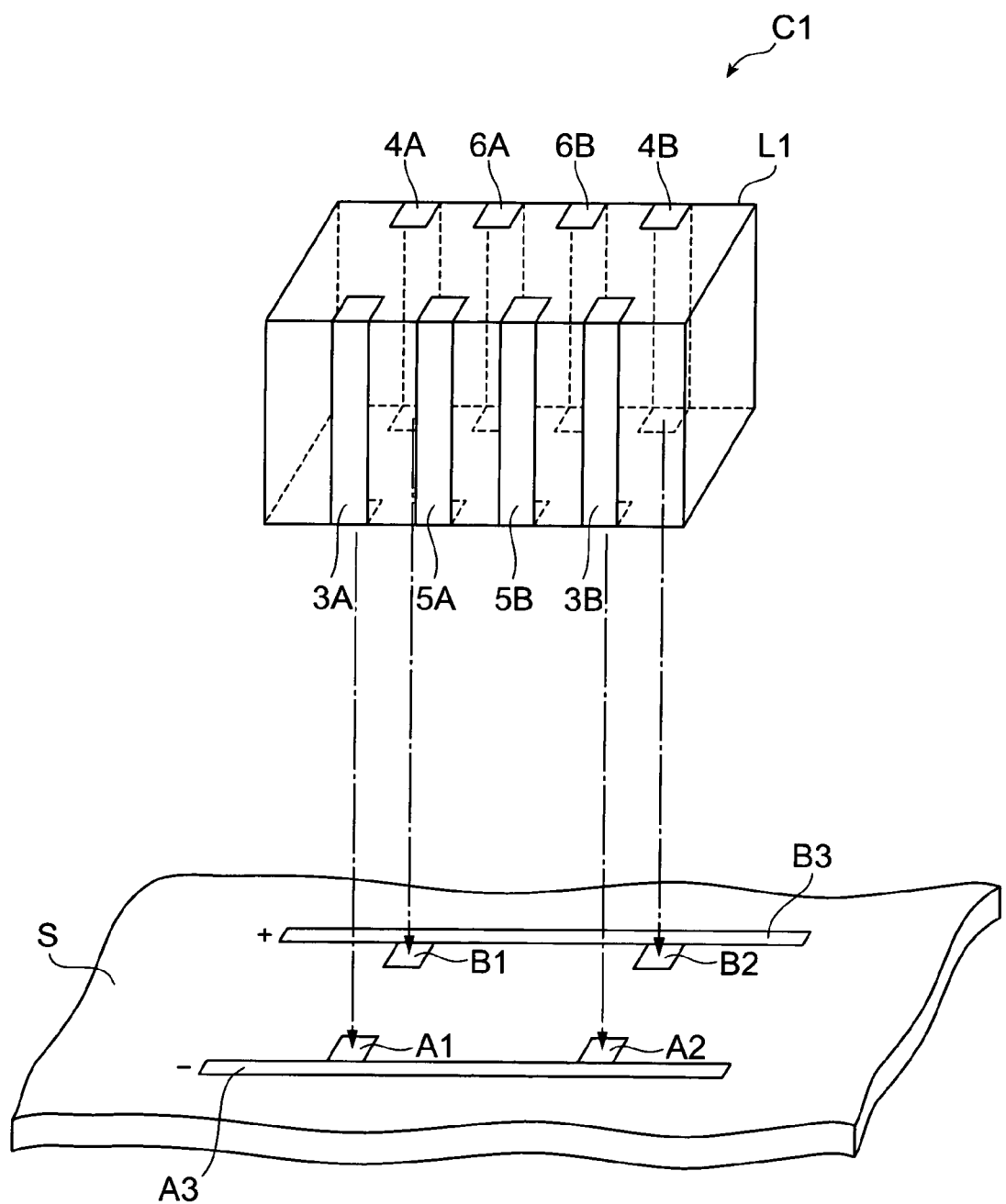
FIG. 3 is a view for explaining a state where the multilayer capacitor in accordance with the first embodiment is mounted to a substrate.

A case where the multilayer capacitor C1 is mounted to a substrate S will be shown by way of an example. FIG. 3 is a view for explaining a state where the multilayer capacitor is mounted to the substrate. FIG. 3 shows a state where the first terminal conductor 3A, first terminal conductor 3B, second terminal conductor 4A, and second terminal conductor 4B are connected to a cathode land pattern A1, a cathode land pattern A2, an anode land pattern B1, and an anode land pattern B2 which are formed on the substrate S, respectively. FIG. 3 also shows a state where the cathode land patterns A1, A2 are connected to a lead A3 while the anode land patterns B1, B2 are connected to a lead B3. In real applications, this may include via connections to power planes or internal substrate conducting layers.

In the multilayer capacitor C1, the first terminal conductors 3A, 3B are connected to the first inner electrodes 30 to 33 not directly, but electrically through the first outer connecting conductors 5A, 5B and the first inner connecting conductors 60, 61 of the inner connecting conductor layers 50, 51. Also, in the multilayer capacitor C1, the second terminal conductors 4A, 4B are connected to the second inner electrodes 40 to 43 not directly, but electrically through the second outer connecting conductors 6A, 6B and the second inner connecting conductors 70, 71 of the inner connecting conductor layers 50, 51. As a result, the multilayer capacitor C1 yields an equivalent series resistance greater than that of the conventional multilayer capacitor in which all the inner electrodes are connected to their corresponding terminal conductors through lead conductors.

By adjusting the number of inner connecting conductor layers 50, 51 directly connected to the first terminal conductors 3A, 3B and second terminal conductors 4A, 4B in such a manner, this embodiment sets the equivalent series resistance of the multilayer capacitor C1 to a desirable value, and thus can regulate the equivalent series resistance easily with a high precision. Also, since the equivalent series resistance is controlled by the inner connecting conductor layers, the multilayer capacitor C1 can regulate the equivalent series resistance while setting its capacitance to a desirable value (e.g., a larger value).

Each of the first terminal conductors 3A, 3B and first outer connecting conductors 5A, 5B which are outer conductors of the multilayer capacitor C1 is formed on the first side face L1$a$ of the multilayer body L1. Each of the second terminal conductors 4A, 4B and second outer connecting conductors 6A, 6B which are outer conductors of the multilayer capacitor C1 is formed on the second side face L1$b$ opposing the first side face L1$a$ of the multilayer body L1. Thus, all the outer conductors (first terminal conductors 3A, 3B, second terminal conductors 4A, 4B, first outer connecting conductors 5A, 5B, and second outer connecting conductors 6A, 6B) in the multilayer capacitor C1 are formed on the two side faces L1$a$, L1$b$ of the multilayer body L1 opposing each other. Therefore, as compared with the case where outer conductors are formed on three or more side faces (e.g., four side faces) of a multilayer body, the multilayer capacitor C1 can reduce steps required for forming the outer conductors. As a consequence, the multilayer capacitor C1 can be made easily.

The second inner connecting conductor 70 of the inner connecting conductor layer 50 has the first conductor portion 70A that is a region opposing the first inner electrode 30 with the dielectric layer 11 in between. Therefore, the inner connecting conductor layer 50 can also contribute to forming the capacity component of the multilayer capacitor C1. As a consequence, the multilayer capacitor C1 can further increase its capacitance.

The first inner connecting conductor 61 of the inner connecting conductor layer 51 has the first conductor portion 61A that is a region opposing the second inner electrode 43 with the dielectric layer 19 in between. Therefore, the inner connecting conductor layer 51 can also contribute to forming the capacity component of the multilayer capacitor C1. As a consequence, the multilayer capacitor C1 can further increase its capacitance.

In the multilayer body L1 of the multilayer capacitor C1, a plurality of first inner electrodes 30 to 33 and a plurality of second inner electrodes 40 to 43 are arranged between a part of the inner connecting conductor layers 50, 51 (inner connecting conductor layer 50) and the rest (inner connecting conductor layer 51). Therefore, the multilayer capacitor C1 can set the equivalent series resistance with a favorable balance.

On the first side face L1a of the multilayer body L1 in the multilayer capacitor C1, the first terminal conductor 3A and first outer connecting conductor 5A are formed adjacent to each other, and the first terminal conductor 3B and first outer connecting conductor 5B are formed adjacent to each other. Therefore, the following effects are obtained when the multilayer capacitor C1 is mounted on a substrate or the like such that the first terminal conductors 3A, 3B are directly connected to land patterns whereas the first outer connecting conductors 5A, 5B are kept from being directly connected to land patterns as shown in FIG. 3. Namely, a magnetic field caused by a current flowing between the first terminal conductors 3A, 3B and the inner connecting conductor layers 50, 51 (the second and third conductor portions 60B, 61B, 60C, 61C of the first inner connecting conductors 60, 61 of the inner connecting conductor layers 50, 51) and a magnetic field caused by a current flowing between the first outer connecting conductors 5A, 5B and the first inner electrodes 30 to 33 (the lead conductors 35A to 38A, 35B to 38B) and a current flowing between the first outer connecting conductors 5A, 5B and the inner connecting conductor layers 50, 51 (the fourth and fifth conductor portions 60D, 61D, 60E, 61E of the first inner connecting conductors 60, 61 of the inner connecting conductor layers 50, 51) cancel each other out. As a result, the multilayer capacitor C1 can reduce its equivalent series inductance. When there is at least one pair of first terminal conductor and first outer connecting conductor adjacent to each other, the equivalent series inductance can be reduced.

On the second side face L1b of the multilayer body L1 in the multilayer capacitor C1, the second terminal conductor 4A and second outer connecting conductor 6A are formed adjacent to each other, and the second terminal conductor 4B and second outer connecting conductor 6B are formed adjacent to each other. Therefore, the following effects are obtained when the multilayer capacitor C1 is mounted on a substrate or the like such that the second terminal conductors 4A, 4B are directly connected to land patterns whereas the second outer connecting conductors 6A, 6B are kept from being directly connected to land patterns as shown in FIG. 3. Namely, a magnetic field caused by a current flowing between the second terminal conductors 4A, 4B and the inner connecting conductor layers 50, 51 (the second and third conductor portions 70B, 71B, 70C, 71C of the second inner connecting conductors 70, 71 of the inner connecting conductor layers 50, 51) and a magnetic field caused by a current flowing between the second outer connecting conductors 6A, 6B and the second inner electrodes 40 to 43 (the lead conductors 45A to 48A, 45B to 48B) and a current flowing between the second outer connecting conductors 6A, 6B and the inner connecting conductor layers 50, 51 (the fourth and fifth conductor portions 70D, 71D, 70D, 70E of the second inner connecting conductors 70, 71 of the inner connecting conductor layers 50, 51) cancel each other out. As a result, the multilayer capacitor C1 can reduce its equivalent series inductance. When there is at least one pair of second terminal conductor and second outer connecting conductor adjacent to each other, the equivalent series inductance can be reduced.

The first terminal conductors 3A, 3B and first outer connecting conductors 5A, 5B are formed by the same number (2 each) on the first side face L1a of the multilayer body L1. Further, the first outer connecting conductors 5A and 5B are formed adjacent to the first terminal conductors 3A and 3B, respectively, whereas the first terminal conductors 3A and 3B are formed adjacent to the first outer connecting conductors 5A and 5B, respectively. Therefore, a remarkable canceling effect is obtained in a magnetic field caused by a current flowing between the first terminal conductors 3A, 3B and the inner connecting conductor layers 50, 51 and a magnetic field caused by a current flowing between the first outer connecting conductors 5A, 5B and the first inner electrodes 30 to 33 and a current flowing between the first outer connecting conductors 5A, 5B and the inner connecting conductor layers 50, 51.

On the other hand, the second terminal conductors 4A, 4B and second outer connecting conductors 6A, 6B are formed by the same number (2 each) on the second side face L1b of the multilayer body L1. Further, the second outer connecting conductors 6A and 6B are formed adjacent to the second terminal conductors 4A and 4B, respectively, whereas the second terminal conductors 4A and 4B are formed adjacent to the second outer connecting conductors 6A and 6B, respectively. Therefore, a remarkable canceling effect is obtained in a magnetic field caused by a current flowing between the second terminal conductors 4A, 4B and the inner connecting conductor layers 50, 51 and a magnetic field caused by a current flowing between the second outer connecting conductors 6A, 6B and the second inner electrodes 40 to 43 and a current flowing between the second outer connecting conductors 6A, 6B and the inner connecting conductor layers 50, 51.

As a result, the multilayer capacitor C1 can reduce its equivalent series inductance further remarkably.

In the multilayer capacitor C1, about the center axis Ax1 of the multilayer body L1, the first terminal conductors 3A and 3B are formed at positions axisymmetrical to the second terminal conductors 4A and 4B, respectively, and the first outer connecting conductors 5A and 5B are formed at positions axisymmetrical to the second outer connecting conductors 6A and 6B, respectively. Therefore, even when the multilayer capacitor C1 is rotated by 180 degrees about the center axis Ax1 on the substrate or the like, the state of connection of the land patterns to the terminal conductors and outer connecting conductors is unchanged. Namely, even when the multilayer capacitor C1 is mounted after being rotated by 180 degrees about the center axis Ax1 of the multilayer body L1 from the state where the multilayer capacitor C1 is mounted as shown in FIG. 3, the first terminal conductor 3A, first terminal conductor 3B, second terminal conductor 4A, and second terminal conductor 4B are connected to the land patterns B2, B1, A2, and A1, respectively, so that the outer connecting conductors are kept from being directly connected to the land patterns.

In the multilayer capacitor C1, the first terminal conductor 3A, first terminal conductor 3B, first outer connecting conductor 5A, and first outer connecting conductor 5B oppose the second terminal conductor 4A, second terminal conductor 4B, second outer connecting conductor 6A, and second outer connecting conductor 6B, respectively, in the opposing direction of the first side face L1a and second side face L1b of the multilayer body L1. Therefore, even when the multilayer capacitor C1 is reversed such that it is mounted to a substrate or the like by a side face opposite from the original surface, the relationship of connection of the land patterns to the terminal conductors and outer connecting conductors is unchanged. Namely, even when the multilayer capacitor C1 is reversed about an axis parallel to the side faces L1a to L1d from the state mounted as shown in FIG. 3, the first terminal conductor 3A, first terminal conductor 3B, second terminal conductor 4A, and second terminal conductor 4B are connected to the land patterns B1, B2, A1, and A2, respectively, so that the outer connecting conductors are kept from being directly connected to the land patterns.

Further, even when the multilayer capacitor C1 is reversed about an axis orthogonal to the side faces L1a, L1b from the state mounted as shown in FIG. 3, the first terminal conductor 3A, first terminal conductor 3B, second terminal conductor 4A, and second terminal conductor 4B are connected to the land patterns A2, A1, B2, and B1, respectively, so that the outer connecting conductors are kept from being directly connected to the land patterns.

Since the terminal conductors 3A, 3B, 4A, 4B and outer connecting conductors 5A, 5B, 6A, 6B are arranged as mentioned above, the multilayer capacitor C1 can be mounted in conformity to various mounting directions. Therefore, the multilayer capacitor C1 can be mounted easily.

Second Embodiment

Figure 4:
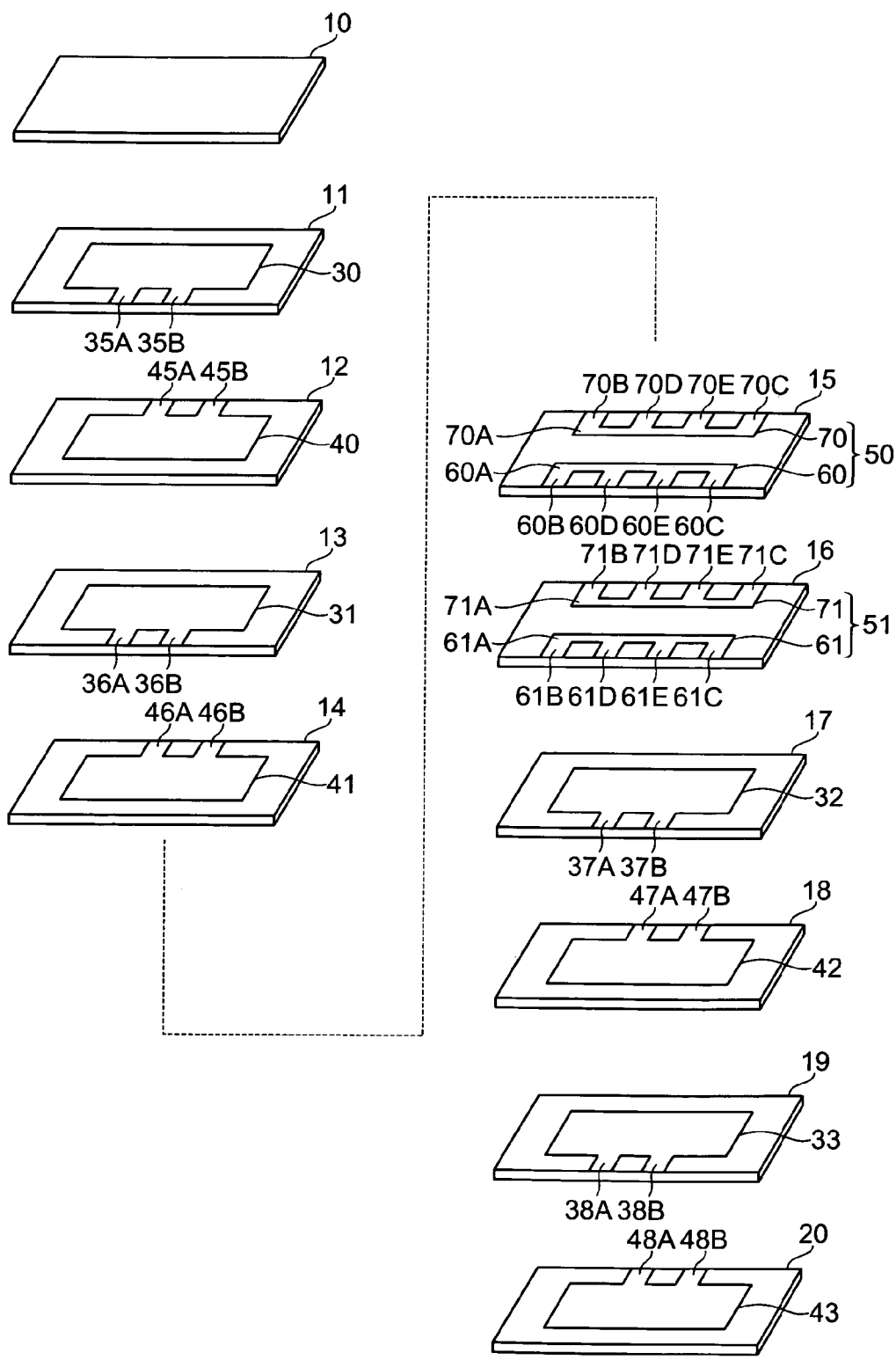
FIG. 4 is an exploded perspective view of the multilayer body included in the multilayer capacitor in accordance with a second embodiment.

With reference to FIG. 4, the configuration of the multilayer capacitor in accordance with a second embodiment will be explained. The multilayer capacitor in accordance with the second embodiment differs from the multilayer capacitor C1 in accordance with the first embodiment in terms of positions of the inner connecting conductor layers 50, 51 in the laminating direction. FIG. 4 is an exploded perspective view of the multilayer body included in the multilayer capacitor in accordance with the second embodiment.

As with the multilayer capacitor C1, the multilayer capacitor in accordance with the second embodiment comprises a multilayer body, first terminal conductors 3A, 3B formed on the multilayer body, second terminal conductors 4A, 4B similarly formed on the multilayer body, first outer connecting conductors 5A, 5B similarly formed on the multilayer body, and second outer connecting conductors 6A, 6B similarly formed on the multilayer body, though they are not depicted.

In the multilayer capacitor in accordance with the second embodiment, the two inner connecting conductor layers 50, 51 are laminated between two layers each of first and second inner electrodes 30, 31, 40, 41 and two layers each of first and second inner electrodes 32, 33, 42, 43 as shown in FIG. 4. More specifically, the inner connecting conductor layer 50 is positioned so as to be held between dielectric layers 14 and 15. The inner connecting conductor layer 51 is positioned so as to be held between dielectric layers 15 and 16.

In the multilayer capacitor in accordance with the second embodiment, the first and second inner connecting conductors 50, 60 are laminated in the multilayer body such that the multilayer body includes at least one set (4 sets in this embodiment) of first and second inner electrodes neighboring each other with the dielectric layer in between. Specifically, the first and second inner connecting conductors 50, 60 are laminated in the multilayer body such that the multilayer body includes the first inner electrode 30 and second inner electrode 40 neighboring each other with the dielectric layer 11 in between, for example.

In the multilayer capacitor in accordance with the second embodiment, the first terminal conductors 3A, 3B are connected to the first inner electrodes 30 to 33 not directly, but electrically through the first outer connecting conductors 5A, 5B and the first inner connecting conductors 60, 61 of the inner connecting conductor layers 50, 51. Also, in the multilayer capacitor in accordance with the second embodiment, the second terminal conductors 4A, 4B are connected to the second inner electrodes 40 to 43 not directly, but electrically through the second outer connecting conductors 6A, 6B and the second inner connecting conductors 70, 71 of the inner connecting conductor layers 50, 51. As a consequence, the multilayer capacitor in accordance with the second embodiment yields an equivalent series resistance greater than that of the conventional multilayer capacitor in which all the inner electrodes are connected to their corresponding terminal conductors through lead conductors.

Meanwhile, when the first terminal conductors 3A, 3B are concerned, the multilayer capacitor in accordance with the second embodiment differs from the multilayer capacitor C1 in accordance with the first embodiment in how the respective resistance components of the first outer connecting conductors 5A, 5B are connected to the first terminal conductors 3A, 3B. In the multilayer capacitor C1 in accordance with the first embodiment, the respective resistance components of the first outer connecting conductors 5A, 5B are connected in series to the first inner connecting conductor layers 50, 51, so as to be connected to the first terminal conductors 3A, 3B. In the multilayer capacitor in accordance with the second embodiment, on the other hand, each of the resistance components of the first outer connecting conductors 5A, 5B is split at the inner connecting conductor layers 50, 51 as boundaries, and the resulting resistance components are connected in parallel to their corresponding first terminal conductors 3A, 3B.

When the second terminal conductors 4A, 4B are concerned, the multilayer capacitor in accordance with the second embodiment differs from the multilayer capacitor C1 in accordance with the first embodiment in how the respective resistance components of the second outer connecting conductors 6A, 6B are connected to the second terminal conductors 4A, 4B. In the multilayer capacitor C1 in accordance with the first embodiment, the respective resistance components of the second outer connecting conductors 6A, 6B are connected in series to the inner connecting conductor layers 50, 51, so as to be connected to the second terminal conductors 4A, 4B. In the multilayer capacitor in accordance with the second embodiment, on the other hand, each of the resistance components of the second outer connecting conductors 6A, 6B is split at the inner connecting conductor layers 50, 51 as boundaries, and the resulting resistance components are connected in parallel to their corresponding second terminal conductors 4A, 4B.

Therefore, because of the difference in resistance components of the first and second outer connecting conductors 5A, 5B, 6A, 6B, the multilayer capacitor in accordance with the second embodiment yields an equivalent series resistance smaller than that of the multilayer capacitor C1 in accordance with the first embodiment.

As in the foregoing, by adjusting the positions of the inner connecting conductor layers 50, 51 directly connected to the first terminal conductors 3A, 3B and second terminal conductors 4A, 4B in the laminating direction, this embodiment sets the equivalent series resistance of the multilayer capacitor to a desirable value, and thus can regulate the equivalent series resistance easily with a high precision. Also, since the equivalent series resistance is controlled by the first and second inner connecting conductors, the multilayer capacitor in accordance with the second embodiment can regulate the equivalent series resistance while setting its capacitance to a desirable value (e.g., a larger value).

All the outer conductors (first and second terminal conductors 3A, 3B, 4A, 4B and first and second outer connecting conductors 5A, 5B, 6A, 6B) in the multilayer capacitor in accordance with the second embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the second embodiment can be made easily.

The first conductor portion 60A of the first inner connecting conductor 60 of the inner connecting conductor layer 50 opposes the second inner electrode 41 with the dielectric layer 14 in between. The first conductor portion 71A of the second inner connecting conductor 71 of the inner connecting conductor layer 51 opposes the first inner electrode 32 with the dielectric layer 16 in between. Therefore, the inner connecting conductor layers 50, 51 can also contribute to forming the capacity component, and thus can further increase the capacitance of the multilayer capacitor.

The first terminal conductors 3A, 3B and the first outer connecting conductors 5A, 5B are formed adjacent to each other, respectively, on the first side face of the multilayer body in the multilayer capacitor in accordance with the second embodiment as in the multilayer capacitor C1. Therefore, the multilayer capacitor in accordance with the second embodiment can lower its equivalent series inductance.

The second terminal conductors 4A, 4B and the second outer connecting conductors 6A, 6B are formed adjacent to each other, respectively, on the second side face of the multilayer body in the multilayer capacitor in accordance with the second embodiment as in the multilayer capacitor C1. Therefore, the multilayer capacitor in accordance with the second embodiment can lower its equivalent series inductance.

In the multilayer capacitor in accordance with the second embodiment, the first terminal conductors 3A, 3B and first outer connecting conductors 5A, 5B are arranged by the same number while forming neighboring pairs on the first side face of the multilayer body. Also, in the multilayer capacitor in accordance with the second embodiment, the second terminal conductors 4A, 4B and second outer connecting conductors 6A, 6B are arranged by the same number while forming neighboring pairs on the second side face of the multilayer body. Therefore, the multilayer capacitor in accordance with the second embodiment can lower its equivalent series inductance further greatly.

In the multilayer capacitor in accordance with the second embodiment, about the center axis of the multilayer body, the first terminal conductors 3A, 3B are formed at positions axisymmetrical to the second terminal conductors 4B, 4A, respectively, and the first outer connecting conductors 5A, 5B are formed at positions axisymmetrical to the second outer connecting conductors 6B, 6A, respectively. Also, in the opposing direction of the first and second side faces of the multilayer body in the multilayer capacitor in accordance with the second embodiment, the first terminal conductors 3A, 3B oppose the second terminal conductors 4A, 4B, respectively, and the first outer connecting conductors 5A, 5B oppose the second outer connecting conductors 6A, 6B, respectively. Therefore, the multilayer capacitor in accordance with the second embodiment can be mounted easily.

Third Embodiment

Figure 5:
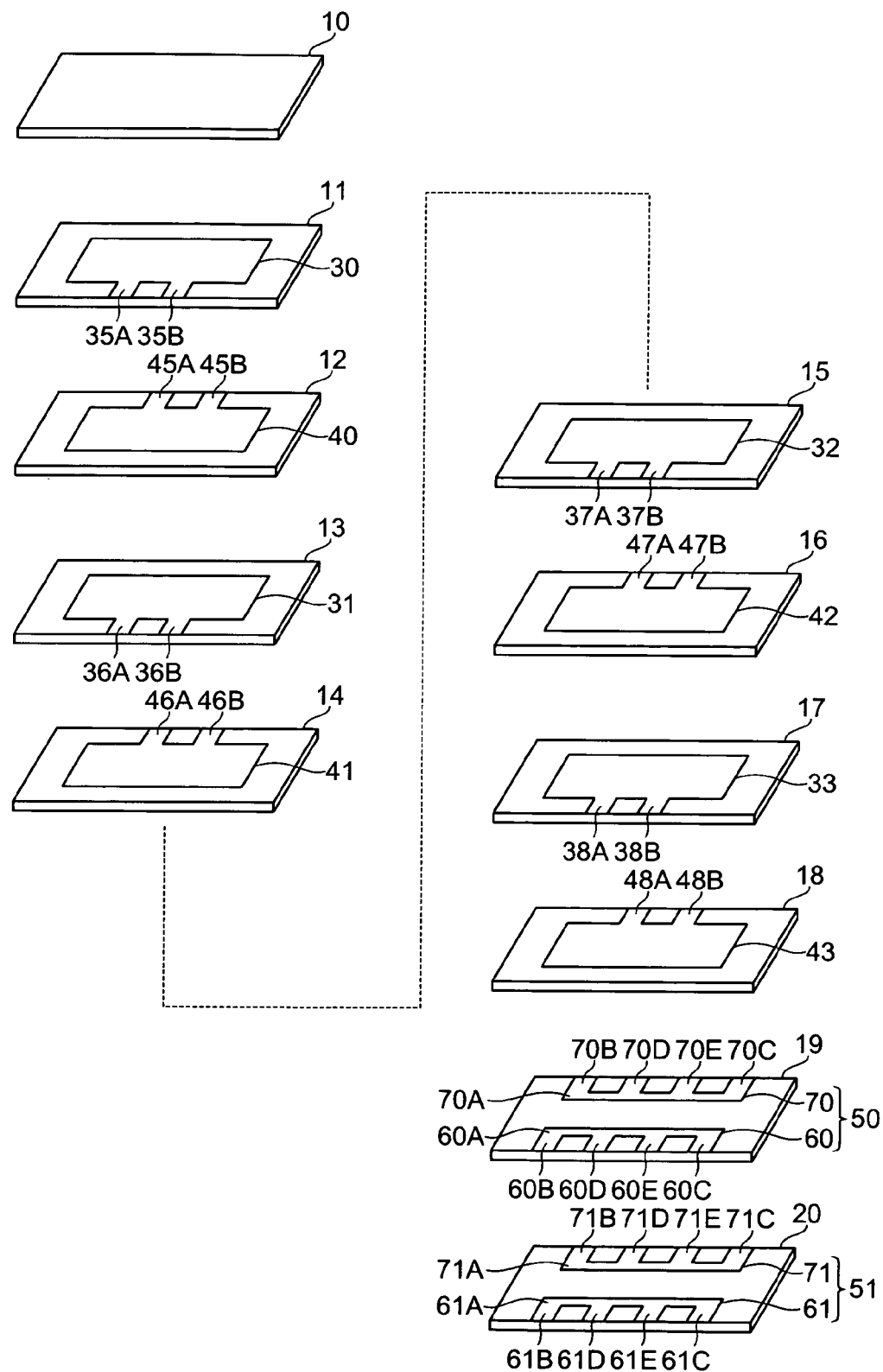
FIG. 5 is an exploded perspective view of the multilayer body included in the multilayer capacitor in accordance with a third embodiment.

The configuration of the multilayer capacitor in accordance with a third embodiment will be explained with reference to FIG. 5. The multilayer capacitor in accordance with the third embodiment differs from the multilayer capacitor C1 in accordance with the first embodiment in terms of positions of the inner connecting conductor layers 50, 51 in the laminating direction. FIG. 5 is an exploded perspective view of the multilayer body included in the multilayer capacitor in accordance with the third embodiment.

As with the multilayer capacitor C1 in accordance with the first embodiment, the multilayer capacitor in accordance with the third embodiment comprises a multilayer body, first terminal conductors 3A, 3B formed on the multilayer body, second terminal conductors 4A, 4B similarly formed on the multilayer body, first outer connecting conductors 5A, 5B similarly formed on the multilayer body, and second outer connecting conductors 6A, 6B similarly formed on the multilayer body, though they are not depicted.

In the multilayer capacitor in accordance with the third embodiment, as shown in FIG. 5, the two inner connecting conductor layers 50, 51 are laminated under a multilayer body of four layers each of first and second inner electrodes 30 to 33, 40 to 43. More specifically, the inner connecting conductor layer 50 is positioned so as to be held between dielectric layers 18 and 19. The inner connecting conductor layer 51 is positioned so as to be held between dielectric layers 19 and 20.

In the multilayer capacitor in accordance with the third embodiment, the inner connecting conductor layers 50, 51 are laminated in the multilayer body such that the multilayer body includes at least one set (4 sets in this embodiment) of first and second inner electrodes neighboring each other with the dielectric layer in between. Specifically, the inner connecting conductor layers 50, 51 are laminated in the multilayer body such that the multilayer body includes the first inner electrode 30 and second inner electrode 40 neighboring each other with the dielectric layer 11 in between, for example.

In the multilayer capacitor in accordance with the third embodiment, the first terminal conductors 3A, 3B are connected to the first inner electrodes 30 to 33 not directly, but electrically through the first outer connecting conductors 5A, 5B and the first inner connecting conductor 60, 61 of the inner connecting conductor layers 50, 51. Also, in the multilayer capacitor in accordance with the third embodiment, the second terminal conductors 4A, 4B are connected to the second inner electrodes 40 to 43 not directly, but electrically through the second outer connecting conductors 6A, 6B and the second inner connecting conductor 70, 71 of the inner connecting conductor layers 50, 51. As a result, the multilayer capacitor in accordance with the third embodiment yields an equivalent series resistance greater than that of the conventional multilayer capacitor in which all the inner electrodes are connected to their corresponding terminal conductors through lead conductors.

Meanwhile, when the first terminal conductors 3A, 3B are concerned, the multilayer capacitor in accordance with the third embodiment differs from the multilayer capacitor C1 in accordance with the first embodiment in how the respective resistance components of the first outer connecting conductors 5A, 5B are connected to the first terminal conductors 3A, 3B. In the multilayer capacitor C1 in accordance with the first embodiment, the respective resistance components of the first outer connecting conductors 5A, 5B are connected in series to the first inner connecting conductor layers 50, 51. In the multilayer capacitor in accordance with the third embodiment, on the other hand, each of the resistance components of the first outer connecting conductors 5A, 5B is split at the inner connecting conductor layer 50 as a boundary, and the resulting resistance components are connected in parallel to their corresponding first terminal conductors 3A, 3B.

When the second terminal conductors 4A, 4B are concerned, the multilayer capacitor in accordance with the third embodiment differs from the multilayer capacitor C1 in accordance with the first embodiment in how the respective resistance components of the second outer connecting conductors 6A, 6B are connected to the second terminal conductors 4A, 4B. In the multilayer capacitor C1 in accordance with the first embodiment, the respective resistance components of the second outer connecting conductors 6A, 6B are connected in series to the inner connecting conductor layers 50, 51. In the multilayer capacitor in accordance with the third embodiment, on the other hand, each of the resistance components of the second outer connecting conductors 6A, 6B is split at the inner connecting conductor layer 50, 51 as boundaries, and the resulting resistance components are connected in parallel to their corresponding second terminal conductors 6A, 6B.

Therefore, because of the difference in resistance components of the first and second outer connecting conductors 5A, 5B, 6A, 6B, the multilayer capacitor in accordance with the third embodiment yields an equivalent series resistance smaller than that of the multilayer capacitor C1 in accordance with the first embodiment.

As in the foregoing, by adjusting the positions of the inner connecting conductor layers 50, 51 directly connected to the first and second terminal conductors 3A, 3B, 4A, 4B in the laminating direction, this embodiment sets the equivalent series resistance of the multilayer capacitor to a desirable value, and thus can regulate the equivalent series resistance easily with a high precision. Also, since the equivalent series resistance is controlled by the inner connecting conductor layers, the multilayer capacitor in accordance with the third embodiment can regulate the equivalent series resistance while setting its capacitance to a desirable value (e.g., a larger value).

All the outer conductors (first and second terminal conductors 3A, 3B, 4A, 4B and first and second outer connecting conductors 5A, 5B, 6A, 6B) in the multilayer capacitor in accordance with the third embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the third embodiment can be made easily.

The first conductor portion 60A of the first inner connecting conductor 60 of the inner connecting conductor layer 50 opposes the second inner electrode 43 with the dielectric layer 18 in between. Therefore, in the multilayer capacitor in accordance with the third embodiment, the inner connecting conductor layer 50 can also contributes to forming the capacity component, and thus can further increase the capacitance of the multilayer capacitor.

The first terminal conductors 3A, 3B and the first outer connecting conductors 5A, 5B are formed adjacent to each other, respectively, on the first side face of the multilayer body in the multilayer capacitor in accordance with the third embodiment as in the multilayer capacitor C1. Therefore, the multilayer capacitor in accordance with the third embodiment can lower its equivalent series inductance.

The second terminal conductors 4A, 4B and the second outer connecting conductors 6A, 6B are formed adjacent to each other, respectively, on the second side face of the multilayer body in the multilayer capacitor in accordance with the third embodiment as in the multilayer capacitor C1. Therefore, the multilayer capacitor in accordance with the third embodiment can lower its equivalent series inductance.

In the multilayer capacitor in accordance with the third embodiment, the first terminal conductors 3A, 3B and first outer connecting conductors 5A, 5B are arranged by the same number while forming neighboring pairs on the first side face of the multilayer body. Also, in the multilayer capacitor in accordance with the third embodiment, the second terminal conductors 4A, 4B and second outer connecting conductors 6A, 6B are arranged by the same number while forming neighboring pairs on the second side face of the multilayer body. Therefore, the multilayer capacitor in accordance with the third embodiment can lower its equivalent series inductance more greatly.

In the multilayer capacitor in accordance with the third embodiment, about the center axis of the multilayer body, the first terminal conductors 3A, 3B are formed at positions axisymmetrical to the second terminal conductors 4B, 4A, respectively, and the first outer connecting conductors 5A, 5B are formed at positions axisymmetrical to the second outer connecting conductors 6B, 6A, respectively. Also, in the opposing direction of the first and second side faces of the multilayer body in the multilayer capacitor in accordance with the third embodiment, the first terminal conductors 3A, 3B oppose the second terminal conductors 4A, 4B, respectively, and the first outer connecting conductors 5A, 5B oppose the second outer connecting conductors 6A, 6B, respectively. Therefore, the multilayer capacitor in accordance with the third embodiment can be mounted easily.

Fourth Embodiment

Figure 6:
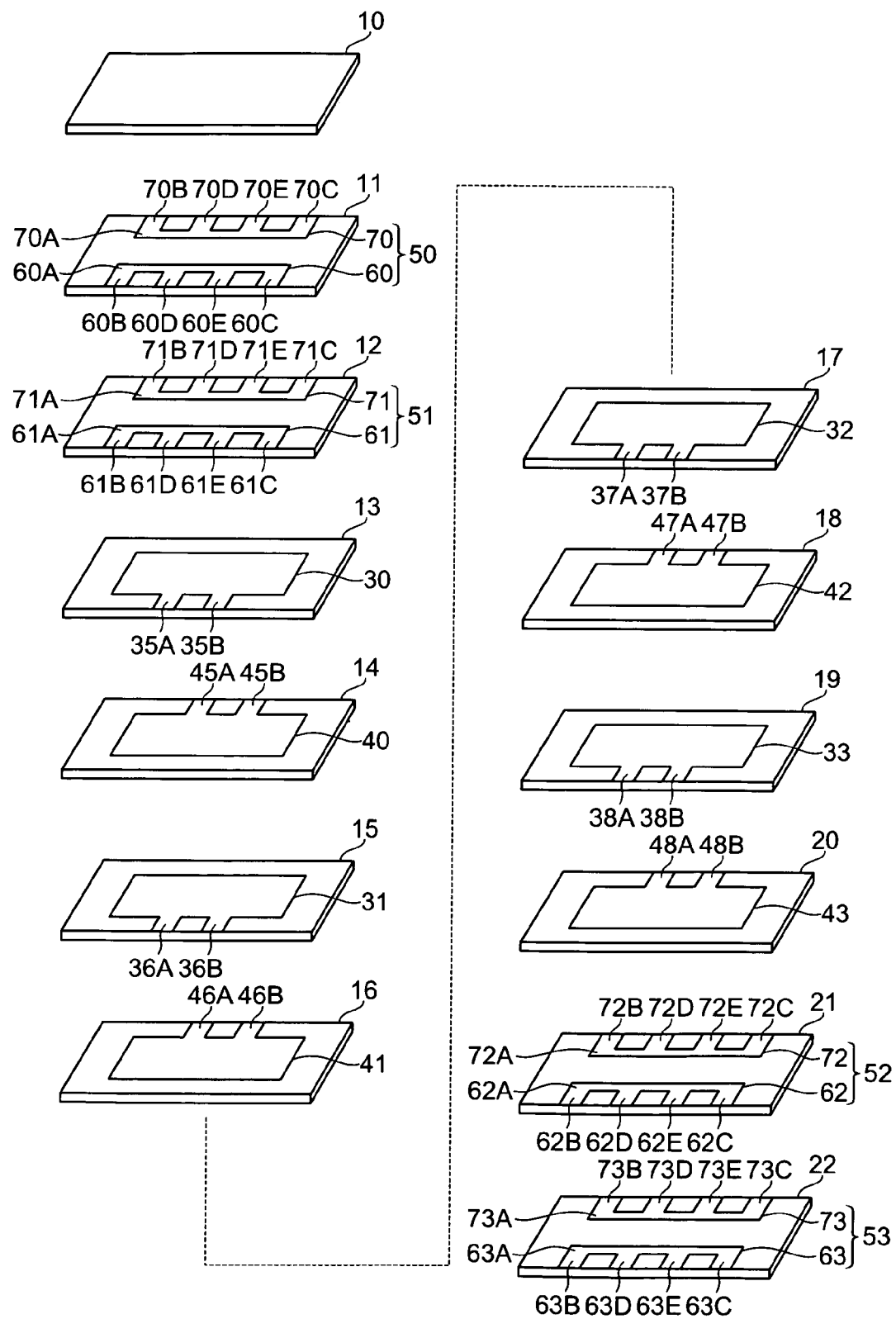
FIG. 6 is an exploded perspective view of the multilayer body included in the multilayer capacitor in accordance with a fourth embodiment.

The configuration of the multilayer capacitor in accordance with a fourth embodiment will be explained with reference to FIG. 6. The multilayer capacitor in accordance with the fourth embodiment differs from the multilayer capacitor C1 in accordance with the first embodiment in terms of the number of inner connecting conductor layers. FIG. 6 is an exploded perspective view of the multilayer body included in the multilayer capacitor in accordance with the fourth embodiment.

As with the multilayer capacitor C1, the multilayer capacitor in accordance with the fourth embodiment comprises a multilayer body, first terminal conductors 3A, 3B formed on the multilayer body, second terminal conductors 4A, 4B similarly formed on the multilayer body, first outer connecting conductors 5A, 5B similarly formed on the multilayer body, and second outer connecting conductors 6A, 6B similarly formed on the multilayer body, though they are not depicted.

The multilayer capacitor in accordance with the fourth embodiment is constructed by alternately laminating a plurality of (13 in this embodiment) dielectric layers 10 to 22 and a plurality of (4 each in this embodiment) of first and second inner electrodes 30 to 33, 40 to 43 as shown in FIG. 6.

In the multilayer body of the multilayer capacitor in accordance with the fourth embodiment, a plurality of (4 in this embodiment) inner connecting conductor layers 50, 51, 52, 53 are laminated. In the multilayer body of the multilayer capacitor in accordance with the fourth embodiment, the four layers of first inner electrodes 30 to 33 and four layers of second inner electrodes 40 to 43 are arranged between the two inner connecting conductor layers 50, 51 and two inner connecting conductor layers 52, 53.

The inner connecting conductor layer 50 is positioned so as to be held between the dielectric layers 10 and 11. The inner connecting conductor layer 51 is positioned so as to be held between the dielectric layers 11 and 12. The inner connecting conductor layer 52 is positioned so as to be held between the dielectric layers 20 and 21. The inner connecting conductor layer 53 is positioned so as to be held between the dielectric layers 21 and 22. The inner connecting conductor layers 50 to 53 include their corresponding first inner connecting conductors 60 to 63 and second inner connecting conductors 70 to 73 which are electrically insulated from each other.

In the multilayer capacitor in accordance with the fourth embodiment, the inner connecting conductor layers 50 to 53 are laminated in the multilayer body such that the multilayer body includes at least one set (4 sets in this embodiment) of first and second inner electrodes neighboring each other with the dielectric layer in between. Specifically, the inner connecting conductor layers 50 to 53 are laminated in the multilayer body such that the multilayer body includes the first inner electrode 30 and second inner electrode 40 neighboring each other with the dielectric layer 13 in between, for example.

In the multilayer capacitor in accordance with the fourth embodiment, the first terminal conductors 3A, 3B are connected to the first inner electrodes 30 to 33 not directly, but electrically through the first outer connecting conductors 5A, 5B and the first inner connecting conductors 60 to 63 of the inner connecting conductor layers 50 to 53. Also, in the multilayer capacitor in accordance with the fourth embodiment, the second terminal conductors 4A, 4B are connected to the second inner electrodes 40 to 43 not directly, but electrically through the second outer connecting conductors 6A, 6B and the second inner connecting conductors 70 to 73 of the inner connecting conductor layers 50 to 53. As a consequence, the multilayer capacitor in accordance with the fourth embodiment yields an equivalent series resistance greater than that of the conventional multilayer capacitor in which all the inner electrodes are connected to their corresponding terminal conductors through lead conductors.

As compared with the multilayer capacitor C1, the multilayer capacitor in accordance with the fourth embodiment has a greater number of inner connecting conductor layers 50 to 53, whereas the first inner connecting conductors 60 to 63 of the inner connecting conductor layers 50 to 53 are connected in parallel to their corresponding first terminal conductors 3A, 3B. Also, the second inner connecting conductors 70 to 73 of the inner connecting conductor layers 50 to 53 are connected in parallel to their corresponding second terminal conductors 4A, 4B. Therefore, the multilayer capacitor in accordance with the fourth embodiment yields an equivalent series resistance smaller than that of the multilayer capacitor C1.

As in the foregoing, by adjusting the number of inner connecting conductor layers 50 to 53 directly connected to the first and second terminal conductors 3A, 3B, 4A, 4B, this embodiment sets the equivalent series resistance of the multilayer capacitor to a desirable value, and thus can regulate the equivalent series resistance easily with a high precision. Also, since the equivalent series resistance is controlled by the inner connecting conductor layers, the multilayer capacitor in accordance with the fourth embodiment can regulate the equivalent series resistance while setting its capacitance to a desirable value (e.g., a larger value).

All the outer conductors (first and second terminal conductors 3A, 3B, 4A, 4B and first and second outer connecting conductors 5A, 5B, 6A, 6B) in the multilayer capacitor in accordance with the fourth embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the fourth embodiment can be made easily.

The first conductor portion 71A of the second inner connecting conductor 71 of the inner connecting conductor layer 51 opposes the first inner electrode 30 with the dielectric layer 12 in between. The first conductor portion 62A of the first inner connecting conductor 62 of the inner connecting conductor layer 52 opposes the second inner electrode 43 with the dielectric layer 20 in between. Therefore, in the multilayer capacitor in accordance with the fourth embodiment, the first and second inner connecting conductors 51, 52 also contribute to forming the capacity component, and thus can further increase the capacitance of the multilayer capacitor.

Since a plurality of first and second inner electrodes 30 to 33, 40 to 43 are arranged between the first and second inner connecting conductor layers 50, 51 and the two inner connecting conductor layers 52, 53, the multilayer body of the multilayer capacitor in accordance with the fourth embodiment can set the equivalent series resistance with a favorable balance.

The first terminal conductors 3A, 3B and the first outer connecting conductors 5A, 5B are formed adjacent to each other, respectively, on the first side face of the multilayer body in the multilayer capacitor in accordance with the fourth embodiment as in the multilayer capacitor C1. Therefore, the multilayer capacitor in accordance with the fourth embodiment can lower its equivalent series inductance.

The second terminal conductors 4A, 4B and the second outer connecting conductors 6A, 6B are formed adjacent to each other, respectively, on the second side face of the multilayer body in the multilayer capacitor in accordance with the fourth embodiment as in the multilayer capacitor C1. Therefore, the multilayer capacitor in accordance with the fourth embodiment can lower its equivalent series inductance.

In the multilayer capacitor in accordance with the fourth embodiment, the first terminal conductors 3A, 3B and first outer connecting conductors 5A, 5B are arranged by the same number while forming neighboring pairs on the first side face of the multilayer body. Also, in the multilayer capacitor in accordance with the fourth embodiment, the second terminal conductors 4A, 4B and second outer connecting conductors 6A, 6B are arranged by the same number while forming neighboring pairs on the second side face of the multilayer body. Therefore, the multilayer capacitor in accordance with the fourth embodiment can lower its equivalent series inductance more greatly.

In the multilayer capacitor in accordance with the fourth embodiment, about the center axis of the multilayer body, the first terminal conductors 3A, 3B are formed at positions axisymmetrical to the second terminal conductors 4B, 4A, respectively, and the first outer connecting conductors 5A, 5B are formed at positions axisymmetrical to the second outer connecting conductors 6B, 6A, respectively. Also, in the opposing direction of the first and second side faces of the multilayer body in the multilayer capacitor in accordance with the fourth embodiment, the first terminal conductors 3A, 3B oppose the second terminal conductors 4A, 4B, respectively, and the first outer connecting conductors 5A, 5B oppose the second outer connecting conductors 6A, 6B, respectively. Therefore, the multilayer capacitor in accordance with the fourth embodiment can be mounted easily.

Fifth Embodiment

Figure 7:
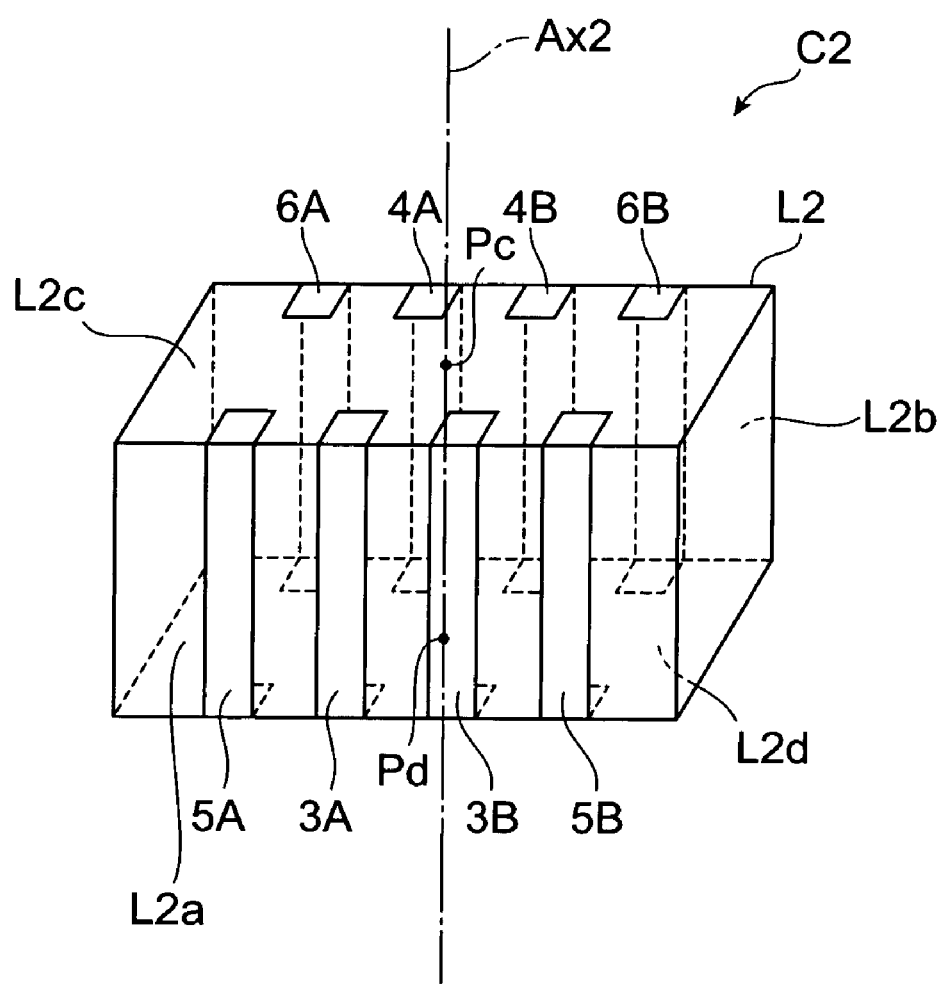
FIG. 7 is a perspective view of the multilayer capacitor in accordance with a fifth embodiment.
Figure 8:
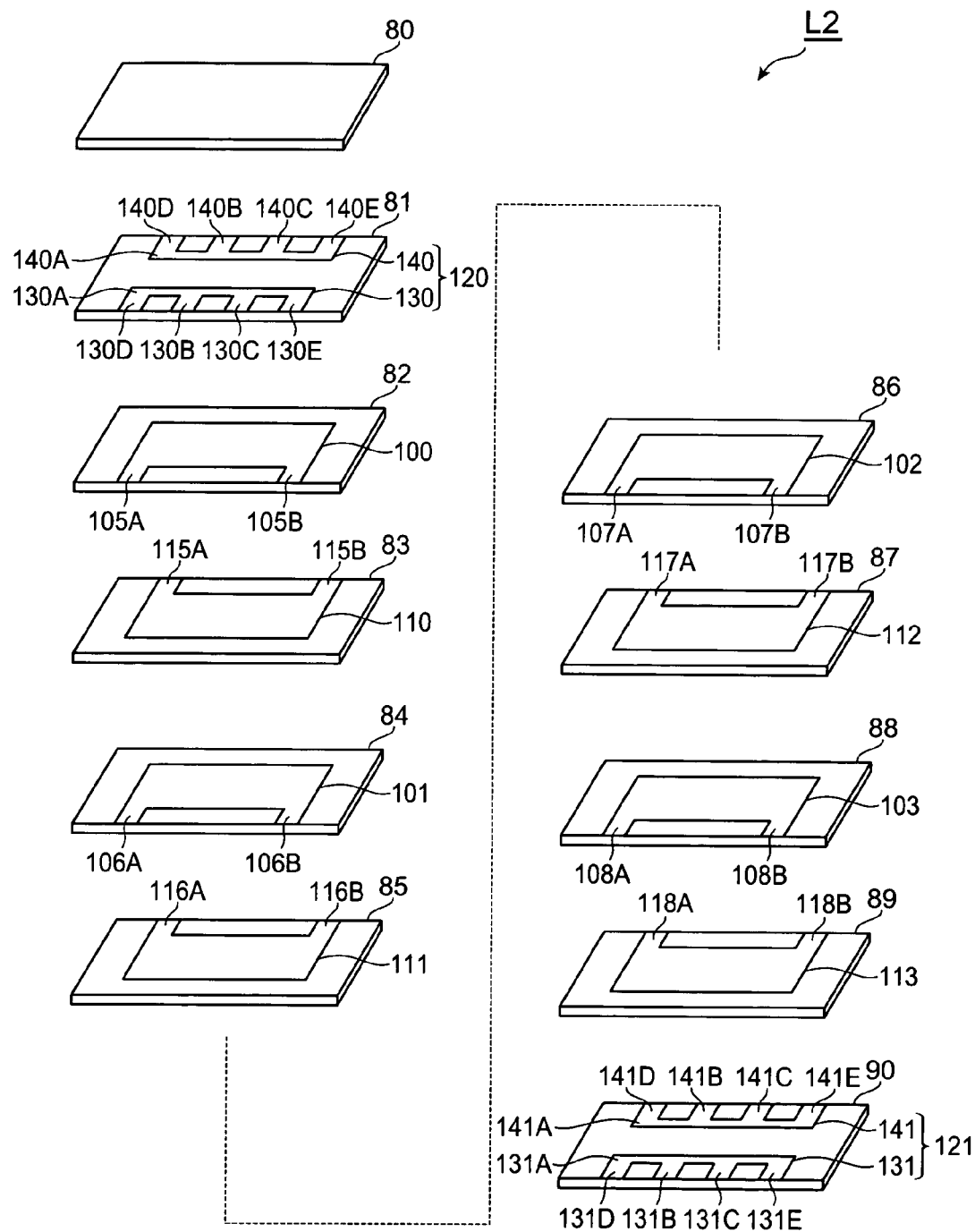
FIG. 8 is an exploded perspective view of the multilayer body included in the multilayer capacitor in accordance with the fifth embodiment.

The configuration of the multilayer capacitor C2 in accordance with a fifth embodiment will be explained with reference to FIGS. 7 and 8. The multilayer capacitor in accordance with the fifth embodiment differs from the multilayer capacitor C1 in accordance with the first embodiment in terms of arrangement of outer conductors formed on the first and second side faces of the multilayer body. FIG. 7 is a perspective view of the multilayer capacitor in accordance with the fifth embodiment. FIG. 8 is an exploded perspective view of the multilayer body included in the multilayer capacitor in accordance with the fifth embodiment.

As shown in FIG. 7, the multilayer capacitor C2 in accordance with the fifth embodiment comprises a multilayer body L2, first terminal conductors 3A, 3B formed on the multilayer body L2, second terminal conductors 4A, 4B similarly formed on the multilayer body, first outer connecting conductors 5A, 5B similarly formed on the multilayer body, and second outer connecting conductors 6A, 6B similarly formed on the multilayer body.

Each of the first terminal conductors 3A, 3B and first outer connecting conductors 5A, 5B is positioned on a first side face L2a which is a side face extending along the longitudinal axis of faces L2c, L2d orthogonal to the laminating direction of the multilayer body L2 among side faces parallel to the laminating direction of the multilayer body. The first terminal conductors 3A, 3B and first outer connecting conductors 5A, 5B are formed such that the first outer connecting conductor 5A, first terminal conductor 3A, first terminal conductor 3B, and first outer connecting conductor 5B are successively arranged from the left side to right side of FIG. 7.

Therefore, the first terminal conductor 3A and first outer connecting conductor 5A are formed adjacent to each other on the first side face L2a that is the same side face of the multilayer body L2. The first terminal conductor 3B and first outer connecting conductor 5B are formed adjacent to each other on the first side face L2a that is the same side face of the multilayer body L2.

Each of the second terminal conductors 4A, 4B and second outer connecting conductors 6A, 6B is positioned on a second side face L2b which is a side face extending along the longitudinal axis of faces L2c, L2d orthogonal to the laminating direction of the multilayer body L2 among side faces parallel to the laminating direction of the multilayer body while opposing the first side face L2a. The second terminal conductors 4A, 4B and second outer connecting conductors 6A, 6B are formed such that the second outer connecting conductor 6A, second terminal conductor 4A, second terminal conductor 4B, and second outer connecting conductor 6B are successively arranged from the left side to right side of FIG. 7.

Therefore, the second terminal conductor 4A and second outer connecting conductor 6A are formed adjacent to each other on the second side face L2b that is the same side face of the multilayer body L2. The second terminal conductor 4B and second outer connecting conductor 6B are formed adjacent to each other on the second side face L2b that is the same side face of the multilayer body L2.

The first terminal conductor 3A and second terminal conductor 4B are axisymmetrical to each other about a center axis Ax2 passing respective center points Pc, Pd of the two side faces L2c, L2d orthogonal to the laminating direction of the multilayer body L2 among center axes of the multilayer body L2. The first terminal conductor 3B and second terminal conductor 4A are axisymmetrical to each other about the center axis Ax2 of the multilayer body L2. The first outer connecting conductor 5A and second outer connecting conductor 6B are axisymmetrical to each other about the center axis Ax2 of the multilayer body L2. The first outer connecting conductor 5B and second outer connecting conductor 6A are axisymmetrical to each other about the center axis Ax2 of the multilayer body L2.

The first terminal conductor 3A and second terminal conductor 4A oppose each other in a direction along which the first side face L2a and second side face L2b of the multilayer body L2 oppose each other. The first terminal conductor 3B and second terminal conductor 4B oppose each other in the opposing direction of the first side face L2a and second side face L2b of the multilayer body L2. The first outer connecting conductor 5A and second outer connecting conductor 6A oppose each other in the opposing direction of the first side face L2a and second side face L2b of the multilayer body L2. The first outer connecting conductor 5B and second outer connecting conductor 6B oppose each other in the opposing direction of the first side face L2a and second side face L2b of the multilayer body L2.

As shown in FIG. 8, the multilayer body L2 is constructed by alternately laminating a plurality of (11 in this embodiment) dielectric layers 80 to 90 and a plurality of (4 each in this embodiment) of first and second inner electrodes 100 to 103, 110 to 113. In the actual multilayer capacitor C2, they are integrated to such an extent that no boundaries are discernible between the dielectric layers 80 to 90.

A plurality of (2 in this embodiment) inner connecting conductor layers 120, 121 are laminated in the multilayer body L2. In the multilayer body L2, the plurality of first inner electrodes 100 to 103 and the plurality of second inner electrodes 110 to 113 are arranged between the inner connecting conductor layers 120, 121.

Each of the first inner electrodes 100 to 103 has a substantially rectangular form. The plurality of first inner electrodes 100 to 103 are formed at respective positions separated by a predetermined distance from a side face parallel to the laminating direction of the dielectric layers 80 to 90 (hereinafter simply referred to as "laminating direction") in the multilayer body L2.

Each of lead conductors 105A, 105B is integrally formed with the first inner electrode 100 so as to extend therefrom and reach the first side face L2a of the multilayer body L2. Each of lead conductors 106A, 106B is integrally formed with the first inner electrode 101 so as to extend therefrom and reach the first side face L2a of the multilayer body L2. Each of lead conductors 107A, 107B is integrally formed with the first inner electrode 102 so as to extend therefrom and reach the first side face L2a of the multilayer body L2. Each of lead conductors 108A, 108B is integrally formed with the first inner electrode 103 so as to extend therefrom and reach the first side face L2a of the multilayer body L2.

The first inner electrode 100 is electrically connected to the first outer connecting conductors 5A and 5B through the lead conductors 105A and 105B, respectively. The first inner electrode 101 is electrically connected to the first outer connecting conductors 5A and 5B through the lead conductors 106A and 106B, respectively. The first inner electrode 102 is electrically connected to the first outer connecting conductors 5A and 5B through the lead conductors 107A and 107B, respectively. The first inner electrode 103 is electrically connected to the first outer connecting conductors 5A and 5B through the lead conductors 108A and 108B, respectively. As a consequence, the plurality of first inner electrodes 100 to 103 are electrically connected to each other through the first outer connecting conductors 5A, 5B.

Each of the second inner electrodes 110 to 113 has a substantially rectangular form. The plurality of second inner electrodes 110 to 113 are formed at respective positions separated by a predetermined distance from a side face parallel to the laminating direction of the multilayer body L2.

Each of lead conductors 115A, 115B is integrally formed with the second inner electrode 110 so as to extend therefrom and reach the second side face L2b of the multilayer body L2. Each of lead conductors 116A, 116B is integrally formed with the second inner electrode 111 so as to extend therefrom and reach the second side face L2b of the multilayer body L2. Each of lead conductors 117A, 117B is integrally formed with the second inner electrode 112 so as to extend therefrom and reach the second side face L2b of the multilayer body L2. Each of lead conductors 118A, 118B is integrally formed with the second inner electrode 113 so as to extend therefrom and reach the second side face L2b of the multilayer body L2.

The second inner electrode 110 is electrically connected to the second outer connecting conductors 6A and 6B through the lead conductors 115A and 115B, respectively. The second inner electrode 111 is electrically connected to the second outer connecting conductors 6A and 6B through the lead conductors 116A and 116B, respectively. The second inner electrode 112 is electrically connected to the second outer connecting conductors 6A and 6B through the lead conductors 117A and 117B, respectively. The second inner electrode 113 is electrically connected to the second outer connecting conductors 6A and 6B through the lead conductors 118A and 118B, respectively. As a consequence, the plurality of second inner electrodes 110 to 113 are electrically connected to each other through the first outer connecting conductors 6A, 6B.

The inner connecting conductor layer 120 is positioned so as to be held between the dielectric layers 80 and 81. The inner connecting conductor layer 121 is positioned so as to be held between the dielectric layers 89 and 90. The inner connecting conductor layers 120, 121 include their corresponding first inner connecting conductors 130, 131 and second inner connecting conductors 140, 141 which are electrically insulated from each other.

The first inner connecting conductors 130, 131 include their corresponding first conductor portions 130A, 131B each having an oblong form, and second to fifth conductor portions 130B to 130E, 131B to 131E extending from the first conductor portions 130A, 131A so as to be taken out to the first side face L2a of the multilayer body L2. The first conductor portions 130A, 131A are arranged such that their longitudinal axes are parallel to the first and second side faces L2a, L2b of the multilayer body L2.

Each of the second conductor portions 130B, 131B is electrically connected to the first terminal conductor 3A; each of the third conductor portions 130C, 131C is electrically connected to the first terminal conductor 3B; each of the fourth conductor portions 130D, 131D is electrically connected to the first outer connecting conductor 5A; and each of the fifth conductor portions 130E, 131E is electrically connected to the first outer connecting conductor 5B. Therefore, each of the first inner connecting conductors 130, 131 is electrically connected to the first terminal conductors 3A, 3B and first outer connecting conductors 5A, 5B.

The second inner connecting conductors 140, 141 include their corresponding first conductor portions 140A, 141B each having an oblong form, and second to fifth conductor portions 140B to 140E, 141B to 141E extending from the first conductor portions 140A, 141A so as to be taken out to the second side face L2b of the multilayer body L2. The first conductor portions 140A, 141A are arranged such that their longitudinal axes are parallel to the first and second side faces L2a, L2b of the multilayer body L2.

Each of the second conductor portions 140B, 141B is electrically connected to the second terminal conductor 4A; each of the third conductor portions 140C, 141C is electrically connected to the second terminal conductor 4B; each of the fourth conductor portions 140D, 141D is electrically connected to the second outer connecting conductor 6A; and each of the fifth conductor portions 140E, 141E is electrically connected to the second outer connecting conductor 6B. Therefore, each of the second inner connecting conductors 140, 141 is electrically connected to the second terminal conductors 4A, 4B and second outer connecting conductors 6A, 6B.

The first conductor portion 140A of the second inner connecting conductor 140 of the inner connecting conductor layer 120 is a region opposing the first inner electrode 100 with the dielectric layer 81 in between. The first conductor portion 131A of the first inner connecting conductor 131 of the inner connecting conductor layer 121 is a region opposing the second inner electrode 113 with the dielectric layer 89 in between.

The inner connecting conductor layers 120, 121 are laminated in the multilayer body L2 such that the multilayer body L2 includes at least one set (4 sets in this embodiment) of first and second inner electrodes neighboring each other with the dielectric layer in between.

In the multilayer capacitor C2, the first terminal conductors 3A, 3B are connected to the first inner electrodes 100 to 103 not directly, but electrically through the first outer connecting conductors 5A, 5B and first inner connecting conductors 130, 131 of the inner connecting conductor layers 120, 121. Also, in the multilayer capacitor C2, the second terminal conductors 4A, 4B are connected to the second inner electrodes 110 to 113 not directly, but electrically through the second outer connecting conductors 6A, 6B and second inner connecting conductors 140, 141 of the inner connecting conductor layers 120, 121. As a result, the multilayer capacitor C2 yields an equivalent series resistance greater than that of the conventional multilayer capacitor in which all the inner electrodes are connected to their corresponding terminal conductors through lead conductors.

By adjusting the number of inner connecting conductor layers 120, 121 directly connected to the first terminal conductors 3A, 3B and second terminal conductors 4A, 4B in such a manner, this embodiment sets the equivalent series resistance of the multilayer capacitor C2 to a desirable value, and thus can regulate the equivalent series resistance easily with a high precision. Also, since the equivalent series resistance is controlled by the inner connecting conductor layers, the multilayer capacitor C2 can regulate the equivalent series resistance while setting its capacitance to a desirable value (e.g., a larger value).

All of the first and second terminal conductors 3A, 3B, 4A, 4B and first and second outer connecting conductors 5A, 5B, 6A, 6B, which are outer conductors of the multilayer capacitor C2, are formed on the first and second side faces L2a, L2b of the multilayer body L2 opposing each other. Therefore, as compared with the case where outer conductors are formed on four side faces of the multilayer body L2, the multilayer capacitor C2 can reduce steps required for forming the outer conductors. As a consequence, the multilayer capacitor C2 can be made easily.

The second inner connecting conductor 140 of the inner connecting conductor layer 120 has the first conductor portion 140A that is a region opposing the first inner electrode 100 with the dielectric layer 81 in between. The first inner connecting conductor 131 of the inner connecting conductor layer 121 has the first conductor portion 131A that is a region opposing the second inner electrode 113 with the dielectric layer 89 in between. Therefore, the inner connecting conductor layers 120, 121 can also contribute to forming the capacity component of the multilayer capacitor C2. As a consequence, the multilayer capacitor C2 can further increase its capacitance.

Since a plurality of first and second inner electrodes 100 to 103, 110 to 113 are arranged between the inner connecting conductor layers 120 and 121, the multilayer capacitor C2 can set its equivalent series resistance with a favorable balance.

On the first side face L2a of the multilayer body L2 in the multilayer capacitor C2, the first terminal conductors 3A, 3B are formed adjacent to the first outer connecting conductors 5A and 5B, respectively. Therefore, a remarkable canceling effect is obtained in a magnetic field caused by a current flowing through the multilayer capacitor C2. As a result, the multilayer capacitor C2 can reduce its equivalent series inductance.

On the second side face L2b of the multilayer body L2 in the multilayer capacitor C2, the second terminal conductors 4A, 4B are formed adjacent to the second outer connecting conductors 6A and 6B, respectively. Therefore, a remarkable canceling effect is obtained in a magnetic field caused by a current flowing through the multilayer capacitor C2. As a result, the multilayer capacitor C2 can reduce its equivalent series inductance.

In the multilayer capacitor C2, the first terminal conductors 3A, 3B and first outer connecting conductors 5A, 5B are arranged by the same number while forming neighboring pairs on the first side face L2a of the multilayer body L2. Also, in the multilayer capacitor C2, the second terminal conductors 4A, 4B and second outer connecting conductors 6A, 6B are arranged by the same number while forming neighboring pairs on the second side face L2b of the multilayer body L2. Therefore, a remarkable canceling effect is obtained in a magnetic field caused by a current flowing through the multilayer capacitor C2. As a result, the multilayer capacitor C2 can lower its equivalent series inductance further greatly.

In the multilayer capacitor C2, about the center axis Ax2 of the multilayer body L2, the first terminal conductors 3A, 3B are formed at positions axisymmetrical to the second terminal conductors 4B, 4A, respectively, and the first outer connecting conductors 5A, 5B are formed at positions axisymmetrical to the second outer connecting conductors 6B, 6A, respectively. Also, in the opposing direction of the first side face L2a and second side face L2b of the multilayer body L2 in the multilayer capacitor C2, the first terminal conductors 3A, 3B oppose the second terminal conductors 4A, 4B, respectively, and the first outer connecting conductors 5A, 5B oppose the second outer connecting conductors 6A, 6B, respectively. Therefore, the multilayer capacitor C2 can be mounted easily.

Sixth Embodiment

Figure 9:
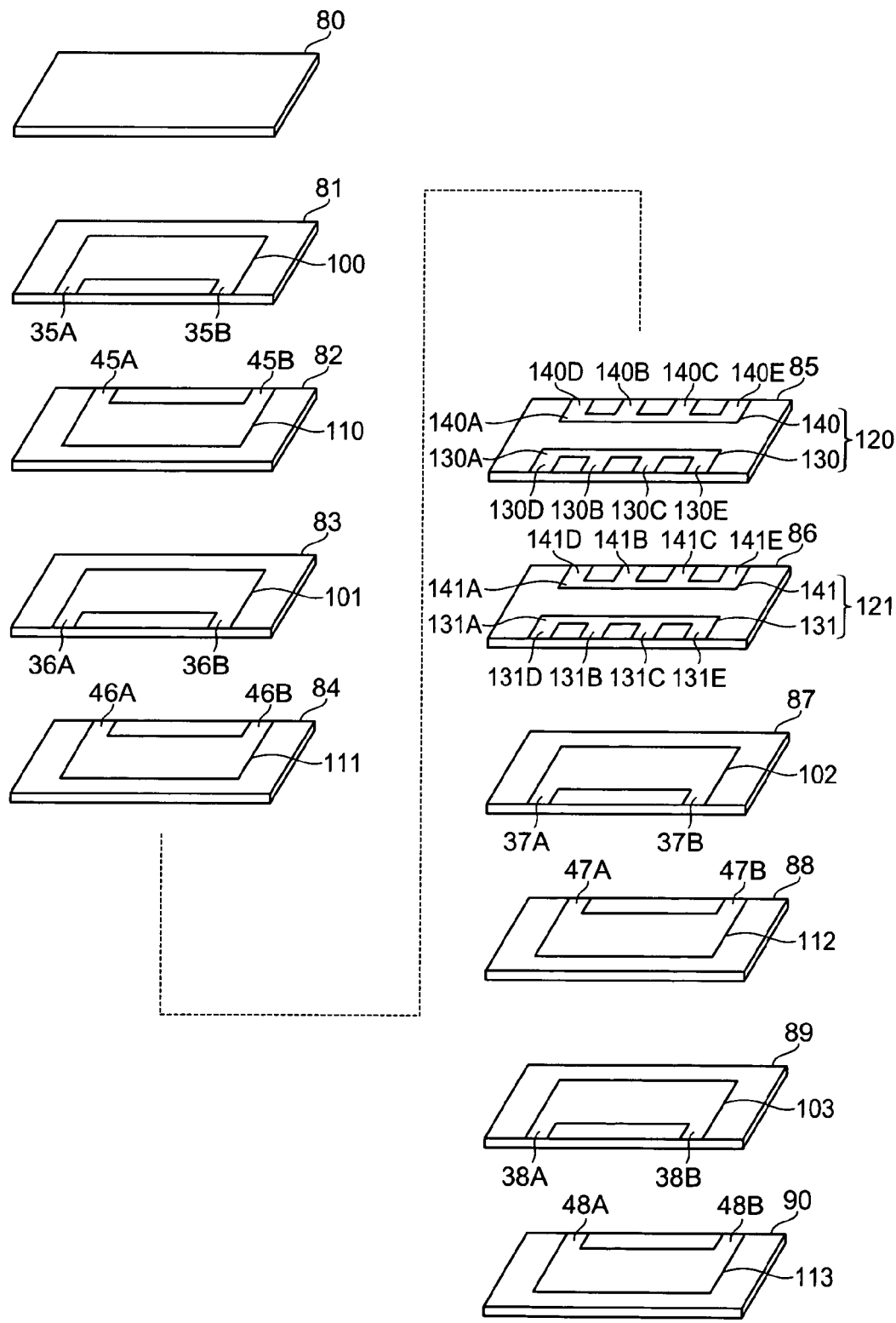
FIG. 9 is an exploded perspective view of the multilayer body included in the multilayer capacitor in accordance with a sixth embodiment.

The configuration of the multilayer capacitor in accordance with a sixth embodiment will be explained with reference to FIG. 9. The multilayer capacitor in accordance with the sixth embodiment differs from the multilayer capacitor C2 in accordance with the fifth embodiment in terms of positions of the inner connecting conductor layers 120, 121 in the laminating direction. FIG. 9 is an exploded perspective view of the multilayer body included in the multilayer capacitor in accordance with the sixth embodiment.

As with the multilayer capacitor C2 in accordance with the fifth embodiment, the multilayer capacitor in accordance with the sixth embodiment comprises a multilayer body, first terminal conductors 3A, 3B formed on the multilayer body, second terminal conductors 4A, 4B similarly formed on the multilayer body, first outer connecting conductors 5A, 5B similarly formed on the multilayer body, and second outer connecting conductors 6A, 6B similarly formed on the multilayer body, though they are not depicted.

In the multilayer capacitor in accordance with the sixth embodiment, the two inner connecting conductor layers 120, 121 are laminated between two layers each of first and second inner electrodes 100, 101, 110, 111 and two layers each of first and second inner electrodes 102, 103, 112, 113 as shown in FIG. 9. More specifically, the inner connecting conductor layer 120 is positioned so as to be held between dielectric layers 84 and 85. The inner connecting conductor layer 121 is positioned so as to be held between dielectric layers 85 and 86.

The inner connecting conductor layers 120, 121 are laminated in the multilayer body such that the multilayer body includes at least one set (4 sets in this embodiment) of first and second inner electrodes neighboring each other with the dielectric layer in between.

In the multilayer capacitor in accordance with the sixth embodiment, the first terminal conductors 3A, 3B are connected to the first inner electrodes 100 to 103 not directly, but electrically through the first outer connecting conductors 5A, 5B and first inner connecting conductor 130, 131 of the inner connecting conductor layers 120, 121. Also, in the multilayer capacitor in accordance with the sixth embodiment, the second terminal conductors 4A, 4B are connected to the second inner electrodes 110 to 113 not directly, but electrically through the second outer connecting conductors 6A, 6B and second inner connecting conductors 140, 141 of the inner connecting conductor layers 120, 121. As a consequence, the multilayer capacitor in accordance with the sixth embodiment yields an equivalent series resistance greater than that of the conventional multilayer capacitor in which all the inner electrodes are connected to their corresponding terminal conductors through lead conductors.

Meanwhile, when the first terminal conductors 3A, 3B are concerned, the multilayer capacitor in accordance with the sixth embodiment differs from the multilayer capacitor C2 in accordance with the fifth embodiment in how the respective resistance components of the first outer connecting conductors 5A, 5B are connected to the first terminal conductors 3A, 3B. In the multilayer capacitor C2 in accordance with the fifth embodiment, the respective resistance components of the first outer connecting conductors 5A, 5B are connected in series to the first inner connecting conductor layers 120, 121. In the multilayer capacitor in accordance with the sixth embodiment, on the other hand, each of the resistance components of the first outer connecting conductors 5A, 5B is split at the inner connecting conductor layers 120, 121 as boundaries, and the resulting resistance components are connected in parallel to their corresponding first terminal conductors 3A, 3B.

When the second terminal conductors 4A, 4B are concerned, the multilayer capacitor in accordance with the sixth embodiment differs from the multilayer capacitor C2 in accordance with the fifth embodiment in how the respective resistance components of the second outer connecting conductors 6A, 6B are connected to the second terminal conductors 4A, 4B. In the multilayer capacitor C2 in accordance with the fifth embodiment, the respective resistance components of the second outer connecting conductors 6A, 6B are connected in series to the inner connecting conductor layers 120, 121. In the multilayer capacitor in accordance with the sixth embodiment, on the other hand, each of the resistance components of the second outer connecting conductors 6A, 6B is split at the inner connecting conductor layers 120, 121 as boundaries, and the resulting resistance components are connected in parallel to their corresponding second terminal conductors 4A, 4B.

Therefore, because of the difference in resistance components of the first and second outer connecting conductors 5A, 5B, 6A, 6B, the multilayer capacitor in accordance with the sixth embodiment yields an equivalent series resistance smaller than that of the multilayer capacitor C2 in accordance with the fifth embodiment.

As in the foregoing, by adjusting the positions of the inner connecting conductor layers 120, 121 directly connected to the first and second terminal conductors 3A, 3B, 4A, 4B in the laminating direction, this embodiment sets the equivalent series resistance of the multilayer capacitor to a desirable value, and thus can regulate the equivalent series resistance easily with a high precision. Also, since the equivalent series resistance is controlled by the inner connecting conductor layers, the multilayer capacitor in accordance with the sixth embodiment can regulate the equivalent series resistance while setting its capacitance to a desirable value (e.g., a larger value).

All the outer conductors (first and second terminal conductors 3A, 3B, 4A, 4B and first and second outer connecting conductors 5A, 5B, 6A, 6B) in the multilayer capacitor in accordance with the sixth embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the sixth embodiment can be made easily.

The first conductor portion 130A of the first inner connecting conductor 130 of the inner connecting conductor layer 120 opposes the second inner electrode 111 with the dielectric layer 84 in between. The first conductor portion 141A of the second inner connecting conductor 141 of the inner connecting conductor layer 121 opposes the first inner electrode 102 with the dielectric layer 86 in between. Therefore, in the multilayer capacitor in accordance with the sixth embodiment, the first and second inner connecting conductors 120, 121 can also contribute to forming the capacity component, and thus can further increase the capacitance of the multilayer capacitor.

The first terminal conductors 3A, 3B and the first outer connecting conductors 5A, 5B are formed adjacent to each other, respectively, on the first side face of the multilayer body in the multilayer capacitor in accordance with the sixth embodiment as in the multilayer capacitor C2. Therefore, the multilayer capacitor in accordance with the sixth embodiment can lower its equivalent series inductance.

The second terminal conductors 4A, 4B and the second outer connecting conductors 6A, 6B are formed adjacent to each other, respectively, on the second side face of the multilayer body in the multilayer capacitor in accordance with the sixth embodiment as in the multilayer capacitor C2. Therefore, the multilayer capacitor in accordance with the sixth embodiment can lower its equivalent series inductance.

In the multilayer capacitor in accordance with the sixth embodiment, the first terminal conductors 3A, 3B and first outer connecting conductors 5A, 5B are arranged by the same number while forming neighboring pairs on the first side face of the multilayer body. Also, in the multilayer capacitor in accordance with the sixth embodiment, the second terminal conductors 4A, 4B and second outer connecting conductors 6A, 6B are arranged by the same number while forming neighboring pairs on the second side face of the multilayer body. Therefore, the multilayer capacitor in accordance with the sixth embodiment can lower its equivalent series inductance more greatly.

In the multilayer capacitor in accordance with the sixth embodiment, about the center axis of the multilayer body, the first terminal conductors 3A, 3B are formed at positions axisymmetrical to the second terminal conductors 4B, 4A, respectively, and the first outer connecting conductors 5A, 5B are formed at positions axisymmetrical to the second outer connecting conductors 6B, 6A, respectively. Also, in the opposing direction of the first and second side faces of the multilayer body in the multilayer capacitor in accordance with the sixth embodiment, the first terminal conductors 3A, 3B oppose the second terminal conductors 4A, 4B, respectively, and the first outer connecting conductors 5A, 5B oppose the second outer connecting conductors 6A, 6B, respectively. Therefore, the multilayer capacitor in accordance with the sixth embodiment can be mounted easily.

Seventh Embodiment

Figure 10:
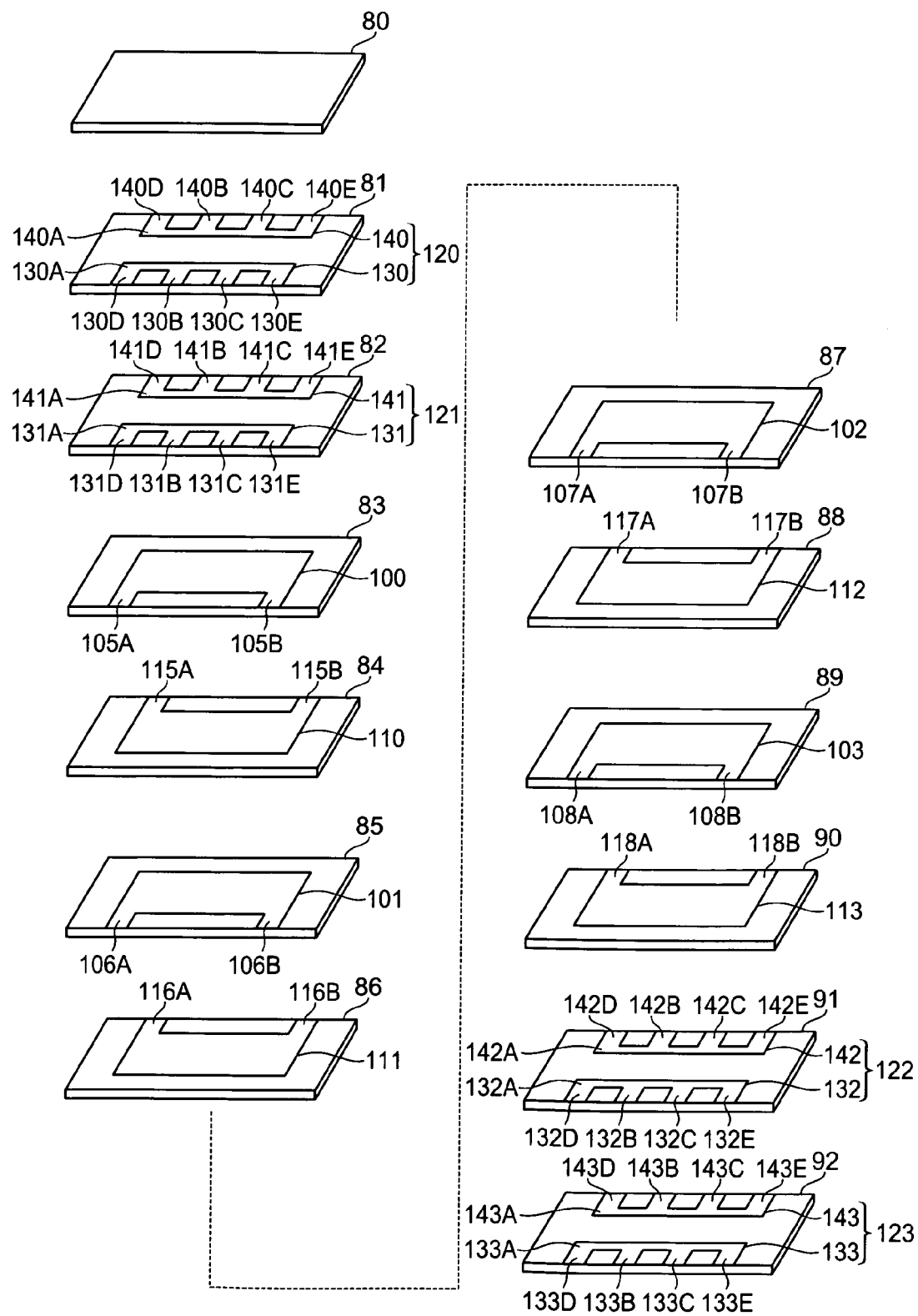
FIG. 10 is an exploded perspective view of the multilayer body included in the multilayer capacitor in accordance with a seventh embodiment.

The configuration of the multilayer capacitor in accordance with a seventh embodiment will be explained with reference to FIG. 10. The multilayer capacitor in accordance with the seventh embodiment differs from the multilayer capacitor C2 in accordance with the fifth embodiment in terms of the number of inner connecting conductor layers. FIG. 10 is an exploded perspective view of the multilayer body included in the multilayer capacitor in accordance with the seventh embodiment.

As with the multilayer capacitor C2 in accordance with the fifth embodiment, the multilayer capacitor in accordance with the seventh embodiment comprises a multilayer body, first terminal conductors 3A, 3B formed on the multilayer body, second terminal conductors 4A, 4B similarly formed on the multilayer body, first outer connecting conductors 5A, 5B similarly formed on the multilayer body, and second outer connecting conductors 6A, 6B similarly formed on the multilayer body, though they are not depicted.

The multilayer capacitor in accordance with the seventh embodiment is constructed by alternately laminating a plurality of (13 in this embodiment) dielectric layers 80 to 92 and a plurality of (4 each in this embodiment) of first and second inner electrodes 100 to 103, 110 to 113 as shown in FIG. 10.

In the multilayer body of the multilayer capacitor in accordance with the seventh embodiment, a plurality of (4 in this embodiment) inner connecting conductor layers 120, 121, 122, 123 are laminated. In the multilayer body of the multilayer capacitor in accordance with the seventh embodiment, the four layers of first inner electrodes 100 to 103 and four layers of second inner electrodes 110 to 113 are arranged between the two inner connecting conductor layers 120, 121 and two inner connecting conductor layers 122, 123.

The inner connecting conductor layer 120 is positioned so as to be held between the dielectric layers 80 and 81. The inner connecting conductor layer 121 is positioned so as to be held between the dielectric layers 81 and 82. The inner connecting conductor layer 122 is positioned so as to be held between the dielectric layers 90 and 91. The inner connecting conductor layer 123 is positioned so as to be held between the dielectric layers 91 and 92. The inner connecting conductor layers 120 to 123 include their corresponding first inner connecting conductors 130 to 133 and second inner connecting conductors 140 to 143 which are electrically insulated from each other.

The inner connecting conductor layers 120 to 123 are laminated in the multilayer body such that the multilayer body includes at least one set (4 sets in this embodiment) of first and second inner electrodes neighboring each other with the dielectric layer in between.

In the multilayer capacitor in accordance with the seventh embodiment, the first terminal conductors 3A, 3B are connected to the first inner electrodes 100 to 103 not directly, but electrically through the first outer connecting conductors 5A, 5B and the first inner connecting conductors 130 to 133 of the inner connecting conductor layers 120 to 123. Also, in the multilayer capacitor in accordance with the seventh embodiment, the second terminal conductors 4A, 4B are connected to the second inner electrodes 110 to 113 not directly, but electrically through the second outer connecting conductors 6A, 6B and the second inner connecting conductors 140 to 143 of the inner connecting conductor layers 120 to 123. As a consequence, the multilayer capacitor in accordance with the seventh embodiment yields an equivalent series resistance greater than that of the conventional multilayer capacitor in which all the inner electrodes are connected to their corresponding terminal conductors through lead conductors.

As compared with the multilayer capacitor C2, the multilayer capacitor in accordance with the seventh embodiment has a greater number of inner connecting conductor layers 120 to 123, whereas the first inner connecting conductors 130 to 133 of the inner connecting conductor layers 120 to 123 are connected in parallel to their corresponding first terminal conductors 3A, 3B. Also, the second inner connecting conductors 140 to 143 of the inner connecting conductor layers 120 to 123 are connected in parallel to their corresponding second terminal conductors 4A, 4B. Therefore, the multilayer capacitor in accordance with the seventh embodiment yields an equivalent series resistance smaller than that of the multilayer capacitor C2.

As in the foregoing, by adjusting the number of inner connecting conductor layers 120 to 123 directly connected to the first and second terminal conductors 3A, 3B, 4A, 4B, this embodiment sets the equivalent series resistance of the multilayer capacitor to a desirable value, and thus can regulate the equivalent series resistance easily with a high precision. Also, since the equivalent series resistance is controlled by the inner connecting conductor layers, the multilayer capacitor in accordance with the seventh embodiment can regulate the equivalent series resistance while setting its capacitance to a desirable value (e.g., a larger value).

All the outer conductors (first and second terminal conductors 3A, 3B, 4A, 4B and first and second outer connecting conductors 5A, 5B, 6A, 6B) in the multilayer capacitor in accordance with the seventh embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the seventh embodiment can be made easily.

The first conductor portion 141A of the second inner connecting conductor 141 of the inner connecting conductor layer 121 opposes the first inner electrode 100 with the dielectric layer 82 in between. The first conductor portion 132A of the first inner connecting conductor 132 of the inner connecting conductor layer 122 opposes the second inner electrode 113 with the dielectric layer 90 in between. Therefore, in the multilayer capacitor in accordance with the seventh embodiment, the inner connecting conductor layers 121, 122 can also contribute to forming the capacity component, and thus can further increase the capacitance of the multilayer capacitor.

Since a plurality of first and second inner electrodes 100 to 103, 110 to 113 are arranged between the two inner connecting conductor layers 120, 121 and the two inner connecting conductor layers 122, 123, the multilayer body of the multilayer capacitor in accordance with the seventh embodiment can set the equivalent series resistance with a favorable balance.

The first terminal conductors 3A, 3B and the first outer connecting conductors 5A, 5B are formed adjacent to each other, respectively, on the first side face of the multilayer body in the multilayer capacitor in accordance with the seventh embodiment as in the multilayer capacitor C2. Therefore, the multilayer capacitor in accordance with the seventh embodiment can lower its equivalent series inductance.

The second terminal conductors 4A, 4B and the second outer connecting conductors 6A, 6B are formed adjacent to each other, respectively, on the second side face of the multilayer body in the multilayer capacitor in accordance with the seventh embodiment as in the multilayer capacitor C2. Therefore, the multilayer capacitor in accordance with the seventh embodiment can lower its equivalent series inductance.

In the multilayer capacitor in accordance with the seventh embodiment, the first terminal conductors 3A, 3B and first outer connecting conductors 5A, 5B are arranged by the same number while forming neighboring pairs on the first side face of the multilayer body. Also, in the multilayer capacitor in accordance with the seventh embodiment, the second terminal conductors 4A, 4B and second outer connecting conductors 6A, 6B are arranged by the same number while forming neighboring pairs on the second side face of the multilayer body. Therefore, the multilayer capacitor in accordance with the seventh embodiment can lower its equivalent series inductance more greatly.

In the multilayer capacitor in accordance with the seventh embodiment, about the center axis of the multilayer body, the first terminal conductors 3A, 3B are formed at positions axisymmetrical to the second terminal conductors 4B, 4A, respectively, and the first outer connecting conductors 5A, 5B are formed at positions axisymmetrical to the second outer connecting conductors 6B, 6A, respectively. Also, in the opposing direction of the first and second side faces of the multilayer body in the multilayer capacitor in accordance with the seventh embodiment, the first terminal conductors 3A, 3B oppose the second terminal conductors 4A, 4B, respectively, and the first outer connecting conductors 5A, 5B oppose the second outer connecting conductors 6A, 6B, respectively. Therefore, the multilayer capacitor in accordance with the seventh embodiment can be mounted easily.

Eighth Embodiment

Figure 11:
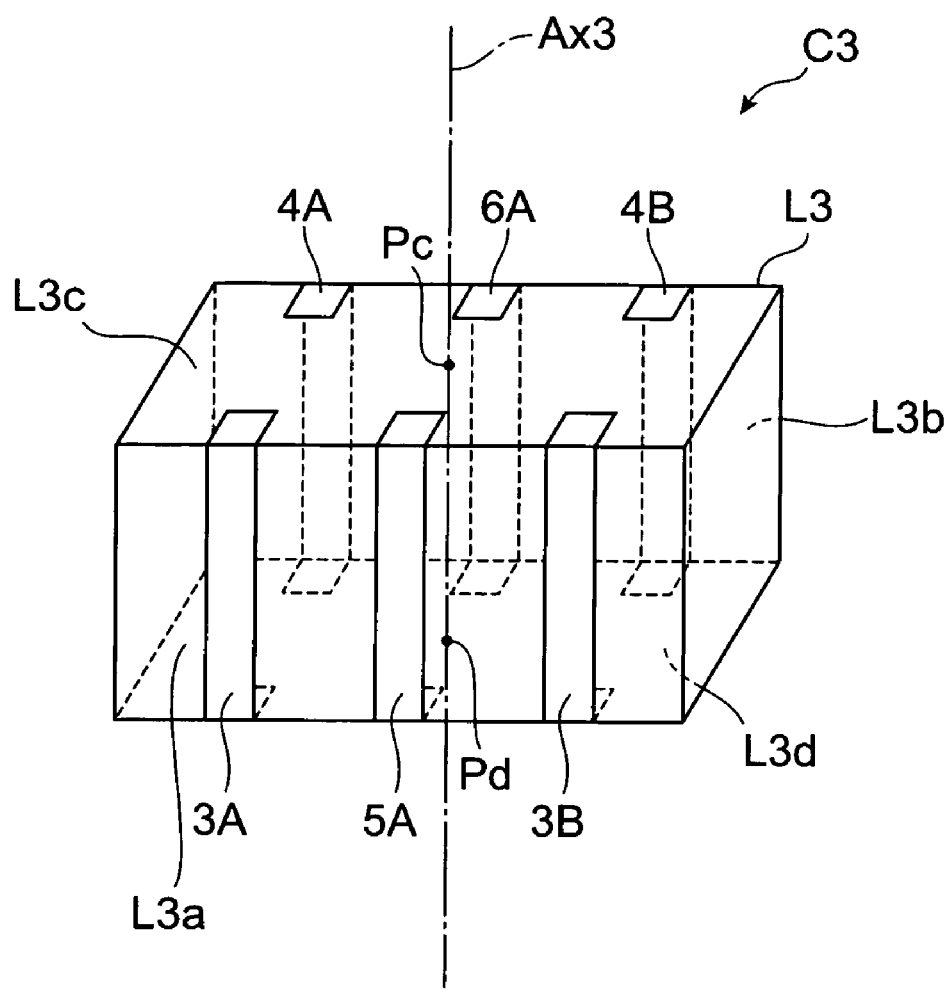
FIG. 11 is a perspective view of the multilayer capacitor in accordance with an eighth embodiment.
Figure 12:
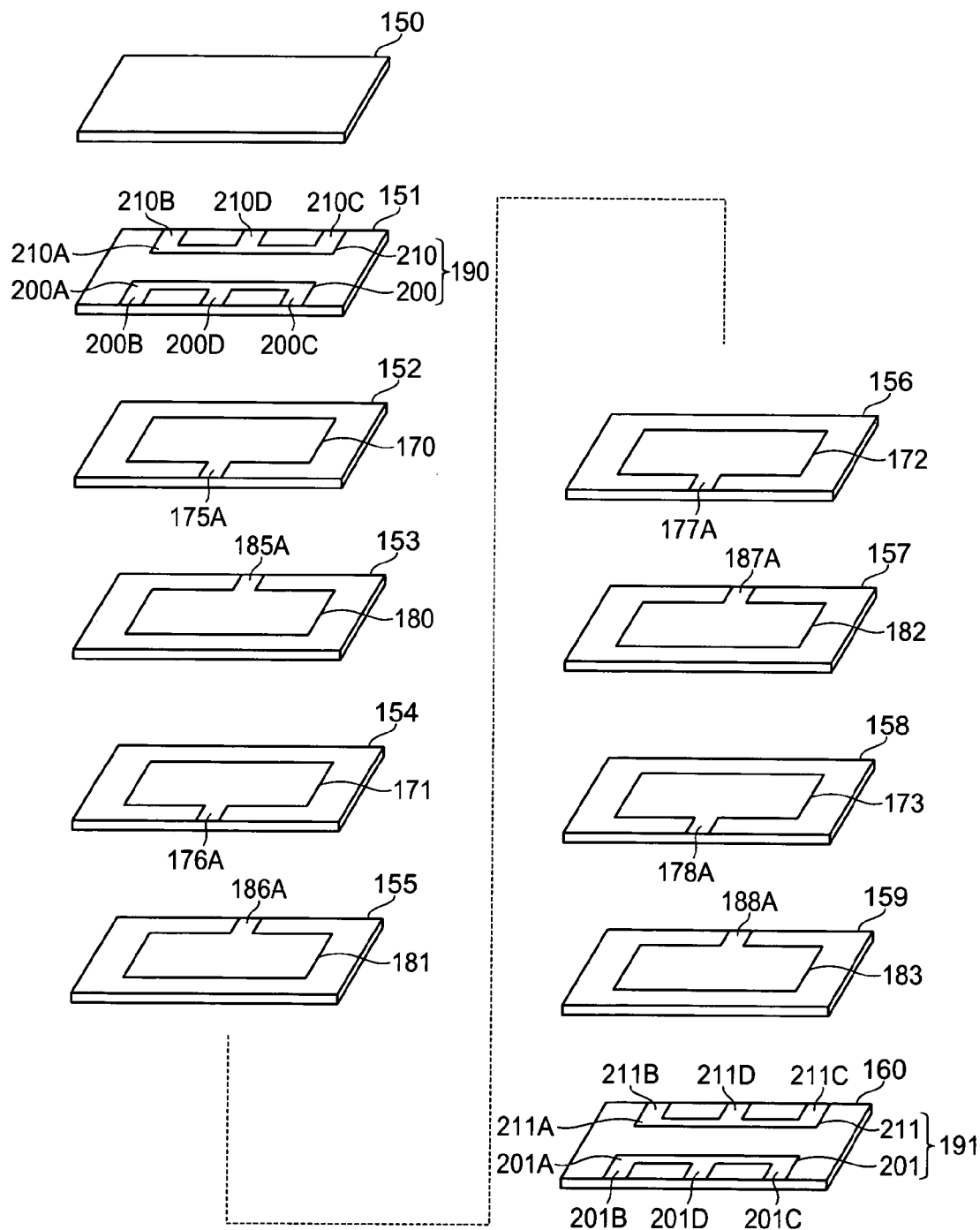
FIG. 12 is an exploded perspective view of the multilayer body included in the multilayer capacitor in accordance with the eighth embodiment.

The configuration of the multilayer capacitor C3 in accordance with a eighth embodiment will be explained with reference to FIGS. 11 and 12. FIG. 11 is a perspective view of the multilayer capacitor in accordance with the eighth embodiment. FIG. 12 is an exploded perspective view of the multilayer body included in the multilayer capacitor in accordance with the eighth embodiment.

As shown in FIG. 11, the multilayer capacitor C3 in accordance with the eighth embodiment comprises a multilayer body L3 having a substantially rectangular parallelepiped form, and a plurality of outer conductors formed on side faces of the multilayer body L3. The plurality of outer conductors include a plurality of (2 in this embodiment) first terminal conductors 3A, 3B, a plurality of (2 in this embodiment) second terminal conductors 4A, 4B, one first outer connecting conductor 5A, and one second outer connecting conductor 6A. On the surface of the multilayer body L3, the plurality of outer conductors are formed such as to be electrically insulated from each other.

Each of the first terminal conductors 3A, 3B and first outer connecting conductor 5A is positioned on a first side face L3a which is a side face extending along the longitudinal axis of faces L3c, L3d orthogonal to the laminating direction of the multilayer body L3 among side faces parallel to the laminating direction of the multilayer body. The first terminal conductors 3A, 3B and first outer connecting conductor 5A are formed such that the first terminal conductor 3A, first outer connecting conductor 5A, and first terminal conductor 3B are successively arranged from the left side to right side of FIG. 11

Therefore, the first terminal conductor 3A and first outer connecting conductor 5A are formed adjacent to each other on the first side face L3a that is the same side face of the multilayer body L3. The first terminal conductor 3B and first outer connecting conductor 5A are formed adjacent to each other on the first side face L3a that is the same side face of the multilayer body L3.

Each of the second terminal conductors 4A, 4B and second outer connecting conductor 6A is positioned on a second side face L3b which is a side face extending along the longitudinal axis of faces L3c, L3d orthogonal to the laminating direction of the multilayer body L3 among side faces parallel to the laminating direction of the multilayer body. The second terminal conductors 4A, 4B and second outer connecting conductor 6A are formed such that the second terminal conductor 4A, second outer connecting conductor 6A, and second terminal conductor 4B are successively arranged from the left side to right side of FIG. 11.

Therefore, the second terminal conductor 4A and second outer connecting conductor 6A are formed adjacent to each other on the second side face L3b that is the same side face of the multilayer body L3. The second terminal conductor 4B and second outer connecting conductor 6A are formed adjacent to each other on the second side face L3b that is the same side face of the multilayer body L3.

The second terminal conductor 4B is located at a position axisymmetrical to the first terminal conductor 3A about a center axis Ax3 passing respective center points Pc, Pd of the two side faces L3c, L3d orthogonal to the laminating direction of the multilayer body L3 among center axes of the multilayer body L3. The second terminal conductor 4A is located at a position axisymmetrical to the first terminal conductor 3B about the center axis Ax3 of the multilayer body L3. The first terminal conductor 3A is located at a position axisymmetrical to the second terminal conductor 4B about the center axis Ax3 of the multilayer body L3. The first terminal conductor 3B is located at a position axisymmetrical to the second terminal conductor 4A about the center axis Ax3 of the multilayer body L3.

The second outer connecting conductor 6A is located at a position axisymmetrical to the first outer connecting conductor 5A about the center axis Ax3 of the multilayer body L3. The first outer connecting conductor 5A is located at a position axisymmetrical to the second outer connecting conductor 6A about the center axis Ax3 of the multilayer body L3.

The second terminal conductor 4A is located at a position opposing the first terminal conductor 3A in a direction along which the first side face L3a and second side face L3b of the multilayer body L3 oppose each other. The second terminal conductor 4B is located at a position opposing the first terminal conductor 3B in the opposing direction of the first side face L3a and second side face L3b of the multilayer body L3. The first terminal conductor 3A is located at a position opposing the second terminal conductor 4A in the opposing direction of the first side face L3a and second side face L3b of the multilayer body L3. The first terminal conductor 3B is located at a position opposing the second terminal conductor 4B in the opposing direction of the first side face L3a and second side face L3b of the multilayer body L3.

The second outer connecting conductor 6A is located at a position opposing the first outer connecting conductor 5A in the opposing direction of the first side face L3a and second side face L3b of the multilayer body L3. The first outer connecting conductor 5A is located at a position opposing the second outer connecting conductor 6A in the opposing direction of the first side face L3a and second side face L3b of the multilayer body L3.

As shown in FIG. 12, the multilayer body L3 is constructed by alternately laminating a plurality of (11 in this embodiment) dielectric layers 150 to 160 and a plurality of (4 each in this embodiment) of first and second inner electrodes 170 to 173, 180 to 183. In the actual multilayer capacitor C3, they are integrated to such an extent that no boundaries are discernible between the dielectric layers 150 to 160.

Further, a plurality of (2 in this embodiment) inner connecting conductor layers 190, 191 are laminated in the multilayer body L3. In the multilayer body L3, the plurality of first inner electrodes 170 to 173 and the plurality of second inner electrodes 180 to 183 are arranged between one inner connecting conductor layer 190 which is a part of the plurality of inner connecting conductor layers 190, 191 and the remaining one inner connecting conductor layer 191.

Each of the first inner electrodes 170 to 173 has a substantially rectangular form. The plurality of first inner electrodes 170 to 173 are formed at respective positions separated by a predetermined distance from a side face parallel to the laminating direction of the dielectric layers 150 to 160 (hereinafter simply referred to as "laminating direction") in the multilayer body L3. The first inner electrodes 170 to 173 are formed with their corresponding lead conductors 175A to 178A taken out therefrom so as to extend to the first side face L3a of the multilayer body L3.

A lead conductor 175A is integrally formed with the first inner electrode 170 so as to extend therefrom and reach the first side face L3a of the multilayer body L3. A lead conductor 176A is integrally formed with the first inner electrode 171 so as to extend therefrom and reach the first side face L3a of the multilayer body L3. A lead conductor 177A is integrally formed with the first inner electrode 172 so as to extend therefrom and reach the first side face L3a of the multilayer body L3. A lead conductor 178A is integrally formed with the first inner electrode 173 so as to extend therefrom and reach the first side face L3a of the multilayer body L3.

The first inner electrode 170 is electrically connected to the first outer connecting conductor 5A through the lead conductor 175A. The first inner electrode 171 is electrically connected to the first outer connecting conductor 5A through the lead conductor 176A. The first inner electrode 172 is electrically connected to the first outer connecting conductor 5A through the lead conductor 177A. The first inner electrode 173 is electrically connected to the first outer connecting conductor 5A through the lead conductor 178A. As a consequence, the plurality of first inner electrodes 170 to 173 are electrically connected to each other through the first outer connecting conductor 5A.

Each of the second inner electrodes 180 to 183 has a substantially rectangular form. The plurality of second inner electrodes 180 to 183 are formed at respective positions separated by a predetermined distance from a side face parallel to the laminating direction of the multilayer body L3. The second inner electrodes 180 to 183 are formed with their corresponding lead conductors 185A to 188A taken out therefrom so as to extend to the second side face L3b of the multilayer body L3.

A lead conductor 185A is integrally formed with the second inner electrode 180 so as to extend therefrom and reach the second side face L3b of the multilayer body L3. A lead conductor 186A is integrally formed with the second inner electrode 181 so as to extend therefrom and reach the second side face L3b of the multilayer body L3. A lead conductor 187A is integrally formed with the second inner electrode 182 so as to extend therefrom and reach the second side face L3b of the multilayer body L3. A lead conductor 188A is integrally formed with the second inner electrode 183 so as to extend therefrom and reach the second side face L3b of the multilayer body L3.

The second inner electrode 180 is electrically connected to the second outer connecting conductor 6A through the lead conductor 185A. The second inner electrode 181 is electrically connected to the second outer connecting conductor 6A through the lead conductor 186A. The second inner electrode 182 is electrically connected to the second outer connecting conductor 6A through the lead conductor 187A. The second inner electrode 183 is electrically connected to the second outer connecting conductor 6A through the lead conductor 188A. As a consequence, the plurality of second inner electrodes 180 to 183 are electrically connected to each other through the second outer connecting conductor 6A.

The inner connecting conductor 190 is positioned so as to be held between the dielectric layers 150 and 151. The inner connecting conductor 191 is positioned so as to be held between the dielectric layers 159 and 160. The inner connecting conductor layers 190, 191 include their corresponding first inner connecting conductors 200, 201 and second inner connecting conductors 210, 211. The first inner connecting conductors 200, 201 are electrically insulated from the second inner connecting conductors 210, 211.

The first inner connecting conductors 200, 201 include their corresponding first conductor portions 200A, 201A each having an oblong form, and second to fourth conductor portions 200B to 200D, 201B to 201D extending from the first conductor portions 200A, 201A so as to be taken out to the first side face L3a of the multilayer body L3. The first conductor portions 200A, 201A are arranged such that their longitudinal axes are parallel to the first and second side faces L3a, L3b of the multilayer body L3.

Each of the second conductor portions 200B, 201B is electrically connected to the first terminal conductor 3A; each of the third conductor portions 200C, 201C is electrically connected to the first terminal conductor 3B; and each of the fourth conductor portions 200D, 201D is electrically connected to the first outer connecting conductor 5A. Therefore, each of the first inner connecting conductors 200, 201 is electrically connected to the first terminal conductors 3A, 3B and first outer connecting conductor 5A.

The second inner connecting conductors 210, 211 include their corresponding first conductor portions 210A, 211A each having an oblong form, and second to fifth conductor portions 210B to 210D, 211B to 211D extending from the first conductor portions 210A, 211A so as to be taken out to the second side face L3b of the multilayer body L3. The first conductor portions 210A, 211A are arranged such that their longitudinal axes are parallel to the first and second side faces L3a, L3b of the multilayer body L3.

Each of the second conductor portions 210B, 211B is electrically connected to the second terminal conductor 4A; each of the third conductor portions 210C, 211C is electrically connected to the second terminal conductor 4B; and each of the fourth conductor portions 210D, 211D is electrically connected to the second outer connecting conductor 6A. Therefore, each of the second inner connecting conductors 210, 211 is electrically connected to the second terminal conductors 4A, 4B and second outer connecting conductor 6A.

The first conductor portion 210A of the second inner connecting conductor 210 of the inner connecting conductor layer 190 is a region opposing the first inner electrode 170 with the dielectric layer 151 in between. The first conductor portion 211A of the first inner connecting conductor 211 of the inner connecting conductor layer 121 is a region opposing the second inner electrode 183 with the dielectric layer 159 in between.

The inner connecting conductor layers 190, 191 are laminated in the multilayer body L3 such that the multilayer body L3 includes at least one set (4 sets in this embodiment) of first and second inner electrodes neighboring each other with the dielectric layer in between.

In the multilayer capacitor C3, the first terminal conductors 3A, 3B are connected to the first inner electrodes 170 to 173 not directly, but electrically through the first outer connecting conductors 5A, 5B and first inner connecting conductors 200, 201 of the inner connecting conductor layers 190, 191. Also, in the multilayer capacitor C3, the second terminal conductors 4A, 4B are connected to the second inner electrodes 180 to 183 not directly, but electrically through the second outer connecting conductors 6A, 6B and second inner connecting conductors 210, 211 of the inner connecting conductor layers 190, 191. As a result, the multilayer capacitor C3 yields an equivalent series resistance greater than that of the conventional multilayer capacitor in which all the inner electrodes are connected to their corresponding terminal conductors through lead conductors.

By adjusting the number of inner connecting conductor layers 190, 191 directly connected to the first terminal conductors 3A, 3B and second terminal conductors 4A, 4B in such a manner, this embodiment sets the equivalent series resistance of the multilayer capacitor C3 to a desirable value, and thus can regulate the equivalent series resistance easily with a high precision. Also, since the equivalent series resistance is controlled by the inner connecting conductor layers, the multilayer capacitor C3 can regulate the equivalent series resistance while setting its capacitance to a desirable value (e.g., a larger value).

All of the first and second terminal conductors 3A, 3B, 4A, 4B and first and second outer connecting conductors 5A, 6A, which are outer conductors of the multilayer capacitor C3, are formed on the first and second side faces L3a, L3b of the multilayer body L3 opposing each other. Therefore, as compared with the case where outer conductors are formed on four side faces of the multilayer body L3, the multilayer capacitor C3 can reduce steps required for forming the outer conductors. As a consequence, the multilayer capacitor C3 can be made easily.

The second inner connecting conductor 210 of the inner connecting conductor layer 190 has the first conductor portion 210A that is a region opposing the first inner electrode 170 with the dielectric layer 151 in between. The first inner connecting conductor 201 of the inner connecting conductor layer 191 has the first conductor portion 201A that is a region opposing the second inner electrode 183 with the dielectric layer 159 in between. Therefore, the inner connecting conductor layers 190, 191 can also contribute to forming the capacity component of the multilayer capacitor C3. As a consequence, the multilayer capacitor C3 can further increase its capacitance.

Since a plurality of first and second inner electrodes 170 to 173, 180 to 183 are arranged between the inner connecting conductor layers 190 and 191, the multilayer capacitor C3 can set its equivalent series resistance with a favorable balance.

On the first side face L3a of the multilayer body L3 in the multilayer capacitor C3, each of the first terminal conductors 3A, 3B is formed adjacent to the first outer connecting conductor 5A. Therefore, a remarkable canceling effect is obtained in a magnetic field caused by a current flowing through the multilayer capacitor C3. As a result, the multilayer capacitor C3 can reduce its equivalent series inductance.

On the second side face L3b of the multilayer body L3 in the multilayer capacitor C3, each of the second terminal conductors 4A, 4B is formed adjacent to the second outer connecting conductor 6A. Therefore, a remarkable canceling effect is obtained in a magnetic field caused by a current flowing through the multilayer capacitor C3. As a result, the multilayer capacitor C3 can reduce its equivalent series inductance.

In the multilayer capacitor C3, about the center axis Ax3 of the multilayer body L3, the first terminal conductors 3A, 3B are formed at positions axisymmetrical to the second terminal conductors 4A, 4B, respectively, and the first outer connecting conductor 5A and second outer connecting conductor 6A are formed at positions axisymmetrical to each other. Also, in the opposing direction of the first side face L3a and second side face L3b of the multilayer body L3 in the multilayer capacitor C3, the first terminal conductors 3A, 3B oppose the second terminal conductors 4A, 4B, respectively, and the first outer connecting conductor 5A and second outer connecting conductor 6A oppose each other. Therefore, the multilayer capacitor C3 can be mounted easily.

Ninth Embodiment

Figure 13:
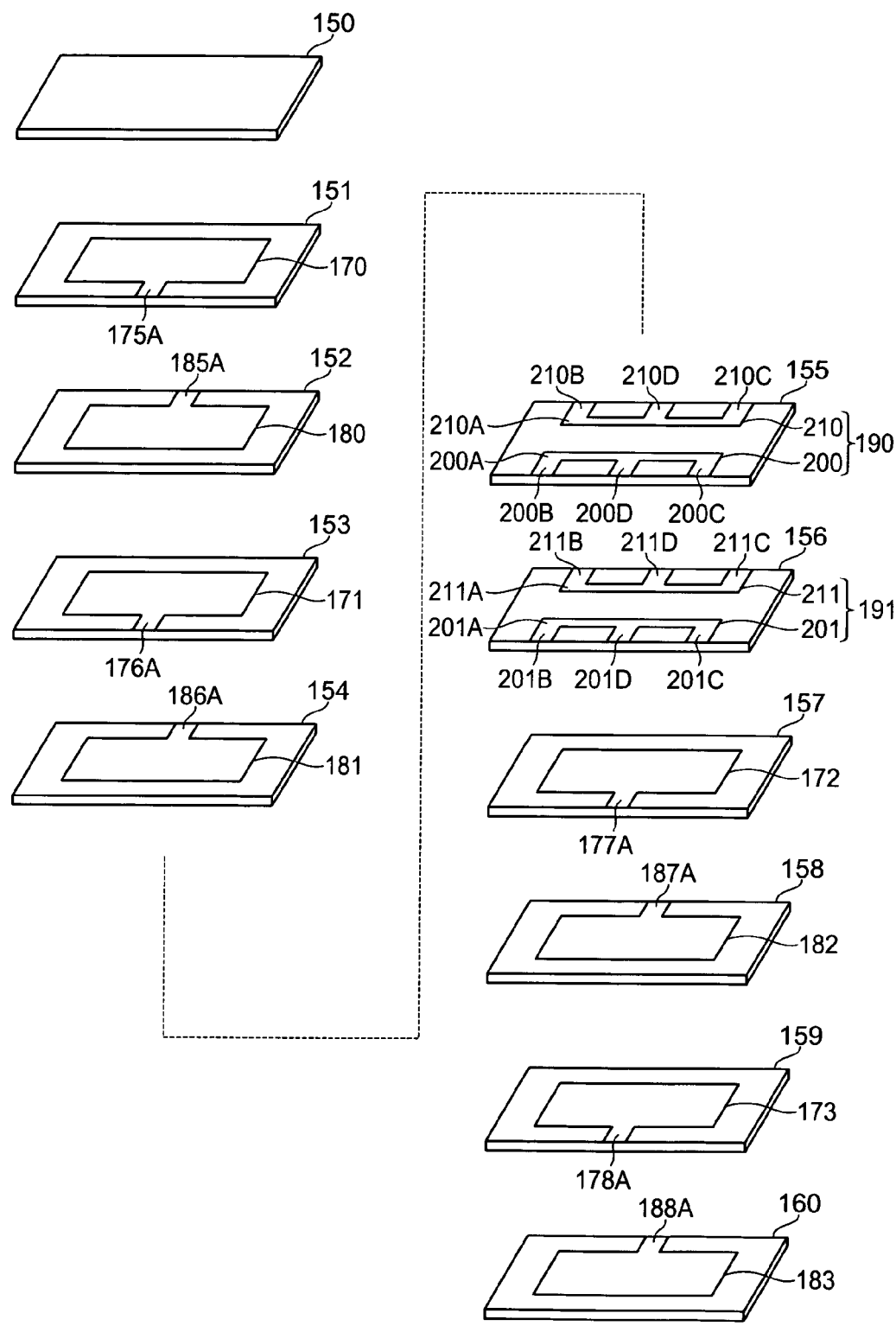
FIG. 13 is an exploded perspective view of the multilayer body included in the multilayer capacitor in accordance with a ninth embodiment.

With reference to FIG. 13, the configuration of the multilayer capacitor in accordance with a ninth embodiment will be explained. The multilayer capacitor in accordance with the ninth embodiment differs from the multilayer capacitor C3 in accordance with the eighth embodiment in terms of positions of the inner connecting conductor layers 190, 191 in the laminating direction. FIG. 13 is an exploded perspective view of the multilayer body included in the multilayer capacitor in accordance with the ninth embodiment.

As with the multilayer capacitor C3 in accordance with the eighth embodiment, the multilayer capacitor in accordance with the ninth embodiment comprises a multilayer body, first terminal conductors 3A, 3B formed on the multilayer body, second terminal conductors 4A, 4B similarly formed on the multilayer body, a first outer connecting conductor 5A similarly formed on the multilayer body, and a second outer connecting conductor 6A similarly formed on the multilayer body, though they are not depicted.

In the multilayer capacitor in accordance with the ninth embodiment, the two inner connecting conductor layers 190, 191 are laminated between two layers each of first and second inner electrodes 170, 171, 180, 181 and two layers each of first and second inner electrodes 172, 173, 182, 183 as shown in FIG. 13. More specifically, the inner connecting conductor layer 190 is positioned so as to be held between dielectric layers 154, 155. The inner connecting conductor layer 191 is positioned so as to be held between dielectric layers 155, 156.

The inner connecting conductor layers 190, 191 are laminated in the multilayer body such that the multilayer body includes at least one set (4 sets in this embodiment) of first and second inner electrodes neighboring each other with the dielectric layer in between.

In the multilayer capacitor in accordance with the ninth embodiment, the first terminal conductors 3A, 3B are connected to the first inner electrodes 170 to 173 not directly, but electrically through the first outer connecting conductors 5A and first inner connecting conductors 200, 201 of the inner connecting conductor layers 190, 191. Also, in the multilayer capacitor in accordance with the ninth embodiment, the second terminal conductors 4A, 4B are connected to the second inner electrodes 180 to 183 not directly, but electrically through the second outer connecting conductors 6A and second inner connecting conductors 210, 211 of the inner connecting conductor layers 190, 191. As a consequence, the multilayer capacitor in accordance with the ninth embodiment yields an equivalent series resistance greater than that of the conventional multilayer capacitor in which all the inner electrodes are connected to their corresponding terminal conductors through lead conductors.

Meanwhile, when the first terminal conductors 3A, 3B are concerned, the multilayer capacitor in accordance with the ninth embodiment differs from the multilayer capacitor C3 in accordance with the eighth embodiment in how the resistance components of the first outer connecting conductor 5A is connected to the first terminal conductors 3A, 3B. In the multilayer capacitor C3 in accordance with the eighth embodiment, the resistance components of the first outer connecting conductors 5A is connected in series to the first inner connecting conductor layers 190, 191. In the multilayer capacitor in accordance with the ninth embodiment, on the other hand, the resistance component of the first outer connecting conductors 5A is split at the inner connecting conductor layers 190, 191 as boundaries, and the resulting resistance components are connected in parallel to their corresponding first terminal conductors 3A, 3B.

When the second terminal conductors 4A, 4B are concerned, the multilayer capacitor in accordance with the ninth embodiment differs from the multilayer capacitor C3 in accordance with the eighth embodiment in how the resistance components of the second outer connecting conductors 6A is connected to the second terminal conductors 4A, 4B. In the multilayer capacitor C2 in accordance with the eighth embodiment, the resistance component of the second outer connecting conductor 6A is connected in series to the inner connecting conductor layers 190, 191. In the multilayer capacitor in accordance with the ninth embodiment, on the other hand, the resistance component of the second outer connecting conductors 6A is split at the inner connecting conductor layers 190, 191 as boundaries, and the resulting resistance components are connected in parallel to their corresponding second terminal conductors 4A, 4B.

Therefore, because of the difference in resistance components of the first and second outer connecting conductors 5A, 6A, the multilayer capacitor in accordance with the ninth embodiment yields an equivalent series resistance smaller than that of the multilayer capacitor C3 in accordance with the eighth embodiment.

As in the foregoing, by adjusting the positions of the inner connecting conductor layers 190, 191 directly connected to the first and second terminal conductors 3A, 3B, 4A, 4B in the laminating direction, this embodiment sets the equivalent series resistance of the multilayer capacitor to a desirable value, and thus can regulate the equivalent series resistance easily with a high precision. Also, since the equivalent series resistance is controlled by the inner connecting conductor layers, the multilayer capacitor in accordance with the ninth embodiment can regulate the equivalent series resistance while setting its capacitance to a desirable value (e.g., a larger value).

All the outer conductors (first and second terminal conductors 3A, 3B, 4A, 4B and first and second outer connecting conductors 5A, 6A) in the multilayer capacitor in accordance with the ninth embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the ninth embodiment can be made easily.

The first conductor portion 200A of the first inner connecting conductor 200 of the inner connecting conductor layer 190 opposes the second inner electrode 181 with the dielectric layer 154 in between. The first conductor portion 211A of the second inner connecting conductor 211 of the inner connecting conductor layer 191 opposes the first inner electrode 172 with the dielectric layer 156 in between. Therefore, in the multilayer capacitor in accordance with the ninth embodiment, the first and second inner connecting conductors 190, 191 can also contribute to forming the capacity component, and thus can further increase the capacitance of the multilayer capacitor.

The first terminal conductors 3A, 3B are formed adjacent to the first outer connecting conductor 5A on the first side face of the multilayer body in the multilayer capacitor in accordance with the ninth embodiment as in the multilayer capacitor C3. Therefore, the multilayer capacitor in accordance with the ninth embodiment can lower its equivalent series inductance.

The second terminal conductors 4A, 4B are formed adjacent to the second outer connecting conductor 6A on the second side face of the multilayer body in the multilayer capacitor in accordance with the ninth embodiment as in the multilayer capacitor C3. Therefore, the multilayer capacitor in accordance with the ninth embodiment can lower its equivalent series inductance.

In the multilayer capacitor in accordance with the ninth embodiment, about the center axis of the multilayer body, the first terminal conductors 3A, 3B are formed at positions axisymmetrical to the second terminal conductors 4A, 4B, respectively, and the first outer connecting conductor 5A and second outer connecting conductor 6A are formed at positions axisymmetrical to each other. Also, in the opposing direction of the first and second side faces of the multilayer body in the multilayer capacitor in accordance with the ninth embodiment, the first terminal conductors 3A, 3B oppose the second terminal conductors 4A, 4B, respectively, and the first outer connecting conductor 5A and second outer connecting conductor 6A oppose each other. Therefore, the multilayer capacitor in accordance with the ninth embodiment can be mounted easily.

Tenth Embodiment

Figure 14:
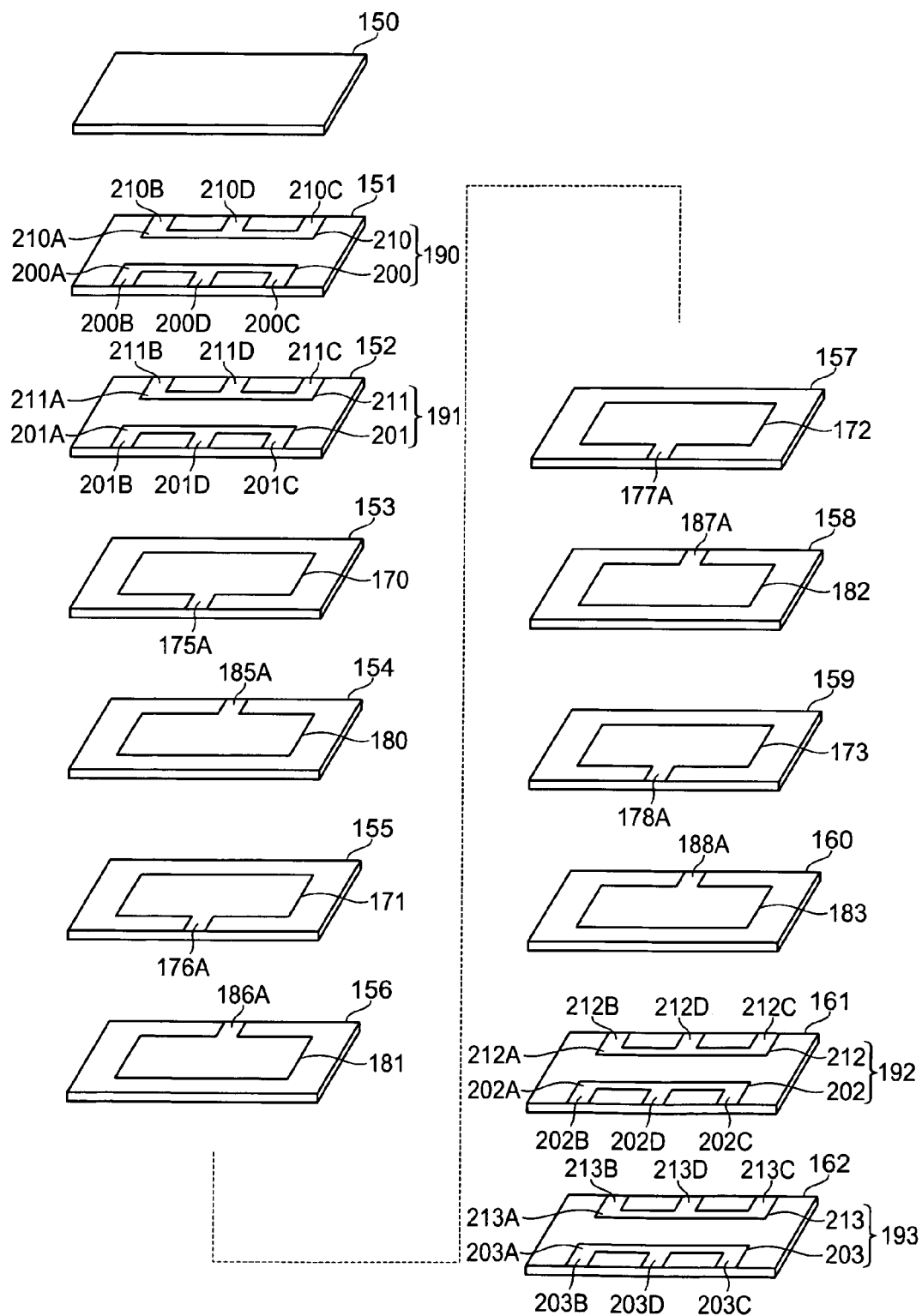
FIG. 14 is an exploded perspective view of the multilayer body included in the multilayer capacitor in accordance with a tenth embodiment.

The configuration of the multilayer capacitor in accordance with a tenth embodiment will be explained with reference to FIG. 14. The multilayer capacitor in accordance with the tenth embodiment differs from the multilayer capacitor C3 in accordance with the eighth embodiment in terms of the number of inner connecting conductor layers. FIG. 14 is an exploded perspective view of the multilayer body included in the multilayer capacitor in accordance with the tenth embodiment.

As with the multilayer capacitor C3 in accordance with the eighth embodiment, the multilayer capacitor in accordance with the tenth embodiment comprises a multilayer body, first terminal conductors 3A, 3B formed on the multilayer body, second terminal conductors 4A, 4B similarly formed on the multilayer body, a first outer connecting conductor 5A similarly formed on the multilayer body, and a second outer connecting conductor 6A similarly formed on the multilayer body, though they are not depicted.

The multilayer capacitor in accordance with the tenth embodiment is constructed by alternately laminating a plurality of (13 in this embodiment) dielectric layers 150 to 162 and a plurality of (4 each in this embodiment) of first and second inner electrodes 170 to 173, 180 to 183 as shown in FIG. 14.

In the multilayer body of the multilayer capacitor in accordance with the tenth embodiment, a plurality of (4 in this embodiment) inner connecting conductor layers 190, 191, 192, 193 are laminated. In the multilayer body of the multilayer capacitor in accordance with the tenth embodiment, the four layers of first inner electrodes 170 to 173 and four layers of second inner electrodes 180 to 183 are arranged between the two inner connecting conductor layers 190, 191 and two inner connecting conductor layers 192, 193.

The inner connecting conductor layer 190 is positioned so as to be held between the dielectric layers 150 and 151. The inner connecting conductor layer 191 is positioned so as to be held between the dielectric layers 151 and 152. The inner connecting conductor layer 192 is positioned so as to be held between the dielectric layers 160 and 161. The inner connecting conductor layer 193 is positioned so as to be held between the dielectric layers 161 and 162. The inner connecting conductor layers 190 to 193 include their corresponding first inner connecting conductors 200 to 203 and second inner connecting conductors 210 to 213 which are electrically insulated from each other.

The inner connecting conductor layers 190 to 193 are laminated in the multilayer body such that the multilayer body includes at least one set (4 sets in this embodiment) of first and second inner electrodes neighboring each other with the dielectric layer in between.

In the multilayer capacitor in accordance with the tenth embodiment, the first terminal conductors 3A, 3B are connected to the first inner electrodes 170 to 173 not directly, but electrically through the first outer connecting conductors 5A and the first inner connecting conductors 200 to 203 of the inner connecting conductor layers 190 to 193. Also, in the multilayer capacitor in accordance with the tenth embodiment, the second terminal conductors 4A, 4B are connected to the second inner electrodes 180 to 183 not directly, but electrically through the second outer connecting conductors 6A and the second inner connecting conductors 210 to 213 of the inner connecting conductor layers 190 to 193. As a consequence, the multilayer capacitor in accordance with the tenth embodiment yields an equivalent series resistance greater than that of the conventional multilayer capacitor in which all the inner electrodes are connected to their corresponding terminal conductors through lead conductors.

As compared with the multilayer capacitor C3, the multilayer capacitor in accordance with the tenth embodiment has a greater number of inner connecting conductor layers 190 to 193, whereas the first inner connecting conductors 200 to 203 of the inner connecting conductor layers 190 to 193 are connected in parallel to their corresponding first terminal conductors 3A, 3B. Also, the second inner connecting conductors 210 to 213 of the inner connecting conductor layers 190 to 193 are connected in parallel to their corresponding second terminal conductors 4A, 4B. Therefore, the multilayer capacitor in accordance with the tenth embodiment yields an equivalent series resistance smaller than that of the multilayer capacitor C3.

As in the foregoing, by adjusting the number of inner connecting conductor layers 190 to 193 directly connected to the first terminal conductors 3A, 3B and second terminal conductors 4A, 4B, this embodiment sets the equivalent series resistance of the multilayer capacitor to a desirable value, and thus can regulate the equivalent series resistance easily with a high precision. Also, since the equivalent series resistance is controlled by the inner connecting conductor layers, the multilayer capacitor in accordance with the tenth embodiment can regulate the equivalent series resistance while setting its capacitance to a desirable value (e.g., a larger value).

All the outer conductors (first and second terminal conductors 3A, 3B, 4A, 4B and first and second outer connecting conductors 5A, 6A) in the multilayer capacitor in accordance with the tenth embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the tenth embodiment can be made easily.

The first conductor portion 211A of the second inner connecting conductor 211 of the inner connecting conductor layer 191 opposes the first inner electrode 170 with the dielectric layer 152 in between. The first conductor portion 202A of the first inner connecting conductor 202 of the inner connecting conductor layer 192 opposes the second inner electrode 183 with the dielectric layer 160 in between. Therefore, in the multilayer capacitor in accordance with the tenth embodiment, the inner connecting conductor layers 191, 192 can also contribute to forming the capacity component, and thus can further increase the capacitance of the multilayer capacitor.

Since a plurality of first and second inner electrodes 170 to 173, 180 to 183 are arranged between the two inner connecting conductor layers 190, 191 and the two inner connecting conductor layers 192, 193, the multilayer body of the multilayer capacitor in accordance with the tenth embodiment can set the equivalent series resistance with a favorable balance.

The first terminal conductors 3A, 3B and the first outer connecting conductor 5A are formed adjacent to each other on the first side face of the multilayer body in the multilayer capacitor in accordance with the tenth embodiment as in the multilayer capacitor C3. Therefore, the multilayer capacitor in accordance with the tenth embodiment can lower its equivalent series inductance.

The second terminal conductors 4A, 4B and the second outer connecting conductor 6A are formed adjacent to each other on the second side face of the multilayer body in the multilayer capacitor in accordance with the tenth embodiment as in the multilayer capacitor C3. Therefore, the multilayer capacitor in accordance with the tenth embodiment can lower its equivalent series inductance.

In the multilayer capacitor in accordance with the tenth embodiment, about the center axis of the multilayer body, the first terminal conductors 3A, 3B are formed at positions axisymmetrical to the second terminal conductors 4A, 4B, respectively, and the first outer connecting conductor 5A and second outer connecting conductor 6A are formed at positions axisymmetrical to each other. Also, in the opposing direction of the first and second side faces of the multilayer body in the multilayer capacitor in accordance with the tenth embodiment, the first terminal conductors 3A, 3B oppose the second terminal conductors 4A, 4B, respectively, and the first outer connecting conductor 5A and second outer connecting conductor 6A oppose each other. Therefore, the multilayer capacitor in accordance with the tenth embodiment can be mounted easily.

Eleventh Embodiment

Figure 15:
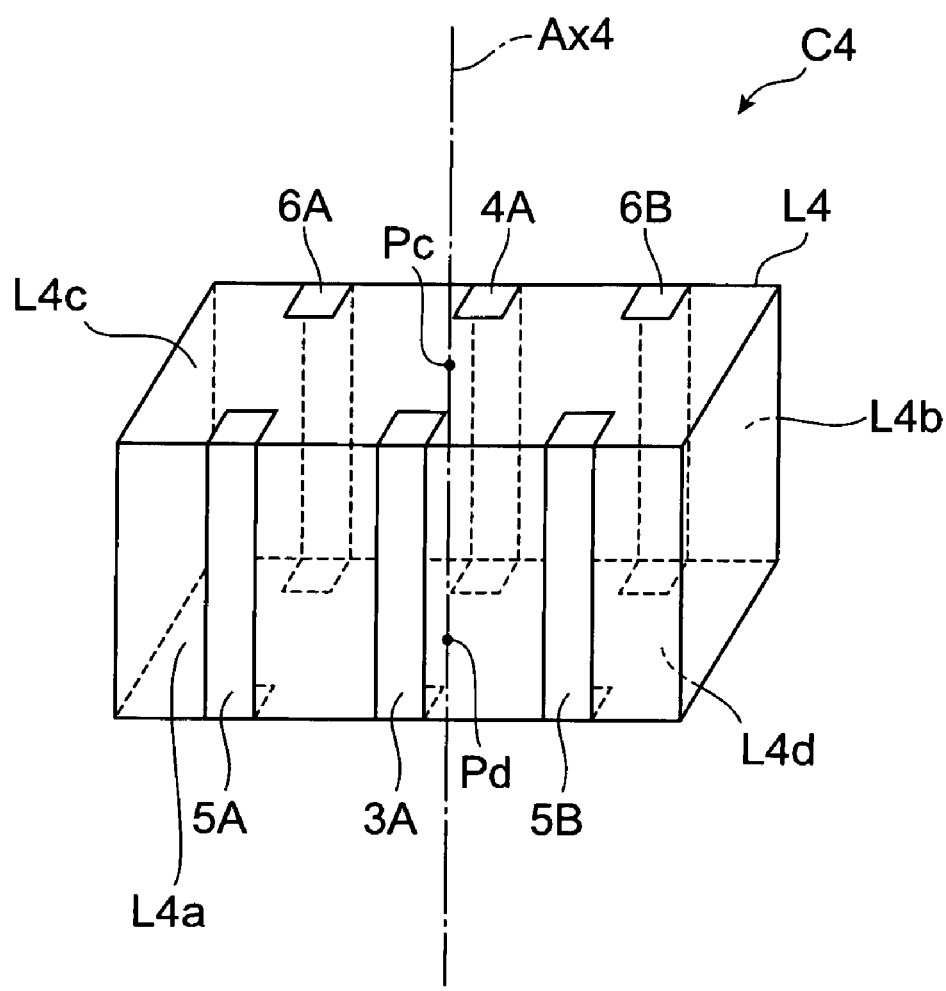
FIG. 15 is a perspective view of the multilayer capacitor in accordance with an eleventh embodiment.
Figure 16:
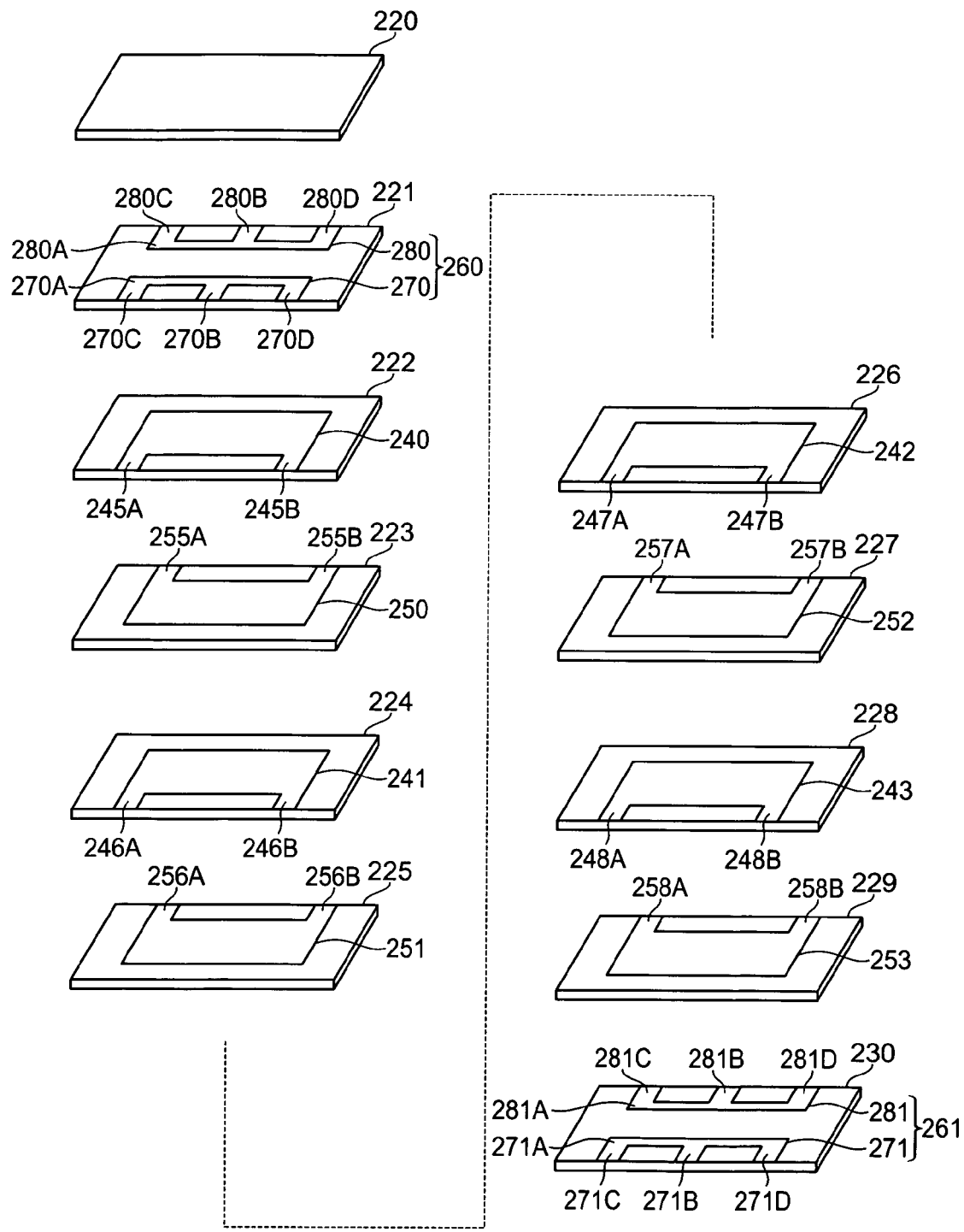
FIG. 16 is an exploded perspective view of the multilayer body included in the multilayer capacitor in accordance with the eleventh embodiment.

The configuration of the multilayer capacitor C4 in accordance with an eleventh embodiment will be explained with reference to FIGS. 15 and 16. The multilayer capacitor in accordance with the eleventh embodiment differs from the multilayer capacitor C3 in accordance with the eighth embodiment in terms of arrangement of outer conductors formed on the first and second side faces of the multilayer body. FIG. 15 is a perspective view of the multilayer capacitor in accordance with the eleventh embodiment. FIG. 16 is an exploded perspective view of the multilayer body included in the multilayer capacitor in accordance with the eleventh embodiment.

As shown in FIG. 15, the multilayer capacitor C4 in accordance with the eleventh embodiment comprises a multilayer body L4, a first terminal conductor 3A formed on the multilayer body L4, a second terminal conductor 4A similarly formed on the multilayer body, first outer connecting conductors 5A, 5B similarly formed on the multilayer body, and second outer connecting conductors 6A, 6B similarly formed on the multilayer body.

Each of the first terminal conductor 3A and first outer connecting conductors 5A, 5B is positioned on a first side face L4a which is a side face extending along the longitudinal axis of faces L4c, L4d orthogonal to the laminating direction of the multilayer body L4 among side faces parallel to the laminating direction of the multilayer body. The first terminal conductor 3A and first outer connecting conductors 5A, 5B are formed such that the first outer connecting conductor 5A, first terminal conductor 3A, and first outer connecting conductor 5B are successively arranged from the left side to right side of FIG. 15.

Therefore, the first terminal conductor 3A and first outer connecting conductor 5A are formed adjacent to each other on the first side face L4a that is the same side face of the multilayer body L4. The first terminal conductor 3A and first outer connecting conductor 5B are formed adjacent to each other on the first side face L4a that is the same side face of the multilayer body L4.

Each of the second terminal conductor 4A and second outer connecting conductors 6A, 6B is positioned on a second side face L4b which is a side face extending along the longitudinal axis of faces L4c, L4d orthogonal to the laminating direction of the multilayer body L4 among side faces parallel to the laminating direction of the multilayer body. The second terminal conductor 4A and second outer connecting conductors 6A, 6B are formed such that the second outer connecting conductor 6A, second terminal conductor 4A, and second outer connecting conductor 6B are successively arranged from the left side to right side of FIG. 15.

Therefore, the second terminal conductor 4A and second outer connecting conductor 6A are formed adjacent to each other on the second side face L4b that is the same side face of the multilayer body L4. The second terminal conductor 3B and second outer connecting conductor 6B are formed adjacent to each other on the second side face L4b that is the same side face of the multilayer body L4.

The first terminal conductor 3A and second terminal conductor 4A are axisymmetrical to each other about a center axis Ax8 passing respective center points Pc, Pd of the two side faces L4c, L4d orthogonal to the laminating direction of the multilayer body L4 among center axes of the multilayer body L4. The first outer connecting conductor 5A and second outer connecting conductor 6B are axisymmetrical to each other about the center axis Ax8 of the multilayer body L4. The first outer connecting conductor 5B and second outer connecting conductor 6A are axisymmetrical to each other about the center axis Ax8 of the multilayer body L4.

The first terminal conductor 3A and second terminal conductor 4A oppose each other in a direction along which the first side face L4a and second side face L4b of the multilayer body L4 oppose each other. The first outer connecting conductor 5A and second outer connecting conductor 6A oppose each other in the opposing direction of the first side face L4a and second side face L4b of the multilayer body L4. The first outer connecting conductor 5B and second outer connecting conductor 6B oppose each other in the opposing direction of the first side face L4a and second side face L4b of the multilayer body L4.

As shown in FIG. 16, the multilayer body L4 is constructed by alternately laminating a plurality of (11 in this embodiment) dielectric layers 220 to 230 and a plurality of (4 each in this embodiment) of first and second inner electrodes 240 to 243, 250 to 253. In the actual multilayer capacitor C4, they are integrated to such an extent that no boundaries are discernible between the dielectric layers 220 to 230.

Further, a plurality of (2 in this embodiment) inner connecting conductor layers 260, 261 are laminated in the multilayer body L4. In the multilayer body L4, the plurality of first inner electrodes 240 to 243 and the plurality of second inner electrodes 250 to 253 are arranged between the inner connecting conductor layers 260, 261.

Each of the first inner electrodes 240 to 243 has a substantially rectangular form. The plurality of first inner electrodes 240 to 243 are formed at respective positions separated by a predetermined distance from a side face parallel to the laminating direction of the dielectric layers 220 to 230 (hereinafter simply referred to as "laminating direction") in the multilayer body L4.

Each of lead conductors 245A, 245B is integrally formed with the first inner electrode 240 so as to extend therefrom and reach the first side face L4a of the multilayer body L4. Each of lead conductors 246A, 246B is integrally formed with the first inner electrode 241 so as to extend therefrom and reach the first side face L4a of the multilayer body L4. Each of lead conductors 247A, 247B is integrally formed with the first inner electrode 242 so as to extend therefrom and reach the first side face L4a of the multilayer body L4. Each of lead conductors 248A, 248B is integrally formed with the first inner electrode 243 so as to extend therefrom and reach the first side face L4a of the multilayer body L4.

The first inner electrode 240 is electrically connected to the first outer connecting conductors 5A and 5B through the lead conductors 245A and 245B, respectively. The first inner electrode 241 is electrically connected to the first outer connecting conductors 5A and 5B through the lead conductors 246A and 246B, respectively. The first inner electrode 242 is electrically connected to the first outer connecting conductors 5A and 5B through the lead conductors 247A and 247B, respectively. The first inner electrode 243 is electrically connected to the first outer connecting conductors 5A and 5B through the lead conductors 248A and 248B, respectively. As a consequence, the plurality of first inner electrodes 240 to 243 are electrically connected to each other through the first outer connecting conductors 5A, 5B.

Each of the second inner electrodes 250 to 253 has a substantially rectangular form. The plurality of second inner electrodes 250 to 253 are formed at respective positions separated by a predetermined distance from a side face parallel to the laminating direction of the multilayer body L4.

Each of lead conductors 255A, 255B is integrally formed with the second inner electrode 250 so as to extend therefrom and reach the second side face L4b of the multilayer body L4. Each of lead conductors 256A, 256B is integrally formed with the second inner electrode 251 so as to extend therefrom and reach the second side face L4b of the multilayer body L4. Each of lead conductors 257A, 257B is integrally formed with the second inner electrode 252 so as to extend therefrom and reach the second side face L8b of the multilayer body L4. Each of lead conductors 258A, 258B is integrally formed with the first inner electrode 253 so as to extend therefrom and reach the second side face L4b of the multilayer body L4.

The second inner electrode 250 is electrically connected to the second outer connecting conductors 6A and 6B through the lead conductors 255A and 255B, respectively. The second inner electrode 251 is electrically connected to the second outer connecting conductors 6A and 6B through the lead conductors 256A and 256B, respectively. The second inner electrode 252 is electrically connected to the second outer connecting conductors 6A and 6B through the lead conductors 257A and 257B, respectively. The second inner electrode 253 is electrically connected to the second outer connecting conductors 6A and 6B through the lead conductors 258A and 258B, respectively. As a consequence, the plurality of first inner electrodes 250 to 253 are electrically connected to each other through the second outer connecting conductors 6A, 6B.

The inner connecting conductor layer 260 is positioned so as to be held between the dielectric layers 220 and 221. The inner connecting conductor layer 261 is positioned so as to be held between the dielectric layers 229 and 230. The inner connecting conductor layers 260, 261 include their corresponding first inner connecting conductors 270, 271 and second inner connecting conductors 280, 281 which are electrically insulated from each other.

The first inner connecting conductors 270, 271 include their corresponding first conductor portions 270A, 271A each having an oblong form, and second to fourth conductor portions 270B to 270D, 271B to 271D extending from the first conductor portions 270A, 271A so as to be taken out to the first side face L4a of the multilayer body L4. The first conductor portions 270A, 271A are arranged such that their longitudinal axes are parallel to the first and second side faces L4a, L4b of the multilayer body L4.

Each of the second conductor portions 270B, 271B is electrically connected to the first terminal conductor 3A; each of the third conductor portions 270C, 271C is electrically connected to the first outer connecting conductor 5A; and each of the fourth conductor portions 270D, 271D is electrically connected to the first outer connecting conductor 5B. Therefore, each of the first inner connecting conductors 270, 271 is electrically connected to the first terminal conductor 3A and first outer connecting conductors 5A, 5B.

The second inner connecting conductors 280, 281 include their corresponding first conductor portions 280A, 281A each having an oblong form, and second to fourth conductor portions 280B to 280D, 281B to 281D extending from the first conductor portions 280A, 281A so as to be taken out to the second side face L4b of the multilayer body L4. The second conductor portions 280A, 281A are arranged such that their longitudinal axes are parallel to the first and second side faces L4a, L4b of the multilayer body L4.

Each of the second conductor portions 280B, 281B is electrically connected to the second terminal conductor 4A; each of the third conductor portions 280C, 281C is electrically connected to the second outer connecting conductor 6A; and each of the fourth conductor portions 280D, 281D is electrically connected to the second outer connecting conductor 6B. Therefore, each of the second inner connecting conductors 280, 281 is electrically connected to the second terminal conductor 4A and second outer connecting conductors 6A, 6B.

The first conductor portion 280A of the second inner connecting conductor 280 of the inner connecting conductor layer 260 is a region opposing the first inner electrode 240 with the dielectric layer 221 in between. The first conductor portion 271A of the first inner connecting conductor 271 of the inner connecting conductor layer 261 is a region opposing the second inner electrode 253 with the dielectric layer 229 in between.

The inner connecting conductor layers 260, 261 are laminated in the multilayer body L4 such that the multilayer body L4 includes at least one set (4 sets in this embodiment) of first and second inner electrodes neighboring each other with the dielectric layer in between.

In the multilayer capacitor C4, the first terminal conductor 3A is connected to the first inner electrodes 310 to 313 not directly, but electrically through the first outer connecting conductors 5A, 5B and first inner connecting conductor 330. Also, in the multilayer capacitor C8, the second terminal conductor 4A is connected to the second inner electrodes 320 to 323 not directly, but electrically through the second outer connecting conductors 6A, 6B and second inner connecting conductor 340. As a result, the multilayer capacitor C8 yields an equivalent series resistance greater than that of the conventional multilayer capacitor in which all the inner electrodes are connected to their corresponding terminal conductors through lead conductors.

By adjusting the number of inner connecting conductor layers 260, 261 directly connected to the first and second terminal conductors 3A, 4A in such a manner, this embodiment sets the equivalent series resistance of the multilayer capacitor C4 to a desirable value, and thus can regulate the equivalent series resistance easily with a high precision. Also, since the equivalent series resistance is controlled by the inner connecting conductor layers, the multilayer capacitor C4 can regulate the equivalent series resistance while setting its capacitance to a desirable value (e.g., a larger value).

All of the first and second terminal conductors 3A, 4A and first and second outer connecting conductors 5A, 5B, 6A, 6B, which are outer conductors of the multilayer capacitor C4, are formed on the first and second side faces L4a, L4b of the multilayer body L4 opposing each other. Therefore, as compared with the case where outer conductors are formed on three or more side faces (e.g., four side faces) of the multilayer body L4, the multilayer capacitor C4 can reduce steps required for forming the outer conductors. As a consequence, the multilayer capacitor C4 can be made easily.

The second inner connecting conductor 280 of the inner connecting conductor layer 260 has the first conductor portion 280A that is a region opposing the first inner electrode 240 with the dielectric layer 221 in between. The first inner connecting conductor 271 of the inner connecting conductor layer 261 has the first conductor portion 271A that is a region opposing the second inner electrode 253 with the dielectric layer 229 in between. Therefore, the inner connecting conductor layers 260, 261 can also contribute to forming the capacity component. As a consequence, the multilayer capacitor C4 can further increase its capacitance.

Since a plurality of first and second inner electrodes 240 to 243, 250 to 253 are arranged between the inner connecting conductor layers 260, 261, the multilayer capacitor C4 can set the equivalent series resistance with a favorable balance.

On the first side face L4a of the multilayer body L4 in the multilayer capacitor C4, the first terminal conductors 3A is formed adjacent to both of the first outer connecting conductors 5A and 5B. Therefore, a remarkable canceling effect is obtained in a magnetic field caused by a current flowing through the multilayer capacitor C4. As a result, the multilayer capacitor C4 can reduce its equivalent series inductance.

On the second side face L4b of the multilayer body L4 in the multilayer capacitor C4, the second terminal conductors 4A is formed adjacent to both of the second outer connecting conductors 6A and 6B. Therefore, a remarkable canceling effect is obtained in a magnetic field caused by a current flowing through the multilayer capacitor C4. As a result, the multilayer capacitor C4 can reduce its equivalent series inductance.

In the multilayer capacitor C4, about the center axis Ax4 of the multilayer body L4, the first terminal conductor 3A and second terminal conductor 4A are formed at positions axisymmetrical to each other, and the first outer connecting conductors 5A, 5B are formed at positions axisymmetrical to the second outer connecting conductors 6B, 6A, respectively. Also, in the opposing direction of the first side face L4a and second side face L4b of the multilayer body L4 in the multilayer capacitor C4, the first terminal conductor 3A and second terminal conductor 4A oppose each other, and the first outer connecting conductors 5A, 5B oppose the second outer connecting conductors 6A, 6B, respectively. Therefore, the multilayer capacitor C4 can be mounted easily.

Twelfth Embodiment

Figure 17:
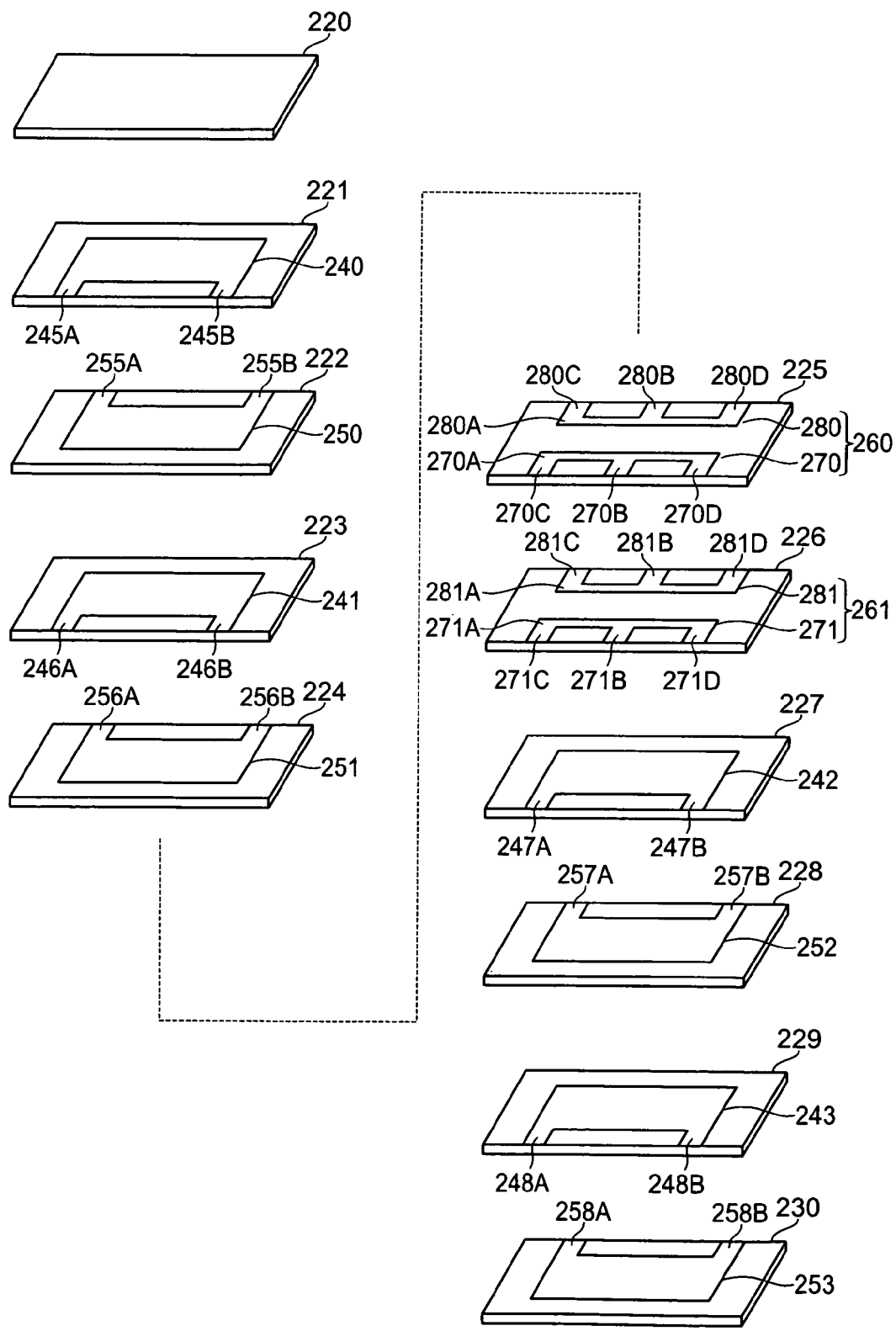
FIG. 17 is an exploded perspective view of the multilayer body included in the multilayer capacitor in accordance with a twelfth embodiment.

With reference to FIG. 17, the configuration of the multilayer capacitor in accordance with a twelfth embodiment will be explained. The multilayer capacitor in accordance with the twelfth embodiment differs from the multilayer capacitor C4 in accordance with the eleventh embodiment in terms of positions of the inner connecting conductors 260, 261 in the laminating direction. FIG. 17 is an exploded perspective view of the multilayer body included in the multilayer capacitor in accordance with the twelfth embodiment.

As with the multilayer capacitor C4 in accordance with the eleventh embodiment, the multilayer capacitor in accordance with the twelfth embodiment comprises a multilayer body, first terminal conductor 3A formed on the multilayer body, second terminal conductor 4A similarly formed on the multilayer body, a first outer connecting conductors 5A, 5B similarly formed on the multilayer body, and a second outer connecting conductors 6A, 6B similarly formed on the multilayer body, though they are not depicted.

In the multilayer capacitor in accordance with the twelfth embodiment, the two inner connecting conductor layers 260, 261 are laminated between two layers each of first and second inner electrodes 240, 241, 250, 251 and two layers each of first and second inner electrodes 242, 243, 252, 253 as shown in FIG. 17. More specifically, the inner connecting conductor layer 260 is positioned so as to be held between dielectric layers 224 and 225. The inner connecting conductor layer 261 is positioned so as to be held between dielectric layers 225 and 226.

The inner connecting conductor layers 260, 261 are laminated in the multilayer body such that the multilayer body includes at least one set (4 sets in this embodiment) of first and second inner electrodes neighboring each other with the dielectric layer in between.

In the multilayer capacitor in accordance with the twelfth embodiment, the first terminal conductor 3A is connected to the first inner electrodes 240 to 243 not directly, but electrically through the first outer connecting conductors 5A, 5B and first inner connecting conductors 270, 271 of the inner connecting conductor layers 260, 261. Also, in the multilayer capacitor in accordance with the twelfth embodiment, the second terminal conductor 4A is connected to the second inner electrodes 250 to 253 not directly, but electrically through the second outer connecting conductors 6A, 6B and second inner connecting conductors 280, 281 of the inner connecting conductor layers 260, 261. As a consequence, the multilayer capacitor in accordance with the twelfth embodiment yields an equivalent series resistance greater than that of the conventional multilayer capacitor in which all the inner electrodes are connected to their corresponding terminal conductors through lead conductors.

Meanwhile, when the first terminal conductor 3A is concerned, the multilayer capacitor in accordance with the twelfth embodiment differs from the multilayer capacitor C4 in accordance with the eleventh embodiment in how the resistance components of the first outer connecting conductors 5A, 5B are connected to the first terminal conductor 3A. In the multilayer capacitor C4 in accordance with the eleventh embodiment, the respective resistance components of the first outer connecting conductors 5A, 5B are connected in series to the first inner connecting conductor layers 260, 261. In the multilayer capacitor in accordance with the twelfth embodiment, on the other hand, each of the resistance components of the first outer connecting conductors 5A, 5B is split at the inner connecting conductor layers 260, 261 as boundaries, and the resulting resistance components are connected in parallel to the first terminal conductor 3A.

When the first terminal conductor 4A is concerned, the multilayer capacitor in accordance with the twelfth embodiment differs from the multilayer capacitor C4 in accordance with the eleventh embodiment in how the resistance components of second first outer connecting conductors 6A, 6B are connected to the second terminal conductor 4A. In the multilayer capacitor C4 in accordance with the eleventh embodiment, the respective resistance components of the second outer connecting conductors 6A, 6B are connected in series to the first inner connecting conductor layers 260, 261. In the multilayer capacitor in accordance with the twelfth embodiment, on the other hand, each of the resistance components of the second outer connecting conductors 6A, 6B is split at the inner connecting conductor layers 260, 261 as boundaries, and the resulting resistance components are connected in parallel to the second terminal conductor 4A.

Therefore, because of the difference in resistance components of the first and, second outer connecting conductors 5A, 5B, 6A, 6B, the multilayer capacitor in accordance with the twelfth embodiment yields an equivalent series resistance smaller than that of the multilayer capacitor C4 in accordance with the eleventh embodiment.

As in the foregoing, by adjusting the positions of the inner connecting conductor layers 260, 261 directly connected to the first and second terminal conductors 3A, 4A in the laminating direction, this embodiment sets the equivalent series resistance of the multilayer capacitor to a desirable value, and thus can regulate the equivalent series resistance easily with a high precision. Also, since the equivalent series resistance is controlled by the inner connecting conductor layers, the multilayer capacitor in accordance with the twelfth embodiment can regulate the equivalent series resistance while setting its capacitance to a desirable value (e.g., a larger value).

All the outer conductors (first and second terminal conductors 3A, 4A and first and second outer connecting conductors 5A, 5B, 6A, 6B) in the multilayer capacitor in accordance with the twelfth embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the twelfth embodiment can be made easily.

The first conductor portion 270A of the first inner connecting conductor 270 of the inner connecting conductor layer 260 opposes the second inner electrode 251 with the dielectric layer 224 in between. The first conductor portion 281A of the second inner connecting conductor 281 of the inner connecting conductor layer 281 opposes the first inner electrode 242 with the dielectric layer 226 in between. Therefore, in the multilayer capacitor in accordance with the twelfth embodiment, the first and second inner connecting conductors 260, 261 can also contribute to forming the capacity component, and thus can further increase the capacitance of the multilayer capacitor.

The first terminal conductor 3A is formed adjacent to both of the first outer connecting conductors 5A, 5B on the first side face of the multilayer body in the multilayer capacitor in accordance with the twelfth embodiment as in the multilayer capacitor C4. Therefore, the multilayer capacitor in accordance with the twelfth embodiment can lower its equivalent series inductance.

The second terminal conductor 4A is formed adjacent to both of the second outer connecting conductors 6A, 6B on the second side face of the multilayer body in the multilayer capacitor in accordance with the twelfth embodiment as in the multilayer capacitor C4. Therefore, the multilayer capacitor in accordance with the twelfth embodiment can lower its equivalent series inductance.

In the multilayer capacitor in accordance with the twelfth embodiment, about the center axis of the multilayer body, the first terminal conductor 3A and second terminal conductor 4A are formed at positions axisymmetrical to each other, and the first outer connecting conductors 5A, 5B are formed at positions axisymmetrical to the second outer connecting conductors 6B, 6A, respectively. Also, in the opposing direction of the first and second side faces of the multilayer body in the multilayer capacitor in accordance with the twelfth embodiment, the first terminal conductor 3A and second terminal conductor 4A oppose each other, and the first outer connecting conductors 5A, 5B oppose the second outer connecting conductors 6A, 6B, respectively. Therefore, the multilayer capacitor in accordance with the twelfth embodiment can be mounted easily.

Thirteenth Embodiment

Figure 18:
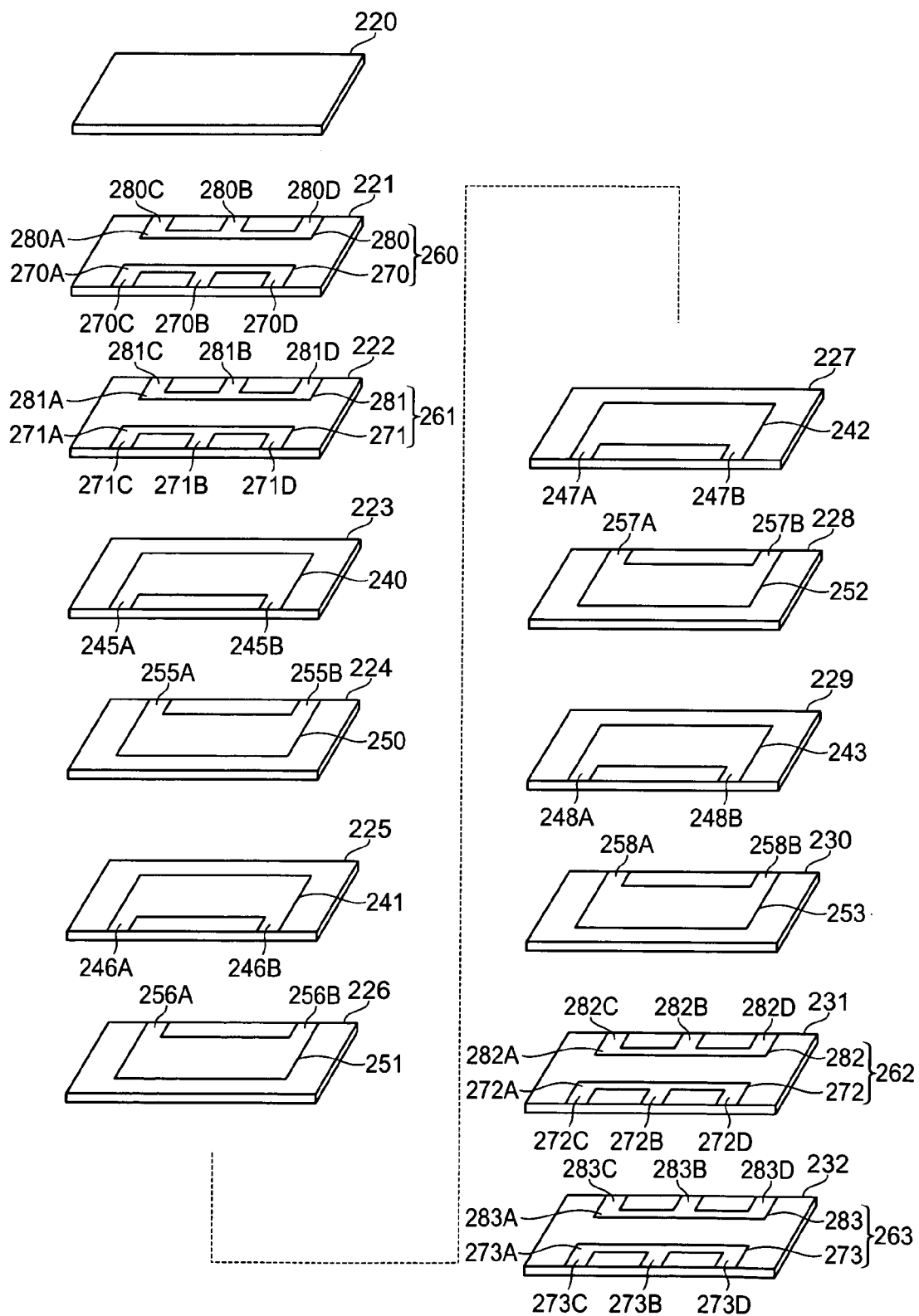
FIG. 18 is an exploded perspective view of the multilayer body included in the multilayer capacitor in accordance with a thirteenth embodiment.

The configuration of the multilayer capacitor in accordance with a thirteenth embodiment will be explained with reference to FIG. 18. The multilayer capacitor in accordance with the thirteenth embodiment differs from the multilayer capacitor C4 in accordance with the eleventh embodiment in terms of the number of inner connecting conductor layers. FIG. 18 is an exploded perspective view of the multilayer body included in the multilayer capacitor in accordance with the thirteenth embodiment.

As with the multilayer capacitor C4 in accordance with the eleventh embodiment, the multilayer capacitor in accordance with the thirteenth embodiment comprises a multilayer body, first terminal conductors 3A formed on the multilayer body, second terminal conductors 4A similarly formed on the multilayer body, a first outer connecting conductor 5A, 5B similarly formed on the multilayer body, and a second outer connecting conductor 6A, 6B similarly formed on the multilayer body, though they are not depicted.

The multilayer capacitor in accordance with the thirteenth embodiment is constructed by alternately laminating a plurality of (13 in this embodiment) dielectric layers 220 to 232 and a plurality of (4 each in this embodiment) of first and second inner electrodes 240 to 243, 250 to 253 as shown in FIG. 18.

In the multilayer body of the multilayer capacitor in accordance with the thirteenth embodiment, a plurality of (4 in this embodiment) inner connecting conductor layers 260, 261, 262, 263 are laminated. In the multilayer body of the multilayer capacitor in accordance with the thirteenth embodiment, the four layers of first inner electrodes 240 to 243 and four layers of second inner electrodes 250 to 253 are arranged between the two inner connecting conductor layers 260, 261 and two inner connecting conductor layers 262, 263.

The inner connecting conductor layer 260 is positioned so as to be held between the dielectric layers 220 and 221. The inner connecting conductor layer 261 is positioned so as to be held between the dielectric layers 221 and 222. The inner connecting conductor layer 262 is positioned so as to be held between the dielectric layers 230 and 231. The inner connecting conductor layer 263 is positioned so as to be held between the dielectric layers 231 and 232. The inner connecting conductor layers 260 to 263 include their corresponding first inner connecting conductors 270 to 273 and second inner connecting conductors 280 to 283 which are electrically insulated from each other.

The inner connecting conductor layers 260 to 263 are laminated in the multilayer body such that the multilayer body includes at least one set (4 sets in this embodiment) of first and second inner electrodes neighboring each other with the dielectric layer in between.

In the multilayer capacitor in accordance with the thirteenth embodiment, the first terminal conductors 3A are connected to the first inner electrodes 100 to 103 not directly, but electrically through the first outer connecting conductors 5A, 5B and the first inner connecting conductors 130 to 133 of the inner connecting conductor layers 120 to 123. Also, in the multilayer capacitor in accordance with the seventh embodiment, the second terminal conductors 4A, 4B are connected to the second inner electrodes 110 to 113 not directly, but electrically through the second outer connecting conductors 6A, 6B and the second inner connecting conductors 140 to 143 of the inner connecting conductor layers 120 to 123. As a consequence, the multilayer capacitor in accordance with the seventh embodiment yields an equivalent series resistance greater than that of the conventional multilayer capacitor in which all the inner electrodes are connected to their corresponding terminal conductors through lead conductors.

As compared with the multilayer capacitor C4, the multilayer capacitor in accordance with the thirteenth embodiment has a greater number of inner connecting conductor layers 260 to 263, whereas the first inner connecting conductors 270 to 273 of the inner connecting conductor layers 260 to 263 are connected in parallel to their corresponding first terminal conductor 3A. Also, the second inner connecting conductors 280 to 283 of the inner connecting conductor layers 260 to 263 are connected in parallel to their corresponding second terminal conductor 4A. Therefore, the multilayer capacitor in accordance with the thirteenth embodiment yields an equivalent series resistance smaller than that of the multilayer capacitor C4.

As in the foregoing, by adjusting the number of inner connecting conductor layers 260 to 263 directly connected to the first and second terminal conductors 3A, 4A, this embodiment sets the equivalent series resistance of the multilayer capacitor to a desirable value, and thus can regulate the equivalent series resistance easily with a high precision. Also, since the equivalent series resistance is controlled by the inner connecting conductor layers, the multilayer capacitor in accordance with the thirteenth embodiment can regulate the equivalent series resistance while setting its capacitance to a desirable value (e.g., a larger value).

All the outer conductors (first and second terminal conductors 3A, 4A and first and second outer connecting conductors 5A, 5B, 6A, 6B) in the multilayer capacitor in accordance with the thirteenth embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the thirteenth embodiment can be made easily.

The first conductor portion 281A of the second inner connecting conductor 281 of the inner connecting conductor layer 261 opposes the first inner electrode 240 with the dielectric layer 222 in between. The first conductor portion 272A of the first inner connecting conductor 272 of the inner connecting conductor layer 262 opposes the second inner electrode 253 with the dielectric layer 230 in between. Therefore, in the multilayer capacitor in accordance with the thirteenth embodiment, the inner connecting conductor layers 261, 262 can also contribute to forming the capacity component, and thus can further increase the capacitance of the multilayer capacitor.

Since a plurality of first and second inner electrodes 240 to 243, 250 to 253 are arranged between the two inner connecting conductor layers 260, 261 and the two inner connecting conductor layers 262, 263, the multilayer body of the multilayer capacitor in accordance with the thirteenth embodiment can set the equivalent series resistance with a favorable balance.

The first terminal conductor 3A is formed adjacent to the first outer connecting conductors 5A, 5B on the first side face of the multilayer body in the multilayer capacitor in accordance with the thirteenth embodiment as in the multilayer capacitor C4. Therefore, the multilayer capacitor in accordance with the thirteenth embodiment can lower its equivalent series inductance.

The second terminal conductor 4A is formed adjacent to the second outer connecting conductors 6A, 6B on the second side face of the multilayer body in the multilayer capacitor in accordance with the thirteenth embodiment as in the multilayer capacitor C4. Therefore, the multilayer capacitor in accordance with the thirteenth embodiment can lower its equivalent series inductance.

In the multilayer capacitor in accordance with the thirteenth embodiment, about the center axis of the multilayer body, the first terminal conductor 3A and second terminal conductor 4A are formed at positions axisymmetrical to each other, and the first outer connecting conductors 5A, 5B are formed at positions axisymmetrical to the second outer connecting conductors 6B, 6A, respectively. Also, in the opposing direction of the first and second side faces of the multilayer body in the multilayer capacitor in accordance with the thirteenth embodiment, the first terminal conductor 3A and second terminal conductor 4A oppose each other, and the first outer connecting conductors 5A, 5B oppose the second outer connecting conductors 6A, 6B, respectively. Therefore, the multilayer capacitor in accordance with the thirteenth embodiment can be mounted easily.

Fourteenth Embodiment

Figure 19:
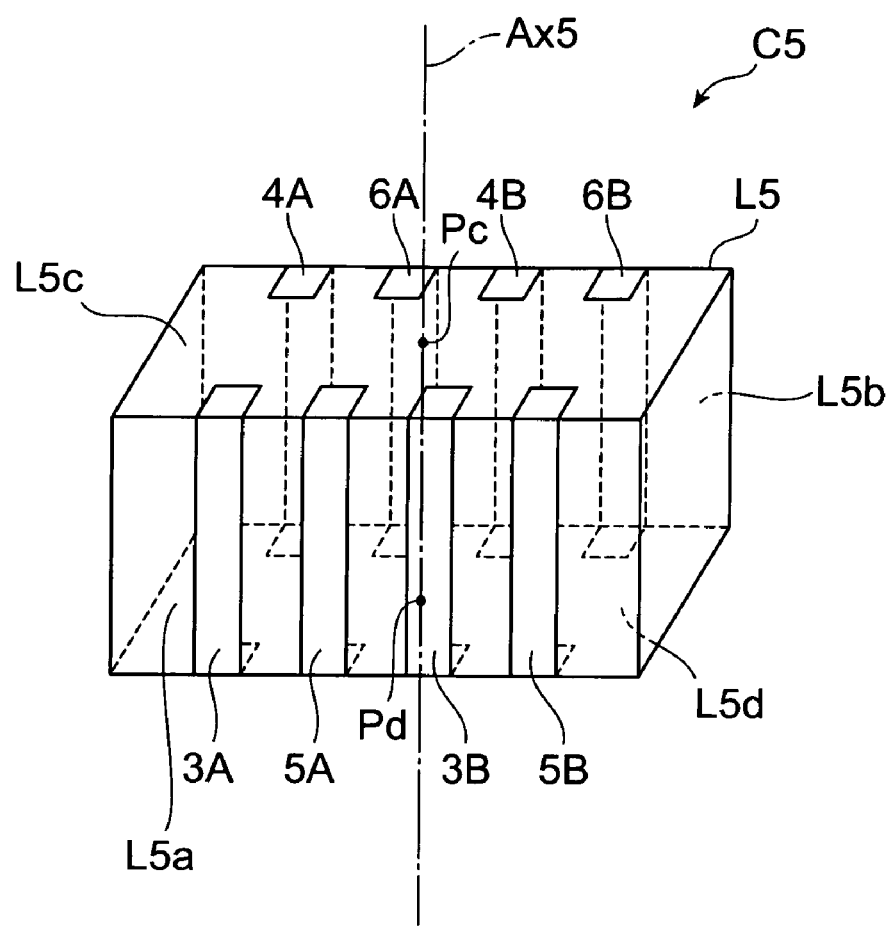
FIG. 19 is a perspective view of the multilayer capacitor in accordance with a fourteenth embodiment.
Figure 20:
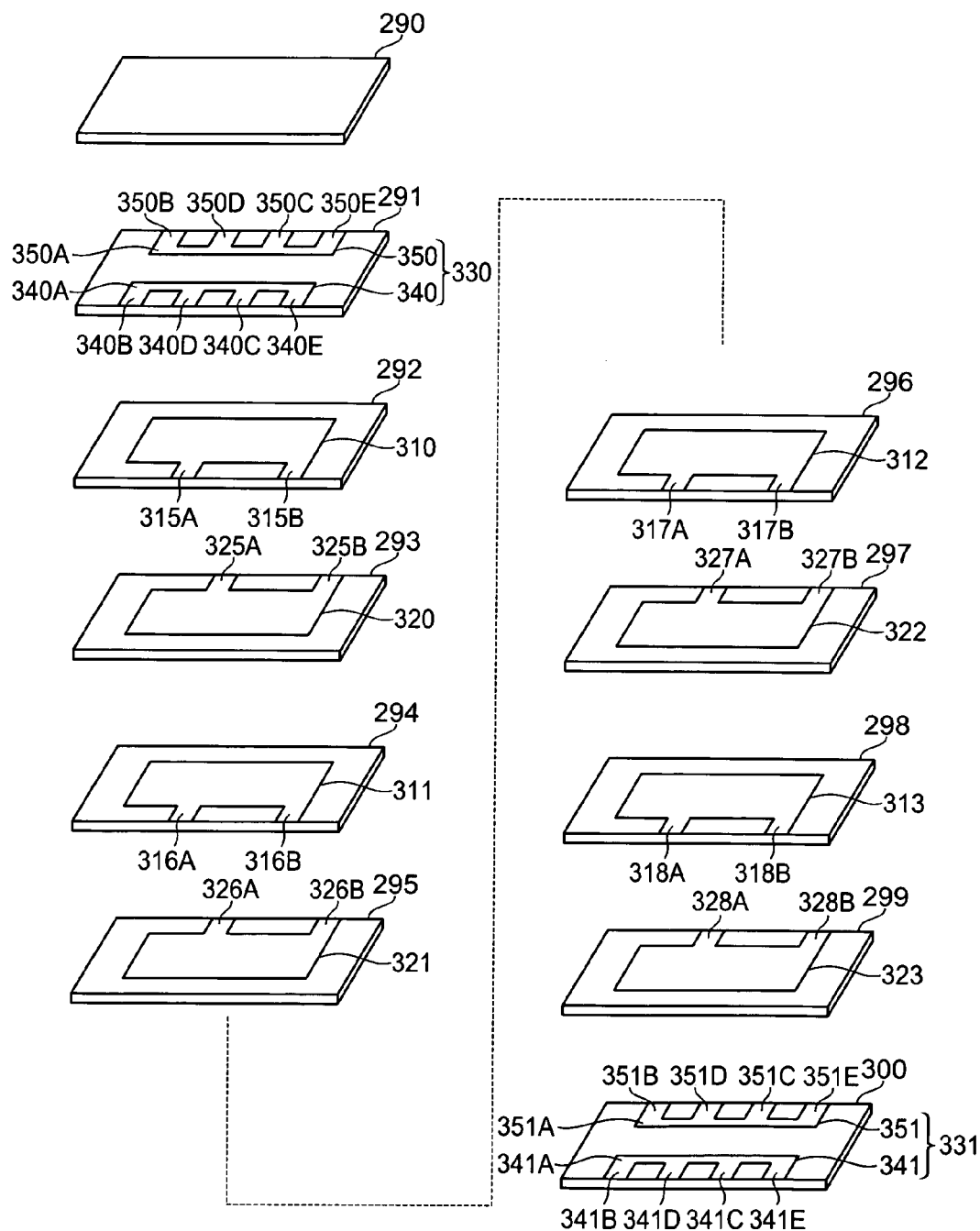
FIG. 20 is an exploded perspective view of the multilayer body included in the multilayer capacitor in accordance with the fourteenth embodiment.

The configuration of the multilayer capacitor C5 in accordance with a fourteenth embodiment will be explained with reference to FIGS. 19 and 20. The multilayer capacitor in accordance with the fourteenth embodiment differs from the multilayer capacitor C1 in accordance with the first embodiment in terms of arrangement of outer conductors formed on the first and second side faces of the multilayer body. FIG. 19 is a perspective view of the multilayer capacitor in accordance with the fourteenth embodiment. FIG. 20 is an exploded perspective view of the multilayer body included in the multilayer capacitor in accordance with the fourteenth embodiment.

As shown in FIG. 19, the multilayer capacitor C5 in accordance with the fourteenth embodiment comprises a multilayer body L5, first terminal conductors 3A, 3B formed on the multilayer body L5, second terminal conductors 4A, 4B similarly formed on the multilayer body, first outer connecting conductors 5A, 5B similarly formed on the multilayer body, and second outer connecting conductors 6A, 6B similarly formed on the multilayer body.

Each of the first terminal conductors 3A, 3B and first outer connecting conductors 5A, 5B is positioned on a first side face L5a which is a side face extending along the longitudinal axis of faces L5c, L5d orthogonal to the laminating direction of the multilayer body L5 among side faces parallel to the laminating direction of the multilayer body. The first terminal conductors 3A, 3B and first outer connecting conductor 5A, 5B are formed such that the first terminal conductor 3A, first outer connecting conductor 5A, first terminal conductor 3B, and first outer connecting conductor 5B are successively arranged from the left side to right side of FIG. 19.

Therefore, the first terminal conductor 3A and first outer connecting conductor 5A are formed adjacent to each other on the first side face L5a that is the same side face of the multilayer body L5. The first terminal conductor 3B and first outer connecting conductor 5B are formed adjacent to each other on the first side face L5a that is the same side face of the multilayer body L5.

Each of the second terminal conductors 4A, 4B and second outer connecting conductors 6A, 6B is positioned on a second side face L5b which is a side face extending along the longitudinal axis of faces L5c, L5d orthogonal to the laminating direction of the multilayer body L5 among side faces parallel to the laminating direction of the multilayer body. The second terminal conductors 4A, 4B and second outer connecting conductor 6A, 6B are formed such that the second terminal conductor 4A, second outer connecting conductor 6A, second terminal conductor 4B, and second outer connecting conductor 6B are successively arranged from the left side to right side of FIG. 19.

Therefore, the second terminal conductor 4A and second outer connecting conductor 6A are formed adjacent to each other on the second side face L5b that is the same side face of the multilayer body L5. The second terminal conductor 4B and second outer connecting conductor 6B are formed adjacent to each other on the second side face L5b that is the same side face of the multilayer body L5.

The first terminal conductor 3A and second terminal conductor 4A oppose each other in a direction along which the first side face L5a and second side face L5b of the multilayer body L5 oppose each other. The first terminal conductor 3B and second terminal conductor 4B oppose each other in the opposing direction of the first side face L5a and second side face L5b of the multilayer body L5. The first outer connecting conductor 5A and second outer connecting conductor 6A oppose each other in the opposing direction of the first side face L5a and second side face L5b of the multilayer body L5. The first outer connecting conductor 5B and second outer connecting conductor 6B oppose each other in the opposing direction of the first side face L5a and second side face L5b of the multilayer body L5.

As shown in FIG. 20, the multilayer body L5 is constructed by alternately laminating a plurality of (11 in this embodiment) dielectric layers 290 to 300 and a plurality of (4 each in this embodiment) of first and second inner electrodes 310 to 313, 320 to 323. In the actual multilayer capacitor C5, they are integrated to such an extent that no boundaries are discernible between the dielectric layers 290 to 300.

A plurality of (2 in this embodiment) inner connecting conductor layers 330, 331 are laminated in the multilayer body L5. In the multilayer body L5, the plurality of first inner electrodes 310 to 313 and the plurality of second inner electrodes 320 to 323 are arranged between the inner connecting conductor layers 330, 331.

Each of the first inner electrodes 310 to 313 has a substantially rectangular form. The plurality of first inner electrodes 310 to 313 are formed at respective positions separated by a predetermined distance from a side face parallel to the laminating direction of the dielectric layers 290 to 300 (hereinafter simply referred to as "laminating direction") in the multilayer body L5.

Each of lead conductors 315A, 315B is integrally formed with the first inner electrode 310 so as to extend therefrom and reach the first side face L5a of the multilayer body L5. Each of lead conductors 316A, 316B is integrally formed with the first inner electrode 311 so as to extend therefrom and reach the first side face L5a of the multilayer body L5. Each of lead conductors 317A, 317B is integrally formed with the first inner electrode 312 so as to extend therefrom and reach the first side face L5a of the multilayer body L5. Each of lead conductors 318A, 318B is integrally formed with the first inner electrode 313 so as to extend therefrom and reach the first side face L5a of the multilayer body L5.

The first inner electrode 310 is electrically connected to the first outer connecting conductors 5A and 5B through the lead conductors 315A and 315B, respectively. The first inner electrode 311 is electrically connected to the first outer connecting conductors 5A and 5B through the lead conductors 316A and 316B, respectively. The first inner electrode 312 is electrically connected to the first outer connecting conductors 5A and 5B through the lead conductors 317A and 317B, respectively. The first inner electrode 313 is electrically connected to the first outer connecting conductors 5A and 5B through the lead conductors 318A and 318B, respectively. As a consequence, the plurality of first inner electrodes 310 to 313 are electrically connected to each other through the first outer connecting conductors 5A, 5B.

Each of the first inner electrodes 320 to 323 has a substantially rectangular form. The plurality of first inner electrodes 320 to 323 are formed at respective positions separated by a predetermined distance from a side face parallel to the laminating direction of the multilayer body L5.

Each of lead conductors 325A, 325B is integrally formed with the first inner electrode 320 so as to extend therefrom and reach the second side face L5b of the multilayer body L5. Each of lead conductors 326A, 326B is integrally formed with the first inner electrode 321 so as to extend therefrom and reach the second side face L5b of the multilayer body L5. Each of lead conductors 327A, 327B is integrally formed with the second inner electrode 322 so as to extend therefrom and reach the second side face L5b of the multilayer body L5. Each of lead conductors 328A, 328B is integrally formed with the second inner electrode 323 so as to extend therefrom and reach the second side face L5b of the multilayer body L5.

The second inner electrode 320 is electrically connected to the second outer connecting conductors 6A and 6B through the lead conductors 325A and 325B, respectively. The second inner electrode 321 is electrically connected to the second outer connecting conductors 6A and 6B through the lead conductors 326A and 326B, respectively. The second inner electrode 322 is electrically connected to the second outer connecting conductors 6A and 6B through the lead conductors 327A and 327B, respectively. The second inner electrode 323 is electrically connected to the second outer connecting conductors 6A and 6B through the lead conductors 328A and 328B, respectively. As a consequence, the plurality of second inner electrodes 320 to 323 are electrically connected to each other through the second outer connecting conductors 6A, 6B.

The inner connecting conductor layer 330 is positioned so as to be held between the dielectric layers 290 and 291. The inner connecting conductor layer 331 is positioned so as to be held between the dielectric layers 299 and 300. The inner connecting conductor layers 330, 331 include their corresponding first inner connecting conductors 340, 341 and second inner connecting conductors 350, 351 which are electrically insulated from each other.

The first inner connecting conductors 340, 341 include their corresponding first conductor portions 340A, 341B each having an oblong form, and second to fifth conductor portions 340B to 340E, 341B to 341E extending from the first conductor portions 340A, 341A so as to be taken out to the first side face L5a of the multilayer body L5. The first conductor portions 340A, 341A are arranged such that their longitudinal axes are parallel to the first and second side faces L5a, L5b of the multilayer body L5.

Each of the second conductor portions 340B, 341B is electrically connected to the first terminal conductor 3A; each of the third conductor portions 340C, 341C is electrically connected to the first terminal conductor 3B; each of the fourth conductor portions 340D, 341D is electrically connected to the first outer connecting conductor 5A; and each of the fifth conductor portions 340E, 341E is electrically connected to the first outer connecting conductor 5B. As a consequence, each of the first inner connecting conductors 340, 341 is electrically connected to the first terminal conductors 3A, 3B and first outer connecting conductors 5A, 5B.

The second inner connecting conductors 350, 351 include their corresponding first conductor portions 350A, 351B each having an oblong form, and second to fifth conductor portions 350B to 350E, 351B to 351E extending from the first conductor portions 350A, 351A so as to be taken out to the second side face L5b of the multilayer body L5. The first conductor portions 350A, 351A are arranged such that their longitudinal axes are parallel to the first and second side faces L5a, L5b of the multilayer body L5.

Each of the second conductor portions 350B, 351B is electrically connected to the fourth terminal conductor 4A; each of the third conductor portions 350C, 351C is electrically connected to the second terminal conductor 4B; each of the fourth conductor portions 350D, 351D is electrically connected to the second outer connecting conductor 6A; and each of the fifth conductor portions 350E, 351E is electrically connected to the second outer connecting conductor 6B. As a consequence, each of the second inner connecting conductors 350, 351 is electrically connected to the second terminal conductors 4A, 4B and second outer connecting conductors 6A, 6B.

The first conductor portion 350A of the second inner connecting conductor 350 of the inner connecting conductor layer 330 is a region opposing the first inner electrode 310 with the dielectric layer 291 in between. The first conductor portion 341A of the first inner connecting conductor 341 of the inner connecting conductor layer 331 is a region opposing the second inner electrode 323 with the dielectric layer 299 in between.

The inner connecting conductor layers 330, 331 are laminated in the multilayer body L5 such that the multilayer body L5 includes at least one set (4 sets in this embodiment) of first and second inner electrodes neighboring each other with the dielectric layer in between.

In the multilayer capacitor C5, the first terminal conductors 3A, 3B are connected to the first inner electrodes 310 to 313 not directly, but electrically through the first outer connecting conductors 5A, 5B and first inner connecting conductors 340, 341 of the inner connecting conductor layers 330, 331. Also, in the multilayer capacitor C5, the second terminal conductors 4A, 4B are connected to the second inner electrodes 320 to 323 not directly, but electrically through the second outer connecting conductors 6A, 6B and second inner connecting conductors 350, 351 of the inner connecting conductor layers 330, 331. As a result, the multilayer capacitor C5 yields an equivalent series resistance greater than that of the conventional multilayer capacitor in which all the inner electrodes are connected to their corresponding terminal conductors through lead conductors.

By adjusting the number of inner connecting conductor layers 330, 331 directly connected to the first terminal conductors 3A, 3B and second terminal conductors 4A, 4B in such a manner, this embodiment sets the equivalent series resistance of the multilayer capacitor C5 to a desirable value, and thus can regulate the equivalent series resistance easily with a high precision. Also, since the equivalent series resistance is controlled by the inner connecting conductor layers, the multilayer capacitor C5 can regulate the equivalent series resistance while setting its capacitance to a desirable value (e.g., a larger value).

All of the first and second terminal conductors 3A, 3B, 4A, 4B and first and second outer connecting conductors 5A, 5B, 6A, 6B, which are outer conductors of the multilayer capacitor C5, are formed on the first and second side faces L5a, L5b of the multilayer body L5 opposing each other. Therefore, as compared with the case where outer conductors are formed on four side faces of the multilayer body L5, the multilayer capacitor C5 can reduce steps required for forming the outer conductors. As a consequence, the multilayer capacitor C5 can be made easily.

The second inner connecting conductor 350 of the inner connecting conductor layer 330 has the first conductor portion 350A that is a region opposing the first inner electrode 310 with the dielectric layer 291 in between. The first inner connecting conductor 341 of the inner connecting conductor layer 331 has the first conductor portion 341A that is a region opposing the second inner electrode 323 with the dielectric layer 299 in between. Therefore, the inner connecting conductor layers 330, 331 can also contribute to forming the capacity component of the multilayer capacitor C5. As a consequence, the multilayer capacitor C5 can further increase its capacitance.

Since a plurality of first and second inner electrodes 310 to 313, 320 to 323 are arranged between the inner connecting conductor layers 330 and 331, the multilayer capacitor C5 can set its equivalent series resistance with a favorable balance.

On the first side face L5a of the multilayer body L5 in the multilayer capacitor C5, the first terminal conductors 3A, 3B are formed adjacent to the first outer connecting conductors 5A and 5B, respectively. Therefore, a remarkable canceling effect is obtained in a magnetic field caused by a current flowing through the multilayer capacitor C5. As a result, the multilayer capacitor C5 can reduce its equivalent series inductance.

On the second side face L5b of the multilayer body L5 in the multilayer capacitor C5, the second terminal conductors 4A, 4B are formed adjacent to the second outer connecting conductors 6A and 6B, respectively. Therefore, a remarkable canceling effect is obtained in a magnetic field caused by a current flowing through the multilayer capacitor C5. As a result, the multilayer capacitor C5 can reduce its equivalent series inductance.

In the multilayer capacitor C5, the first terminal conductors 3A, 3B and first outer connecting conductors 5A, 5B are arranged by the same number while forming neighboring pairs on the first side face L5a of the multilayer body L5. Also, in the multilayer capacitor C5, the second terminal conductors 4A, 4B and second outer connecting conductors 6A, 6B are arranged by the same number while forming neighboring pairs on the second side face L5b of the multilayer body L5. Therefore, a remarkable canceling effect is obtained in a magnetic field caused by a current flowing through the multilayer capacitor C5. As a result, the multilayer capacitor C5 can lower its equivalent series inductance further greatly.

Fifteenth Embodiment

Figure 21:
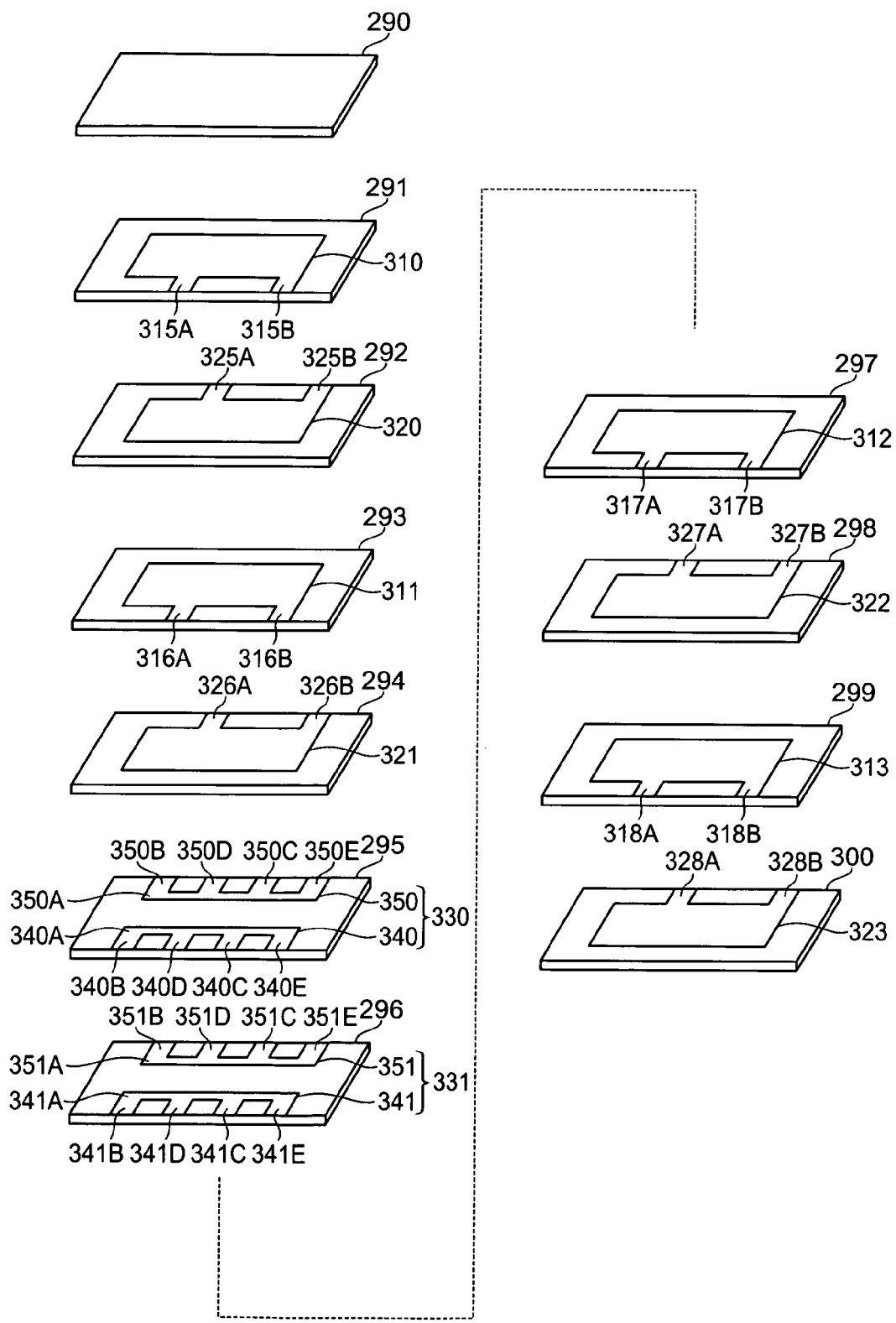
FIG. 21 is an exploded perspective view of the multilayer body included in the multilayer capacitor in accordance with a fifteenth embodiment.

With reference to FIG. 21, the configuration of the multilayer capacitor in accordance with an fifteenth embodiment will be explained. The multilayer capacitor in accordance with the fifteenth embodiment differs from the multilayer capacitor C5 in accordance with the fourteenth embodiment in terms of positions of the inner connecting conductor layers 330, 331 in the laminating direction. FIG. 21 is an exploded perspective view of the multilayer body included in the multilayer capacitor in accordance with the fifteenth embodiment.

As with the multilayer capacitor C5 in accordance with the fourteenth embodiment, the multilayer capacitor in accordance with the fifteenth embodiment comprises a multilayer body, first terminal conductors 3A, 3B formed on the multilayer body, second terminal conductors 4A, 4B similarly formed on the multilayer body, first outer connecting conductors 5A, 5B similarly formed on the multilayer body, and second outer connecting conductors 6A, 6B similarly formed on the multilayer body, though they are not depicted.

In the multilayer capacitor in accordance with the fifteenth embodiment, the two inner connecting conductor layers 330, 331 are laminated between two layers each of first and second inner electrodes 310, 311, 320, 321 and two layers each of first and second inner electrodes 312, 313, 322, 323 as shown in FIG. 21. More specifically, the inner connecting conductor layer 330 is positioned so as to be held between dielectric layers 294, 295. The inner connecting conductor layer 331 is positioned so as to be held between dielectric layers 295, 296.

The inner connecting conductor layers 330, 331 are laminated in the multilayer body such that the multilayer body includes at least one set (4 sets in this embodiment) of first and second inner electrodes neighboring each other with the dielectric layer in between.

In the multilayer capacitor in accordance with the fifteenth embodiment, the first terminal conductors 3A, 3B are connected to the first inner electrodes 310 to 313 not directly, but electrically through the first outer connecting conductors 5A, 5B and first inner connecting conductor 340, 341 of the inner connecting conductor layers 330, 331. Also, in the multilayer capacitor in accordance with the fifteenth embodiment, the second terminal conductors 4A, 4B are connected to the second inner electrodes 320 to 323 not directly, but electrically through the second outer connecting conductors 6A, 6B and second inner connecting conductors 350, 351 of the inner connecting conductor layers 330, 331. As a consequence, the multilayer capacitor in accordance with the fifteenth embodiment yields an equivalent series resistance greater than that of the conventional multilayer capacitor in which all the inner electrodes are connected to their corresponding terminal conductors through lead conductors.

Meanwhile, when the first terminal conductors 3A, 3B are concerned, the multilayer capacitor in accordance with the fifteenth embodiment differs from the multilayer capacitor C5 in accordance with the fourteenth embodiment in how the respective resistance components of the first outer connecting conductors 5A, 5B are connected to the first terminal conductors 3A, 3B. In the multilayer capacitor C5 in accordance with the fourteenth embodiment, the respective resistance components of the first outer connecting conductors 5A, 5B are connected in series to the first inner connecting conductor layers 330, 331. In the multilayer capacitor in accordance with the fifteenth embodiment, on the other hand, each of the resistance components of the first outer connecting conductors 5A, 5B is split at the inner connecting conductor layers 330, 331 as boundaries, and the resulting resistance components are connected in parallel to their corresponding first terminal conductors 3A, 3B.

When the second terminal conductors 4A, 4B are concerned, the multilayer capacitor in accordance with the fifteenth embodiment differs from the multilayer capacitor C5 in accordance with the fourteenth embodiment in how the respective resistance components of the second outer connecting conductors 6A, 6B are connected to the second terminal conductors 4A, 4B. In the multilayer capacitor C5 in accordance with the fourteenth embodiment, the respective resistance components of the second outer connecting conductors 6A, 6B are connected in series to the inner connecting conductor layers 330, 331. In the multilayer capacitor in accordance with the fifteenth embodiment, on the other hand, each of the resistance components of the second outer connecting conductors 6A, 6B is split at the inner connecting conductor layers 330, 331 as boundaries, and the resulting resistance components are connected in parallel to their corresponding second terminal conductors 4A, 4B.

Therefore, because of the difference in resistance components of the first and second outer connecting conductors 5A, 5B, 6A, 6B, the multilayer capacitor in accordance with the fifteenth embodiment yields an equivalent series resistance smaller than that of the multilayer capacitor C5 in accordance with the fourteenth embodiment.

As in the foregoing, by adjusting the positions of the inner connecting conductor layers 330, 331 directly connected to the first and second terminal conductors 3A, 3B, 4A, 4B in the laminating direction, this embodiment sets the equivalent series resistance of the multilayer capacitor to a desirable value, and thus can regulate the equivalent series resistance easily with a high precision. Also, since the equivalent series resistance is controlled by the inner connecting conductor layers, the multilayer capacitor in accordance with the fifteenth embodiment can regulate the equivalent series resistance while setting its capacitance to a desirable value (e.g., a larger value).

All the outer conductors (first and second terminal conductors 3A, 3B, 4A, 4B and first and second outer connecting conductors 5A, 5B, 6A, 6B) in the multilayer capacitor in accordance with the fifteenth embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the fifteenth embodiment can be made easily.

The first conductor portion 340A of the first inner connecting conductor 340 of the inner connecting conductor layer 330 opposes the second inner electrode 321 with the dielectric layer 294 in between. The first conductor portion 351A of the second inner connecting conductor 351 of the inner connecting conductor layer 331 opposes the first inner electrode 312 with the dielectric layer 296 in between. Therefore, in the multilayer capacitor in accordance with the fifteenth embodiment, the first and second inner connecting conductors 330, 331 can also contribute to forming the capacity component, and thus can further increase the capacitance of the multilayer capacitor.

The first terminal conductors 3A, 3B and the first outer connecting conductors 5A, 5B are formed adjacent to each other, respectively, on the first side face of the multilayer body in the multilayer capacitor in accordance with the fifteenth embodiment as in the multilayer capacitor C5. Therefore, the multilayer capacitor in accordance with the fifteenth embodiment can lower its equivalent series inductance.

The second terminal conductors 4A, 4B and the second outer connecting conductors 6A, 6B are formed adjacent to each other, respectively, on the second side face of the multilayer body in the multilayer capacitor in accordance with the fifteenth embodiment as in the multilayer capacitor C5. Therefore, the multilayer capacitor in accordance with the fifteenth embodiment can lower its equivalent series inductance.

In the multilayer capacitor in accordance with the fifteenth embodiment, the first terminal conductors 3A, 3B and first outer connecting conductors 5A, 5B are arranged by the same number while forming neighboring pairs on the first side face of the multilayer body. Also, in the multilayer capacitor in accordance with the fifteenth embodiment, the second terminal conductors 4A, 4B and second outer connecting conductors 6A, 6B are arranged by the same number while forming neighboring pairs on the second side face of the multilayer body. Therefore, the multilayer capacitor in accordance with the fifteenth embodiment can lower its equivalent series inductance more greatly.

Sixteenth Embodiment

Figure 22:
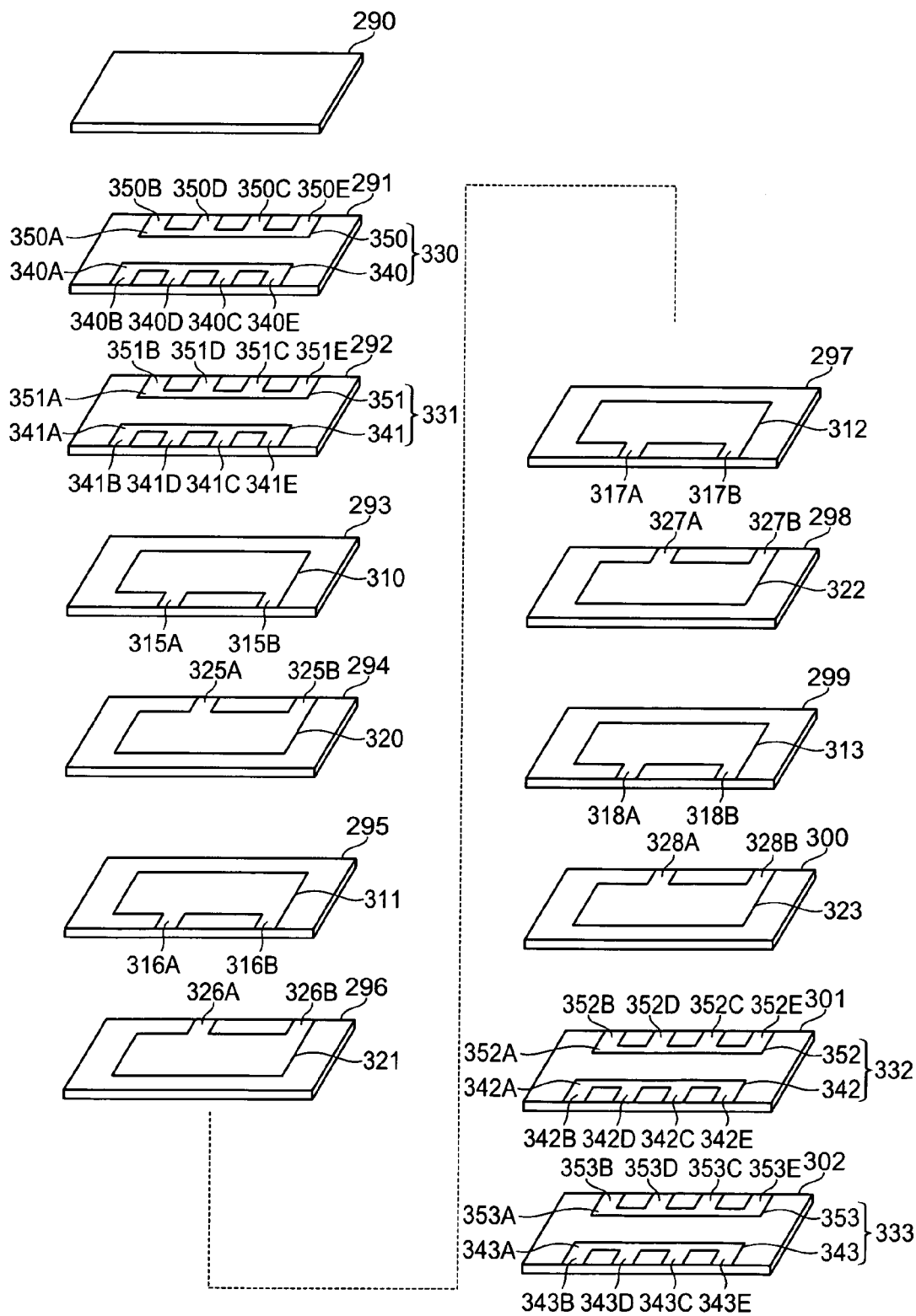
FIG. 22 is an exploded perspective view of the multilayer body included in the multilayer capacitor in accordance with a sixteenth embodiment.

The configuration of the multilayer capacitor in accordance with a sixteenth embodiment will be explained with reference to FIG. 22. The multilayer capacitor in accordance with the sixteenth embodiment differs from the multilayer capacitor C5 in accordance with the fourteenth embodiment in terms of the number of inner connecting conductor layers. FIG. 22 is an exploded perspective view of the multilayer body included in the multilayer capacitor in accordance with the sixteenth embodiment.

As with the multilayer capacitor C5 in accordance with the fourteenth embodiment, the multilayer capacitor in accordance with the sixteenth embodiment comprises a multilayer body, first terminal conductors 3A, 3B formed on the multilayer body, second terminal conductors 4A, 4B similarly formed on the multilayer body, first outer connecting conductors 5A, 5B similarly formed on the multilayer body, and second outer connecting conductors 6A, 6B similarly formed on the multilayer body, though they are not depicted.

The multilayer capacitor in accordance with the sixteenth embodiment is constructed by alternately laminating a plurality of (13 in this embodiment) dielectric layers 290 to 302 and a plurality of (4 each in this embodiment) of first and second inner electrodes 310 to 313, 320 to 323 as shown in FIG. 22.

In the multilayer body of the multilayer capacitor in accordance with the sixteenth embodiment, a plurality of (4 in this embodiment) inner connecting conductor layers 330, 331, 332, 333 are laminated. In the multilayer body of the multilayer capacitor in accordance with the sixteenth embodiment, the four layers of first inner electrodes 310 to 313 and four layers of second inner electrodes 320 to 323 are arranged between the two inner connecting conductor layers 330, 331 and two inner connecting conductor layers 332, 333.

The inner connecting conductor layer 330 is positioned so as to be held between the dielectric layers 290 and 291. The inner connecting conductor layer 331 is positioned so as to be held between the dielectric layers 291 and 292. The inner connecting conductor layer 332 is positioned so as to be held between the dielectric layers 300 and 301. The inner connecting conductor layer 333 is positioned so as to be held between the dielectric layers 301 and 302. The inner connecting conductor layers 330 to 333 include their corresponding first inner connecting conductors 340 to 343 and second inner connecting conductors 350 to 353 which are electrically insulated from each other.

The inner connecting conductor layers 330 to 333 are laminated in the multilayer body such that the multilayer body includes at least one set (4 sets in this embodiment) of first and second inner electrodes neighboring each other with the dielectric layer in between.

In the multilayer capacitor in accordance with the sixteenth embodiment, the first terminal conductors 3A, 3B are connected to the first inner electrodes 310 to 313 not directly, but electrically through the first outer connecting conductors 5A, 5B and the first inner connecting conductors 340 to 343 of the inner connecting conductor layers 330 to 333. Also, in the multilayer capacitor in accordance with the sixteenth embodiment, the second terminal conductors 4A, 4B are connected to the second inner electrodes 320 to 323 not directly, but electrically through the second outer connecting conductors 6A, 6B and the second inner connecting conductors 350 to 353 of the inner connecting conductor layers 330 to 333. As a consequence, the multilayer capacitor in accordance with the sixteenth embodiment yields an equivalent series resistance greater than that of the conventional multilayer capacitor in which all the inner electrodes are connected to their corresponding terminal conductors through lead conductors.

As compared with the multilayer capacitor C5, the multilayer capacitor in accordance with the sixteenth embodiment has a greater number of inner connecting conductor layers 330 to 333, whereas the first inner connecting conductors 340 to 343 of the inner connecting conductor layers 330 to 333 are connected in parallel to their corresponding first terminal conductors 3A, 3B. Also, the second inner connecting conductors 350 to 353 of the inner connecting conductor layers 330 to 333 are connected in parallel to their corresponding second terminal conductors 4A, 4B. Therefore, the multilayer capacitor in accordance with the sixteenth embodiment yields an equivalent series resistance smaller than that of the multilayer capacitor C5.

As in the foregoing, by adjusting the number of inner connecting conductor layers 330 to 333 directly connected to the first and second terminal conductors 3A, 3B, 4A, 4B, this embodiment sets the equivalent series resistance of the multilayer capacitor to a desirable value, and thus can regulate the equivalent series resistance easily with a high precision. Also, since the equivalent series resistance is controlled by the inner connecting conductor layers, the multilayer capacitor in accordance with the sixteenth embodiment can regulate the equivalent series resistance while setting its capacitance to a desirable value (e.g., a larger value).

All the outer conductors (first and second terminal conductors 3A, 3B, 4A, 4B and first and second outer connecting conductors 5A, 5B, 6A, 6B) in the multilayer capacitor in accordance with the sixteenth embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the sixteenth embodiment can be made easily.

The first conductor portion 351A of the second inner connecting conductor 351 of the inner connecting conductor layer 331 opposes the first inner electrode 310 with the dielectric layer 292 in between. The first conductor portion 342A of the first inner connecting conductor 342 of the inner connecting conductor layer 332 opposes the second inner electrode 323 with the dielectric layer 300 in between. Therefore, in the multilayer capacitor in accordance with the sixteenth embodiment, the inner connecting conductor layers 331, 332 can also contribute to forming the capacity component, and thus can further increase the capacitance of the multilayer capacitor.

Since a plurality of first and second inner electrodes 310 to 313, 320 to 323 are arranged between the two inner connecting conductor layers 330, 331 and the two inner connecting conductor layers 332, 333, the multilayer body of the multilayer capacitor in accordance with the sixteenth embodiment can set the equivalent series resistance with a favorable balance.

The first terminal conductors 3A, 3B and the first outer connecting conductors 5A, 5B are formed adjacent to each other, respectively, on the first side face of the multilayer body in the multilayer capacitor in accordance with the sixteenth embodiment as in the multilayer capacitor C5. Therefore, the multilayer capacitor in accordance with the sixteenth embodiment can lower its equivalent series inductance.

The second terminal conductors 4A, 4B and the second outer connecting conductors 6A, 6B are formed adjacent to each other, respectively, on the second side face of the multilayer body in the multilayer capacitor in accordance with the sixteenth embodiment as in the multilayer capacitor C5. Therefore, the multilayer capacitor in accordance with the sixteenth embodiment can lower its equivalent series inductance.

In the multilayer capacitor in accordance with the sixteenth embodiment, the first terminal conductors 3A, 3B and first outer connecting conductors 5A, 5B are arranged by the same number while forming neighboring pairs on the first side face of the multilayer body. Also, in the multilayer capacitor in accordance with the sixteenth embodiment, the second terminal conductors 4A, 4B and second outer connecting conductors 6A, 6B are arranged by the same number while forming neighboring pairs on the second side face of the multilayer body. Therefore, the multilayer capacitor in accordance with the sixteenth embodiment can lower its equivalent series inductance more greatly.

Though preferred embodiments of the present invention are explained in detail in the foregoing, the present invention is not limited to the above-mentioned embodiments. For example, the number of laminated dielectric layers 10 to 22, 80 to 92, 150 to 162, 220 to 232, and 290 to 302 and the numbers of laminated first and second inner electrodes 30 to 33, 100 to 103, 170 to 173, 240 to 243, 310 to 313, 40 to 43, 110 to 113, 180 to 183, 250 to 253, and 320 to 323 are not limited to those described in the above-mentioned embodiments.

The numbers of the inner connecting conductor layers 50 to 53, 120 to 123, 190 to 193, 260 to 263 and 330 to 333 and their positions in the laminating direction are not limited to those described in the above-mentioned embodiments.

The forms of the first inner connecting conductors 60 to 63, 130 to 133, 200 to 203, 270 to 273 and 340 to 343 of the inner connecting conductor layers 50 to 53, 120 to 123, 190 to 193, 260 to 263 and 330 to 333 are not limited to those described in the above-mentioned embodiments as long as they are electrically connected to the first terminal conductor and first outer connecting conductor. The forms of the second inner connecting conductors 70 to 73, 140 to 143, 210 to 213, 280 to 283 and 350 to 353 of the inner connecting conductor layers 50 to 53, 120 to 123, 190 to 193, 260 to 263 and 330 to 333 are not limited to those described in the above-mentioned embodiments as long as they are electrically connected to the second terminal conductor and second outer connecting conductor.

It is not necessary for the first inner connecting conductors 60 to 63, 130 to 133, 200 to 203, 270 to 273 and 340 to 343 of the inner connecting conductor layers 50 to 53, 120 to 123, 190 to 193, 260 to 263 and 330 to 333 to have a region opposing the second inner electrode in the laminating direction of the multilayer body. It is not necessary for the second inner connecting conductors 70 to 73, 140 to 143, 210 to 213, 280 to 283 and 350 to 353 of the inner connecting conductor layers 50 to 53, 120 to 123, 190 to 193, 260 to 263 and 330 to 333 to have a region opposing the first inner electrode in the laminating direction of the multilayer body.

The numbers of the first and second terminal conductors 3A, 3B, 4A, 4B are not limited to those described in the above-mentioned embodiments. Therefore, the first and second terminal conductors may be provided one each or three or more each, for example. The first and second terminal conductors 3A, 3B, 4A, 4B may be provided by numbers different from each other. The numbers of the first and second outer connecting conductors 5A, 5B, 6A, 6B are not limited to those described in the above-mentioned embodiments. Therefore, the first and second outer connecting conductors 5A, 5B, 6A, 6B may be provided one each or three or more each, for example. The first and second outer connecting conductors 5A, 5B, 6A, 6B may be provided by numbers different from each other.

The positions of the first and second terminal conductors 3A, 3B, 4A, 4B and first and second outer connecting conductors 5A, 5B, 6A, 6B are not limited to those described in the above-mentioned embodiments as long as they are formed on at least one of the first and second side faces of the multilayer body opposing each other. Therefore, the second terminal conductor may be formed on the first side face of the multilayer body. The first outer connecting conductor may be formed on the second side face of the multilayer body. The second outer connecting conductor may be formed on the first side face of the multilayer body.

It is not necessary for the first terminal conductor and first outer connecting conductor to be adjacent to each other on the same side face of the multilayer capacitor. It is not necessary for the second terminal conductor and second outer connecting conductor to be adjacent to each other on the same side face of the multilayer capacitor.

The first terminal conductors may be positioned axisymmetrical to each other about the center axis (e.g. Ax1 to Ax4) of the multilayer body. The second terminal conductors may be positioned axisymmetrical to each other about the center axis (e.g. Ax1 to Ax4) of the multilayer body. The first outer connecting conductors may be positioned axisymmetrical to each other about the center axis (e.g. Ax1 to Ax4) of the multilayer body. The second outer connecting conductors may be positioned axisymmetrical to each other about the center axis (e.g. Ax1 to Ax4) of the multilayer body. It is not necessary for the terminal conductors to be positioned axisymmetrical to each other about the center axis (e.g. Ax1 to Ax4) of the multilayer body. It is not necessary for the outer connecting conductors to be positioned axisymmetrical to each other about the center axis (e.g. Ax1 to Ax4) of the multilayer body.

The first terminal conductors may be located at positions opposing each other in the opposing direction of the first and second side faces of the multilayer body. The second terminal conductors may be located at positions opposing each other in the opposing direction of the first and second side faces of the multilayer body. The first outer connecting conductor may be located at a position opposing the second outer connecting conductor in the opposing direction of the first and second side faces of the multilayer body. It is not necessary for the terminal conductors to be located at positions opposing each other in the opposing direction of the first and second side faces of the multilayer body. It is not necessary for the outer connecting conductors to be located at positions opposing each other in the opposing direction of the first and second side faces of the multilayer body.

In the multilayer body of the multilayer capacitor in accordance with the present invention, dielectric layers may further be laminated, or dielectric layers and inner electrodes may be laminated alternately.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising a multilayer body in which a plurality of dielectric layers and a plurality of inner electrodes are alternately laminated, and a plurality of outer conductors formed on the multilayer body;

wherein the plurality of inner electrodes include a plurality of first inner electrodes and a plurality of second inner electrodes alternately arranged;

wherein the plurality of outer conductors include a first terminal conductor, a second terminal conductor, a first outer connecting conductor electrically connected to the plurality of first inner electrodes, and a second outer connecting conductor electrically connected to the plurality of second inner electrodes;

wherein the first terminal conductor is formed on a first side face of the multilayer body;

wherein the second terminal conductor is formed on the first side face of the multilayer body or a second side face thereof opposing the first side face;

wherein the first outer connecting conductor is formed on the first or second side face of the multilayer body;

wherein the second outer connecting conductor is formed on the first or second side face of the multilayer body;

wherein each of the first inner electrodes is electrically connected to the first outer connecting conductor through a lead conductor;

wherein each of the second inner electrodes is electrically connected to the second outer connecting conductor through a lead conductor;

wherein at least one inner connecting conductor layer including a first inner connecting conductor and a second inner connecting conductor is laminated in the multilayer body;

wherein the first inner connecting conductor is electrically connected to the first terminal conductor and the first outer connecting conductor, and whereas the second inner connecting conductor is electrically insulated from the first inner connecting conductor but is electrically connected to the second terminal conductor and the second outer connecting conductor;

wherein the inner connecting conductor layer is laminated in the multilayer body such that the multilayer body includes at least one set of the first and second inner electrodes neighboring each other with a dielectric layer in between; and wherein an equivalent series resistance is set to a desirable value by adjusting a number of inner connecting conductor layers.

2. A multilayer capacitor according to claim 1, wherein the first inner connecting conductor of the inner connecting conductor layer includes a region opposing the second inner electrode with the dielectric layer in between.

3. A multilayer capacitor according to claim 1, wherein the second inner connecting conductor of the inner connecting conductor layer includes a region opposing the first inner electrode with the dielectric layer in between.

4. A multilayer capacitor according to claim 1, wherein a plurality of inner connecting conductor layers are laminated in the multilayer body; and wherein the plurality of first inner electrodes and the plurality of second inner electrodes are arranged between a part of the plurality of inner connecting conductor layers and the rest thereof.

5. A multilayer capacitor according to claim 1, wherein the first terminal conductor and the first outer connecting conductor are formed adjacent to each other on a same side face of the multilayer body.

6. A multilayer capacitor according to claim 1, wherein the second terminal conductor and the second outer connecting conductor are formed adjacent to each other on a same side face of the multilayer body.

7. A multilayer capacitor according to claim 1, wherein a plurality of first terminal conductors and a plurality of first outer connecting conductors are provided by a same number;

wherein a plurality of second terminal conductors and a plurality of second outer connecting conductors are provided by a same number;

wherein the plurality of first terminal conductors and the plurality of first outer connecting conductors are formed on the first side face of the multilayer body, whereas the plurality of second terminal conductors and the plurality of second outer connecting conductors are formed on the second side face of the multilayer body;

wherein at least one of both neighboring sides of each first terminal conductor plurality of the first terminal conductors on the first side face is formed with the first outer connecting conductor;

wherein at least one of both neighboring sides of each first outer connecting conductor of the plurality of first outer connecting conductors on the first side face is formed with the first terminal conductor;

wherein at least one of both neighboring sides of each second terminal conductor of the plurality of second terminal conductors on the second side face is formed with the second outer connecting conductor; and wherein at least one of both neighboring sides of each second outer connecting conductor of the plurality of second outer connecting conductors on the second side face is formed with the second terminal conductor.

8. A multilayer capacitor according to claim 1, wherein at least one each of the first terminal conductor, second terminal conductor, first outer connecting conductor, and second outer connecting conductor are provided;

wherein the first terminal conductor or second terminal conductor is located at a position axisymmetrical to the first terminal conductor about a center axis of the multilayer body passing respective center points of two side faces of the multilayer body orthogonal to a laminating direction of the multilayer body;

wherein the first outer connecting conductor or second outer connecting conductor is located at a position axisymmetrical to the first outer connecting conductor about the center axis of the multilayer body;

wherein the first terminal conductor or second terminal conductor is located at a position axisymmetrical to the second terminal conductor about the center axis of the multilayer body;

wherein the first outer connecting conductor or second outer connecting conductor is located at a position axisymmetrical to the second outer connecting conductor about the center axis of the multilayer body;

wherein the first terminal conductor or second terminal conductor is located at a position opposing the first terminal conductor in a direction along which the first and second side faces of the multilayer body oppose each other;

wherein the first outer connecting conductor or second outer connecting conductor is located at a position opposing the first outer connecting conductor in the opposing direction of the first and second side faces of the multilayer body;

wherein the first terminal conductor or second terminal conductor is located at a position opposing the second terminal conductor in the opposing direction of the first and second side faces of the multilayer body; and wherein the first outer connecting conductor or second outer connecting conductor is located at a position opposing the second outer connecting conductor in the opposing direction of the first and second side faces of the multilayer body.

9. A multilayer capacitor comprising a multilayer body in which a plurality of dielectric layers and a plurality of inner electrodes are alternately laminated, and a plurality of outer conductors formed on the multilayer body;

wherein the plurality of inner electrodes include a plurality of first inner electrodes and a plurality of second inner electrodes alternately arranged;

wherein the plurality of outer conductors include a first terminal conductor, a second terminal conductor, a first outer connecting conductor electrically connected to the plurality of first inner electrodes, and a second outer connecting conductor electrically connected to the plurality of second inner electrodes;

wherein the first terminal conductor is formed on a first side face of the multilayer body;

wherein the second terminal conductor is formed on the first side face of the multilayer body or a second side face thereof opposing the first side face;

wherein the first outer connecting conductor is formed on the first or second side face of the multilayer body;

wherein the second outer connecting conductor is formed on the first or second side face of the multilayer body;

wherein each of the first inner electrodes is electrically connected to the first outer connecting conductor through a lead conductor;

wherein each of the second inner electrodes is electrically connected to the second outer connecting conductor through a lead conductor;

wherein at least one inner connecting conductor layer including a first inner connecting conductor and a second inner connecting conductor is laminated in the multilayer body;

wherein the first inner connecting conductor is electrically connected to the first terminal conductor and the first outer connecting conductor, and the second inner connecting conductor is electrically insulated from the first inner connecting conductor but is electrically connected to the second terminal conductor and the second outer connecting conductor;

wherein the inner connecting conductor layer is laminated in the multilayer body such that the multilayer body includes at least one set of the first and second inner electrodes neighboring each other with a dielectric layer in between; and wherein an equivalent series resistance is set to a desirable value by adjusting a position of the inner connecting conductor layer in the multilayer body in the laminating direction.

10. A multilayer capacitor according to claim 9, wherein the first inner connecting conductor of the inner connecting conductor layer includes a region opposing the second inner electrode with the dielectric layer in between.

11. A multilayer capacitor according to claim 9, wherein the second inner connecting conductor of the inner connecting conductor layer includes a region opposing the first inner electrode with the dielectric layer in between.

12. A multilayer capacitor according to claim 9, wherein a plurality of inner connecting conductor layers are laminated in the multilayer body; and
  wherein the plurality of first inner electrodes and the plurality of second inner electrodes are arranged between a part of the plurality of inner connecting conductor layers and the rest thereof.

13. A multilayer capacitor according to claim 9, wherein the first terminal conductor and the first outer connecting conductor are formed adjacent to each other on a same side face of the multilayer body.

14. A multilayer capacitor according to claim 9, wherein the second terminal conductor and the second outer connecting conductor are formed adjacent to each other on a same side face of the multilayer body.

15. A multilayer capacitor according to claim 9, wherein a plurality of first terminal conductors and a plurality of first outer connecting conductors are provided by a same number;
  wherein a plurality of second terminal conductors and a plurality of second outer connecting conductors are provided by a same number;
  wherein the plurality of first terminal conductors and the plurality of first outer connecting conductors are formed on the first side face of the multilayer body, whereas the plurality of second terminal conductors and the plurality of second outer connecting conductors are formed on the second side face of the multilayer body;
  wherein at least one of both neighboring sides of each first terminal conductor of the plurality of first terminal conductors on the first side face is formed with the first outer connecting conductor;
  wherein at least one of both neighboring sides of each first outer connecting conductor of the plurality of first outer connecting conductors on the first side face is formed with the first terminal conductor;
  wherein at least one of both neighboring sides of each second terminal conductor of the plurality of second terminal conductors on the second side face is formed with the second outer connecting conductor; and
  wherein at least one of both neighboring sides of each second outer connecting conductor of the plurality of second outer connecting conductors on the second side face is formed with the second terminal conductor.

16. A multilayer capacitor according to claim 9, wherein at least one each of the first terminal conductor, second terminal conductor, first outer connecting conductor, and second outer connecting conductor are provided;
  wherein the first terminal conductor or second terminal conductor is located at a position axisymmetrical to the first terminal conductor about a center axis of the multilayer body passing respective center points of two side faces of the multilayer body orthogonal to a laminating direction of the multilayer body;
  wherein the first outer connecting conductor or second outer connecting conductor is located at a position axisymmetrical to the first outer connecting conductor about the center axis of the multilayer body;
  wherein the first terminal conductor or second terminal conductor is located at a position axisymmetrical to the second terminal conductor about the center axis of the multilayer body;
  wherein the first outer connecting conductor or second outer connecting conductor is located at a position axisymmetrical to the second outer connecting conductor about the center axis of the multilayer body;
  wherein the first terminal conductor or second terminal conductor is located at a position opposing the first terminal conductor in a direction along which the first and second side faces of the multilayer body oppose each other,
  wherein the first outer connecting conductor or second outer connecting conductor is located at a position opposing the first outer connecting conductor in the opposing direction of the first and second side faces of the multilayer body;
  wherein the first terminal conductor or second terminal conductor is located at a position opposing the second terminal conductor in the opposing direction of the first and second side faces of the multilayer body; and
  wherein the first outer connecting conductor or second outer connecting conductor is located at a position opposing the second outer connecting conductor in the opposing direction of the first and second side faces of the multilayer body.

* * * * *